(12) United States Patent
Sato et al.

(10) Patent No.: US 8,798,492 B2
(45) Date of Patent: *Aug. 5, 2014

(54) DEVELOPING CARTRIDGE

(71) Applicant: Brother Kogyo Kabushiki Kaisha, Nagoya (JP)

(72) Inventors: Shougo Sato, Seto (JP); Takeyuki Takagi, Nagoya (JP); Naoya Kamimura, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,719

(22) Filed: Oct. 18, 2013

(65) Prior Publication Data
US 2014/0050508 A1 Feb. 20, 2014

Related U.S. Application Data

(63) Continuation of application No. 13/493,022, filed on Jun. 11, 2012, which is a continuation of application
(Continued)

(30) Foreign Application Priority Data

| Jul. 8, 2005 | (JP) | 2005-200510 |
| Sep. 7, 2005 | (JP) | 2005-259644 |
| Dec. 27, 2005 | (JP) | 2005-376522 |

(51) Int. Cl.
*G03G 15/00* (2006.01)
*G03G 15/08* (2006.01)
*G03G 21/18* (2006.01)

(52) U.S. Cl.
USPC .......................................... 399/90; 399/111

(58) Field of Classification Search
USPC ............................................. 399/90, 111, 113
See application file for complete search history.

(56) References Cited

U.S. PATENT DOCUMENTS

| 4,952,989 A | 8/1990 | Kawano et al. |
| 5,521,693 A | 5/1996 | Kojima et al. |

(Continued)

FOREIGN PATENT DOCUMENTS

| CN | 1503070 A | 6/2004 |
| EP | 0833230 B1 | 4/1998 |

(Continued)

OTHER PUBLICATIONS

EP Office Action dtd Jan. 13, 2011, EP App. 06008670.9-2209.
(Continued)

*Primary Examiner* — Sophia S Chen
(74) *Attorney, Agent, or Firm* — Banner & Witcoff, Ltd.

(57) ABSTRACT

A developing cartridge includes a case having a first sidewall and a second sidewall opposite to the first sidewall, and a developing roller disposed between the first sidewall and second sidewall. The developing roller can include a developing roller shaft and a developing roller member configured to carry a developing agent thereon, the developing roller member disposed around the developing roller shaft. Also, the developing cartridge can include an electrode disposed on the first sidewall adjacent to the developing roller shaft, the electrode electrically connected to the developing roller member, and a driven coupling disposed on the second sidewall. The electrode can include, an extending portion extending in a direction away from the first sidewall. An outermost periphery of the driven coupling defines a projection plane projecting in a direction towards the electrode, wherein at least a part of the extending portion is disposed within the projection plane.

50 Claims, 48 Drawing Sheets

Related U.S. Application Data

No. 13/213,924, filed on Aug. 19, 2011, now Pat. No. 8,213,826, which is a continuation of application No. 12/728,804, filed on Mar. 22, 2010, now Pat. No. 8,014,694, which is a continuation of application No. 11/456,224, filed on Jul. 10, 2006, now Pat. No. 7,693,443, which is a continuation-in-part of application No. 11/391,220, filed on Mar. 29, 2006, now Pat. No. 7,693,442.

(56) References Cited

U.S. PATENT DOCUMENTS

| | | | |
|---|---|---|---|
| 5,802,432 | A | 9/1998 | Coffey et al. |
| 6,101,349 | A | 8/2000 | Ohashi et al. |
| 6,246,841 | B1 | 6/2001 | Merrifield et al. |
| 6,272,299 | B1 | 8/2001 | Numagami et al. |
| 6,823,160 | B2 | 11/2004 | Okabe |
| 6,944,415 | B2 | 9/2005 | Nomura |
| 6,973,276 | B2 | 12/2005 | Mizoguchi |
| 7,062,192 | B2 | 6/2006 | Oguma et al. |
| 7,072,602 | B2 | 7/2006 | Hatori et al. |
| 7,155,151 | B2 | 12/2006 | Okamoto |
| 8,014,694 | B2 | 9/2011 | Sato et al. |
| 8,213,826 | B2 | 7/2012 | Sato et al. |
| 2003/0053819 | A1 | 3/2003 | Nomura et al. |
| 2003/0185594 | A1 | 10/2003 | Okabe |
| 2003/0228173 | A1 | 12/2003 | Nittani et al. |
| 2005/0047823 | A1 | 3/2005 | Nakashima et al. |
| 2005/0063735 | A1 | 3/2005 | Okabe |
| 2005/0185980 | A1 | 8/2005 | Okamoto |
| 2007/0009281 | A1 | 1/2007 | Sato et al. |
| 2007/0071482 | A1 | 3/2007 | Okabe |

FOREIGN PATENT DOCUMENTS

| | | |
|---|---|---|
| EP | 1273980 A2 | 1/2003 |
| EP | 1422577 A2 | 5/2004 |
| JP | H01-282574 A | 11/1989 |
| JP | H04-337758 A | 11/1992 |
| JP | H06-51629 A | 2/1994 |
| JP | H10-020743 A | 12/2002 |
| JP | 2003-295614 A | 10/2003 |

OTHER PUBLICATIONS

EP Communication regarding Third Party Observations in EP Patent Application No. 06008670.9 mailed Jul. 24, 2012.
EP Search Report, dtd Oct. 16, 2010, EP Appln. 06013842.
International Search Report dtd Oct. 24, 2006, PCT/JP2006/313804.
U.S. non-final Office Action dtd May 28, 2008, U.S. Appl. No. 11/525,070.
CN Office Action dtd Apr. 4, 2008, CN App. 2006100924768, English translation.
Brother Laser Printer Toner Cartridge TN-670 and Drum Unit DR-600, description and photographs, 7 pages; also submitted with U.S. Appl. No. 11/456,224, on Dec. 18, 2008.
EP Office Action dtd Apr. 6, 2009, EP App. 06008670.9-2209.
JP Office Action dtd Apr. 7, 2009, JP App. 2005-376522, partial English translation.
U.S. Office Action dtd Dec. 3, 2008, co-pending U.S. Appl. No. 11/525,070.
New Zealand Office Action dtd Sep. 9, 2009, NZ app.565680.
CN Office Action dtd Apr. 27, 2012, CN Appln. 200910160169.2, English translation.

FIG.17

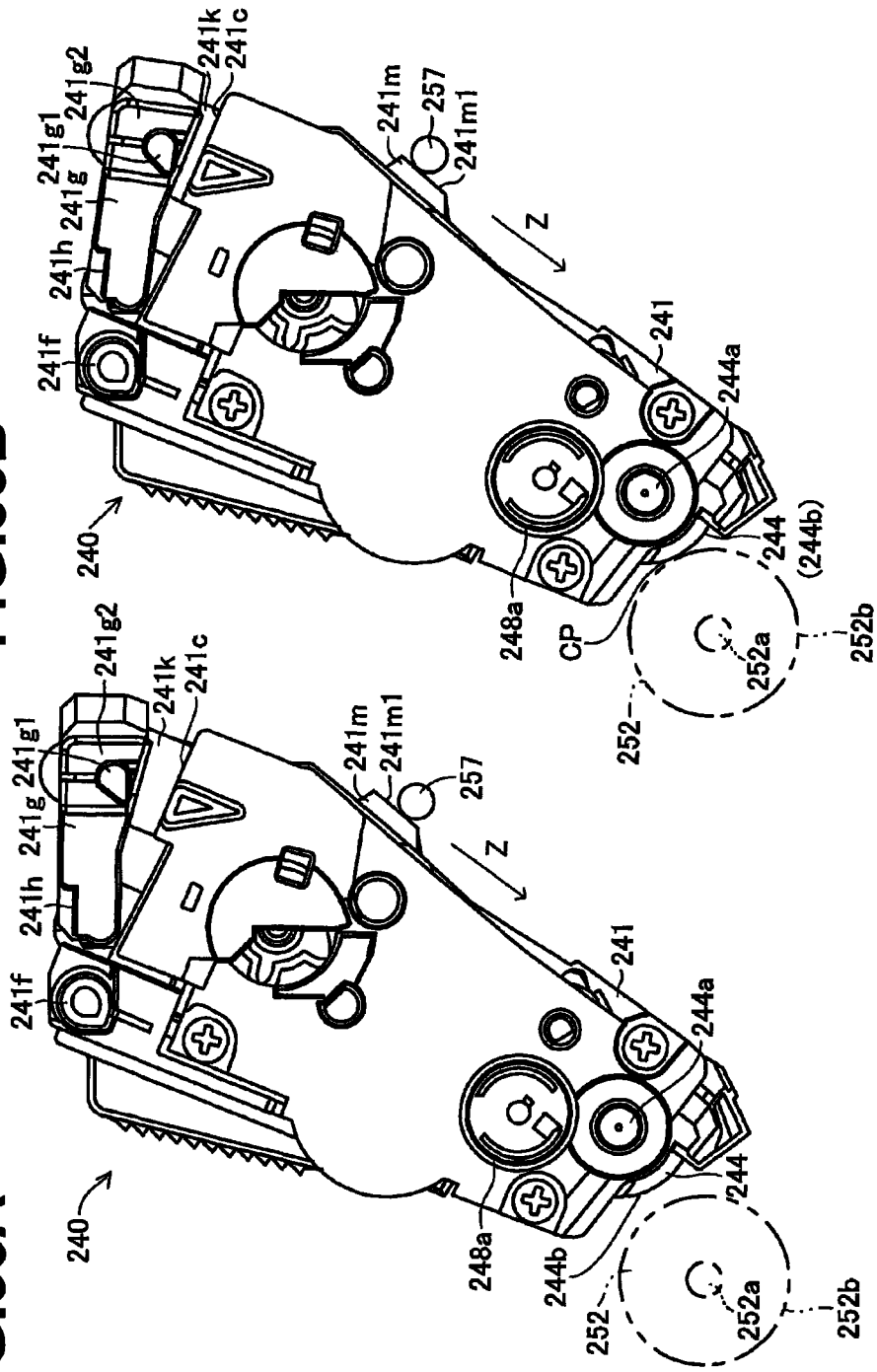

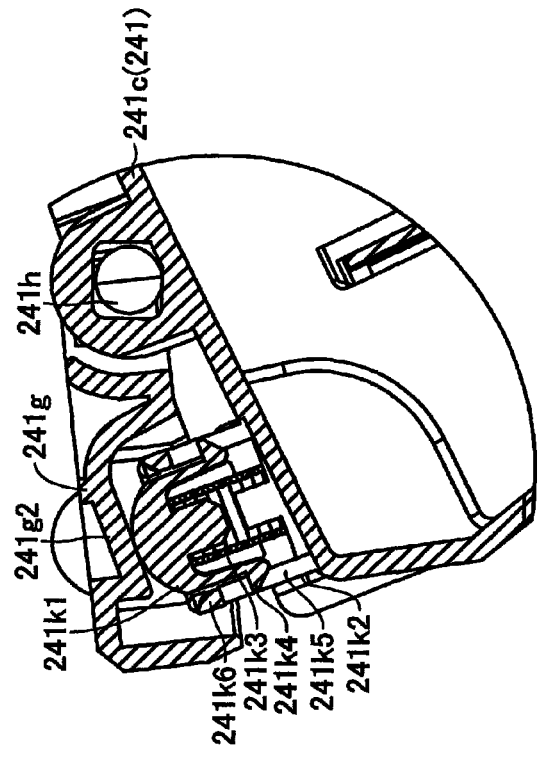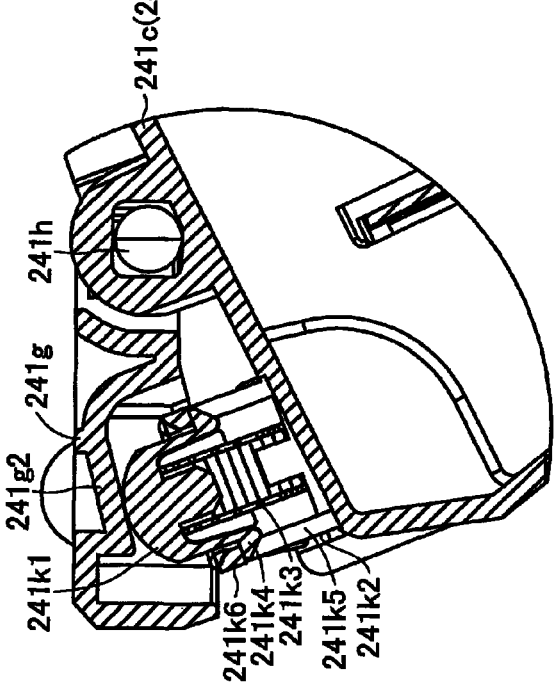

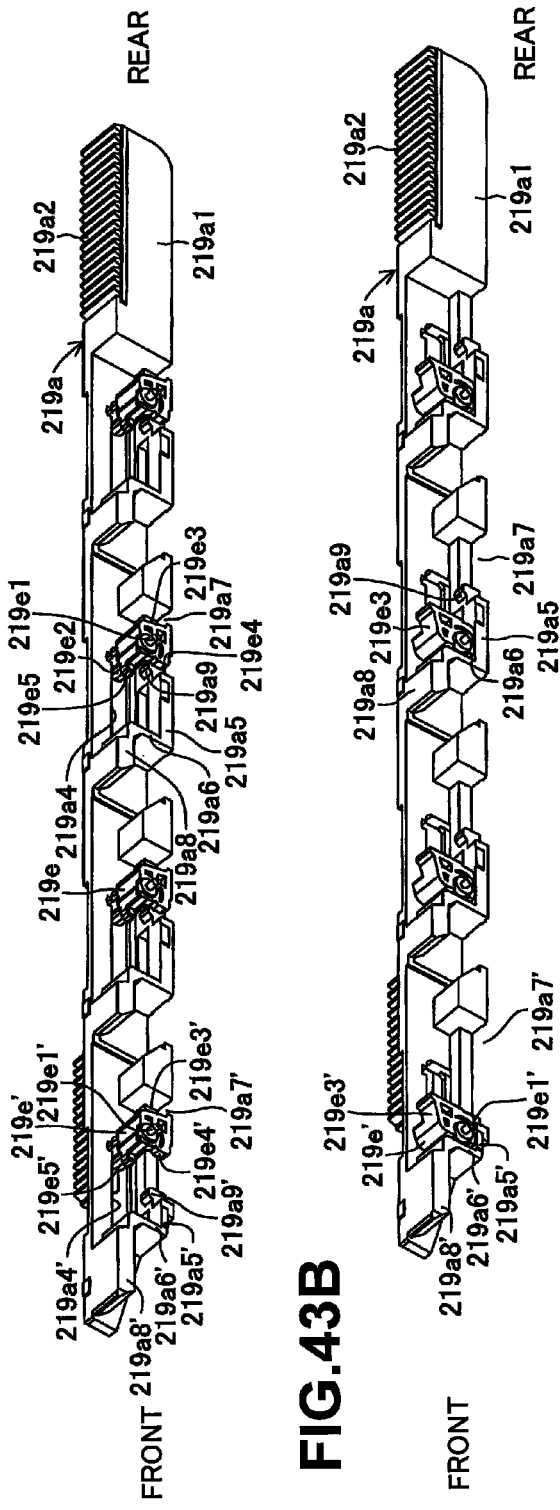

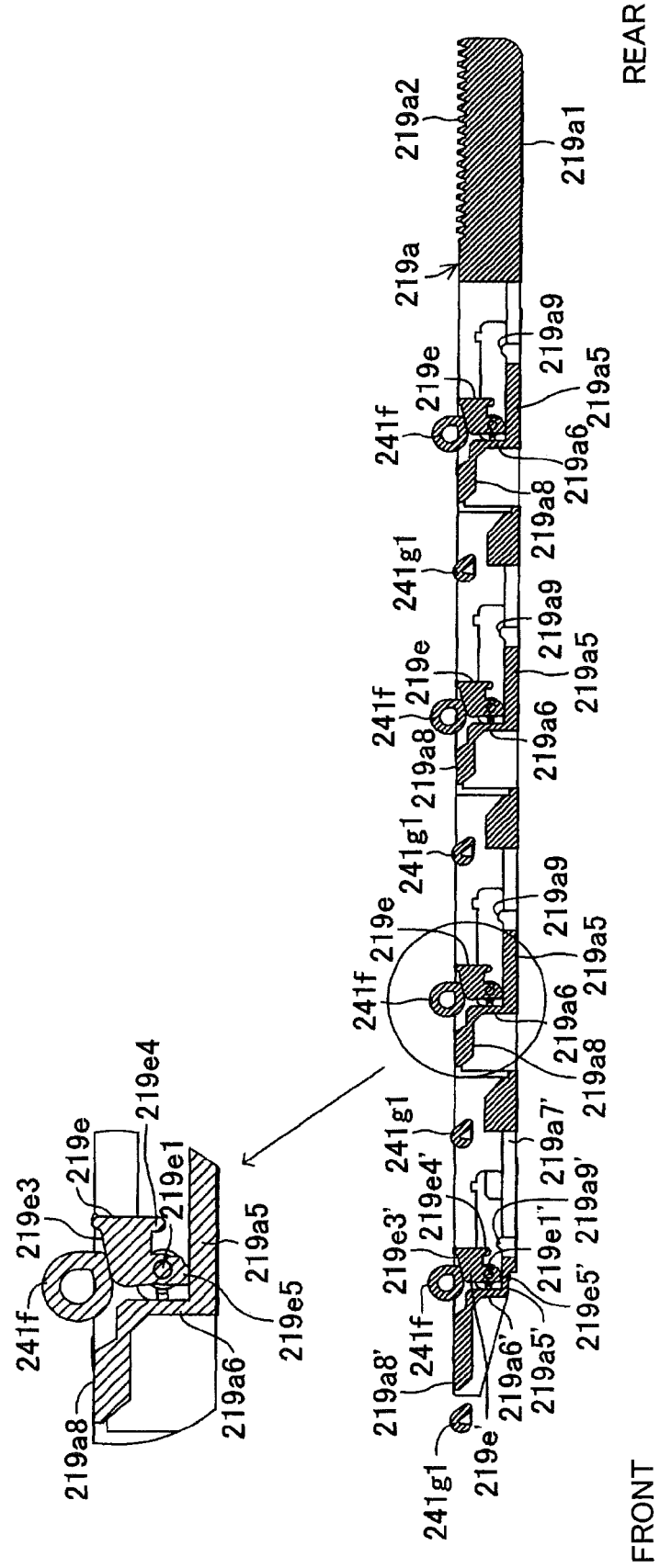

DEVELOPING CARTRIDGE

CROSS REFERENCE TO RELATED APPLICATIONS

This application is a continuation of prior U.S. application Ser. No. 13/493,022, filed Jun. 11, 2012, which is a continuation of prior U.S. application Ser. No. 13/213,924, filed Aug. 19, 2011, which issued Jul. 3, 2012 as U.S. Pat. No. 8,213,826B2, which is a continuation of prior U.S. application Ser. No. 12/728,804, filed Mar. 22, 2010, which issued Sep. 6, 2011 as U.S. Pat. No. 8,014,694B2, which is a continuation of prior U.S. application Ser. No. 11/456,224, filed Jul. 10, 2006, which issued Apr. 6, 2010 as U.S. Pat. No. 7,693,443B2, which is a continuation-in-part of prior U.S. application Ser. No. 11/391,220, filed Mar. 29, 2006, which issued Apr. 6, 2010 as U.S. Pat. No. 7,693,442B2, which claims priority to Japanese Patent Application Nos. 2005-200510 filed Jul. 8, 2005, 2005-259644 filed Sep. 7, 2005 and 2005-376522 filed Dec. 27, 2005, the entire contents of which are incorporated herein by reference.

TECHNICAL FIELD

Aspects of the invention relate to an image forming apparatus and a developing cartridge for use in image forming apparatuses, such as laser printers.

BACKGROUND

A developing cartridge that generally contains toner is removably installed in a main body of an image forming apparatus, such as a laser printer. The developing cartridge is provided in its case with a toner chamber configured to contain toner, an agitator rotatably disposed in the toner chamber, a supply roller configured to supply the toner, a developing roller configured to carry the toner thereon, a layer-thickness regulating blade configured to form a thin layer of toner on the developing roller.

As the developing cartridge is driven after being installed in the main body, the toner in the toner chamber is supplied to the supply roller according to the rotation of the agitator. Thereafter, the toner is supplied to the developing roller in accordance with the rotation of the supply roller. Then, the toner passes between the layer-thickness regulating blade and the developing roller in accordance with the rotation of the developing roller, and is carried on the developing roller as a think layer. A developing bias is applied to the developing roller. An electrostatic latent image formed on a photoconductive drum is developed by the toner carried on the developing roller.

The developing cartridge includes a gear mechanism configured to drive the developing roller, the supply roller, and the agitator. For example, Japanese Laid-Open Patent Publication No. 2003-295614 discloses the gear mechanism provided in one sidewall of the case of the developing cartridge. The gear mechanism in the developing cartridge includes an input gear to which the drive force is input from the main body of the image forming apparatus.

A bearing member configured to support an end of the developing roller is provided on the other sidewall of the case of the developing cartridge. The bearing member is integrally formed with a feeding member configured to apply developing bias to the developing roller.

In the developing cartridge disclosed in Japanese Laid-Open Patent Publication No. 2003-295614, a line, parallel to the developing roller shaft, passing through the input gear provided on one sidewall and another line, parallel to the developing roller shaft, passing through the feeding member provided on the other sidewall, are disposed parallel to each other with some distance therebetween. If such rotation or torsion power is exerted on the developing cartridge that produces rotation or torsion of the developing cartridge about the input gear when drive force is input to the input gear from the main body of the image forming apparatus, the feeding member provided on the other sidewall is placed out of position, resulting in poor power supply or power feeding from the main body of the image forming apparatus.

SUMMARY

Aspects provide an image forming apparatus and a developing cartridge that stably feeds or supplies power to a developing roller shaft even when a drive force is directly transmitted from a drive coupling of an image forming apparatus to a driven coupling of the developing cartridge.

BRIEF DESCRIPTION OF THE DRAWINGS

Illustrative aspects will be described in detail with reference to the following figures wherein:

FIG. 17 is a perspective view of the process cartridge viewed from an upper front right side;

FIG. 35A is a side view of the developing cartridge, shown in FIG. 27, in a non-pressing (retracted) state (position);

FIG. 35B is a side view of the developing cartridge, shown in FIG. 27, in a pressing state (position);

FIG. 36A is an enlarged cross-sectional side view of a press actuation mechanism, shown in FIG. 35A, in the non-pressing state (position);

FIG. 36B is an enlarged cross-sectional side view of the press actuation mechanism, shown in FIG. 35B, in the pressing state (position);

FIG. 43A is an enlarged perspective view of the bar cam member and the supplemental cam members shown in FIG. 41, wherein the bar cam member is in the foremost position;

FIG. 43B is an enlarged perspective view of the bar cam member and the supplemental cam members shown in FIG. 41, wherein the bar cam member is in the rearmost position;

FIG. 44 is a cross-sectional side view of the bar cam member and the supplemental cam members when the bar cam member shown in FIG. 43B is in the rearmost position;

DETAILED DESCRIPTION

It is noted that various connections are set forth between elements in the following description. It is noted that these connections in general and, unless specified otherwise, may be direct or indirect and that this specification is not intended to be limiting in this respect.

Figure 1:
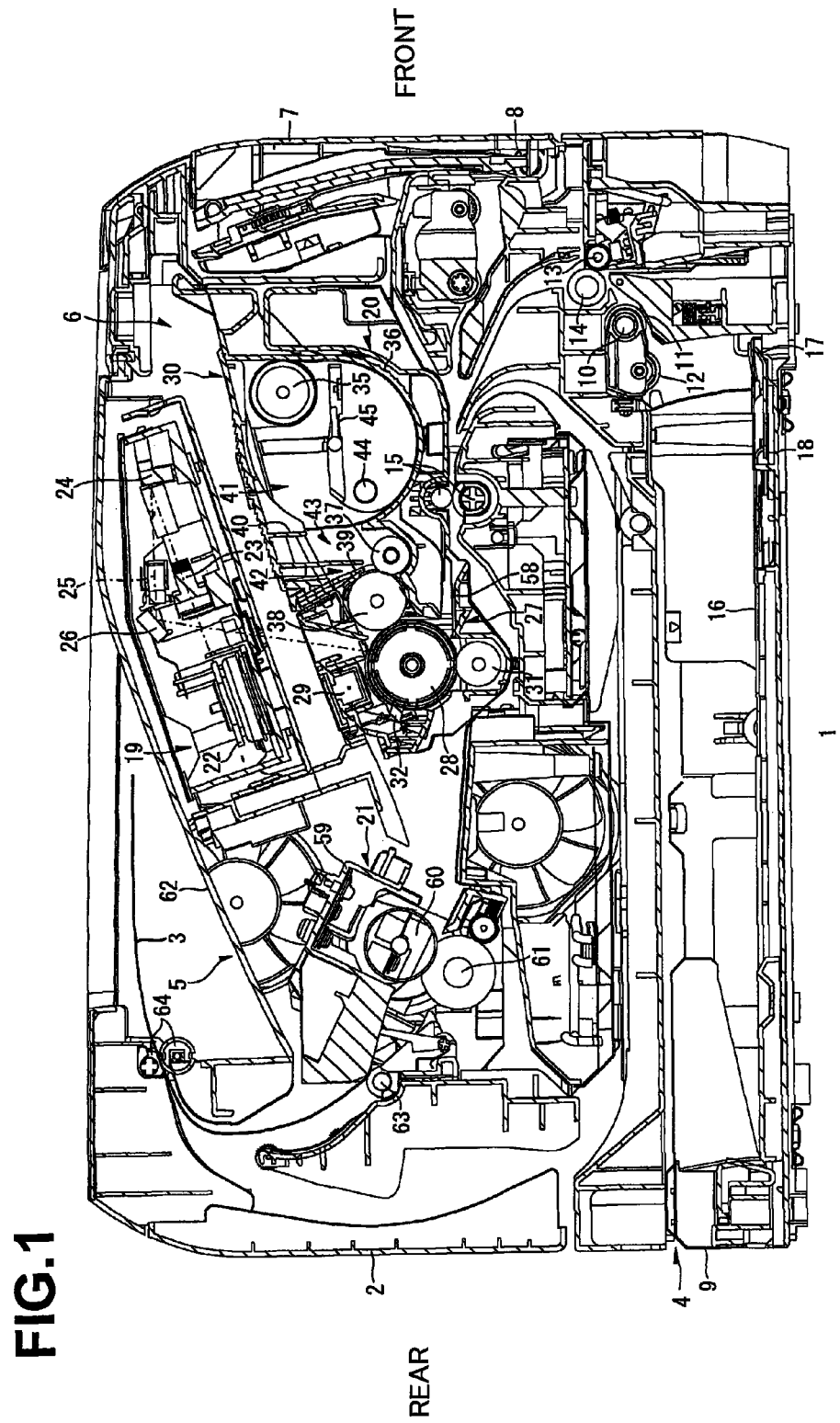
FIG. 1 is a sectional side view of a general configuration of a laser printer, as an image forming apparatus, according to an illustrative aspect.
Figure 2:
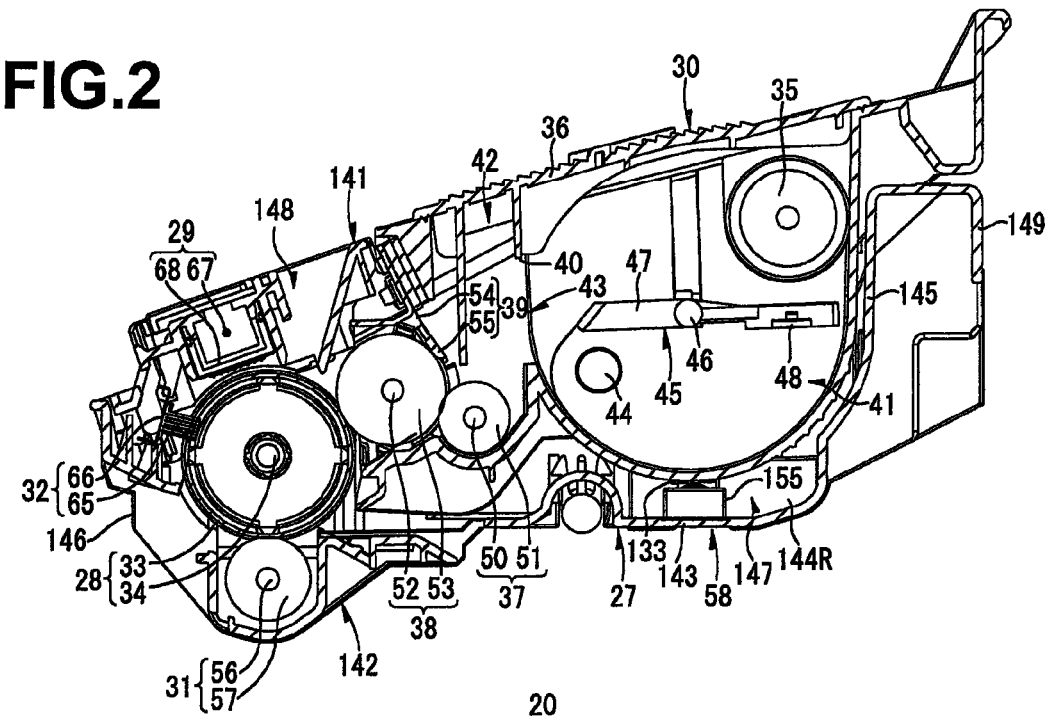
FIG. 2 is a sectional side view of a process cartridge for use in the laser printer shown in FIG. 1 according to an illustrative aspect.
Figure 3:
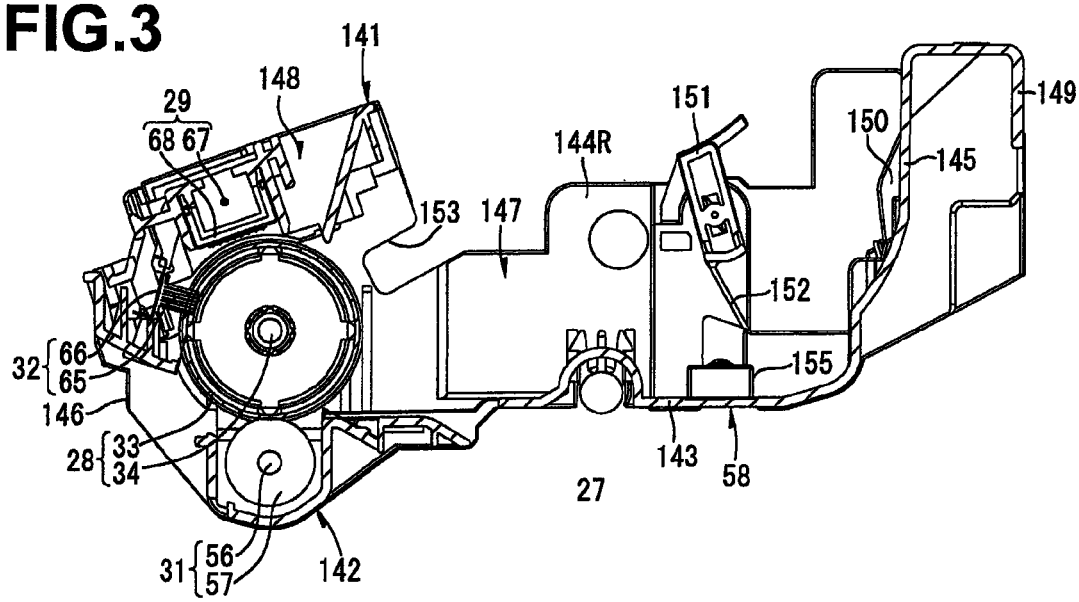
FIG. 3 is a sectional side view of a drum cartridge for use in the laser printer shown in FIG. 1 according to an illustrative aspect.
Figure 4:
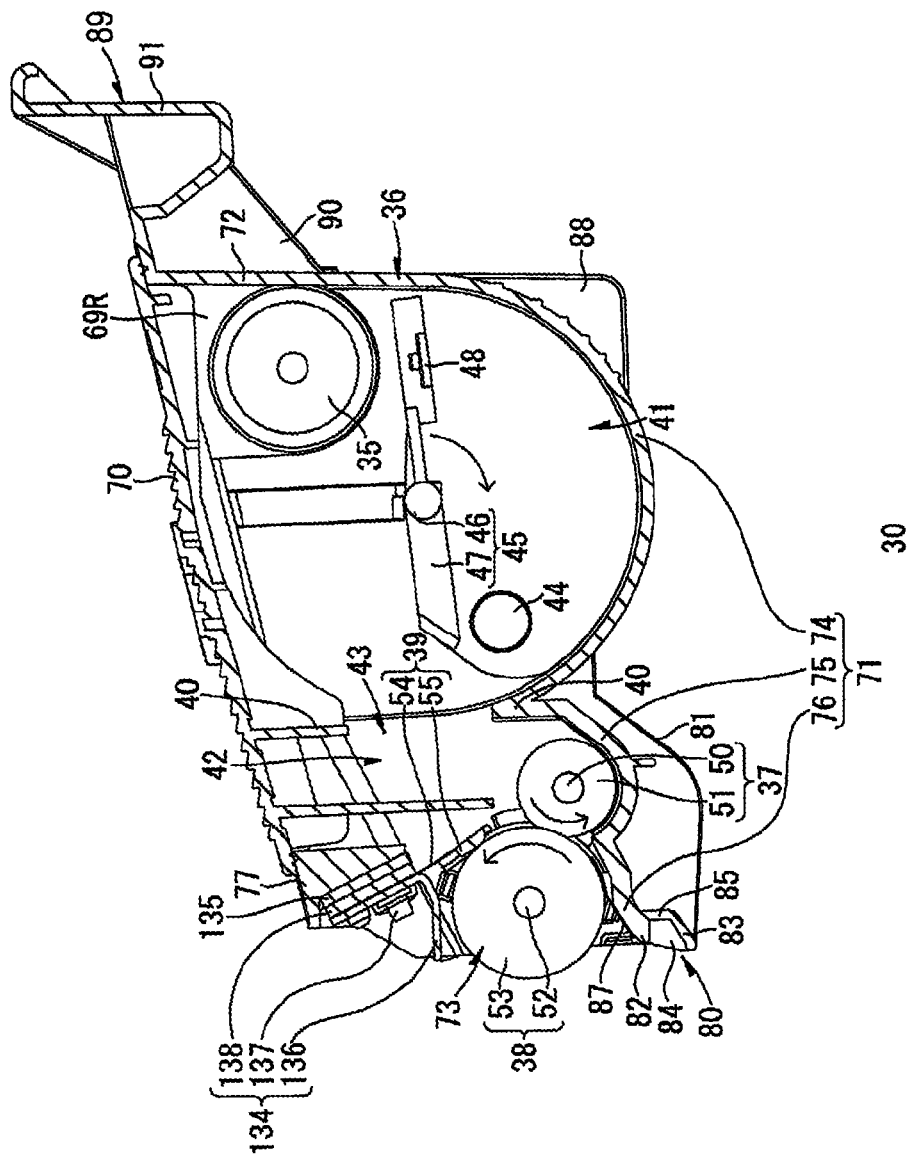
FIG. 4 is a sectional side view of a developing cartridge for use in the laser printer shown in FIG. 1 according to an illustrative aspect.

Illustrative aspects will be described with reference to the accompanying drawings. FIG. 1 is a sectional side view of a general configuration of a laser printer in which a developing cartridge is installed according to an illustrative aspect. FIG. 2 is a sectional side view of a process cartridge for use in the laser printer shown in FIG. 1 according to an illustrative aspect. FIG. 3 is a sectional side view of a drum cartridge for use in the laser printer shown in FIG. 1 according to an illustrative aspect. FIG. 4 is a sectional side view of the developing cartridge for use in the laser printer shown in FIG. 1 according to an illustrative aspect.

As shown in FIG. 1, a laser printer 1 includes a main body casing 2, and a feeder unit 4 that supplies a sheet 3 and an image forming unit 5 that forms an image on the supplied sheet 3. The feeder unit 4 and the image forming unit 5 are disposed in the main body casing 2.

(1) Main Casing

Formed at a front side of the main body casing 2 (left side in FIG. 1) is an opening 6 through which a process cartridge 20 is inserted into or removed from the main body casing 2. A front cover 7 for opening and closing the opening 6 is provided at the front side of the main body casing 2. The front cover 7 is pivotally supported by a cover shaft 8, which is inserted into a lower end portion of the front cover 7. When the front cover 7 is pivotally closed about the cover shaft 8, the opening 6 is closed with the front cover 7. When the front cover 7 is pivotally opened about the cover shaft 8, the opening 6 is open. Thus, the process cartridge 20 can be inserted into or removed from the main body casing 2 through the opening 6.

In the following description, the side on which the front cover 7 is provided when the process cartridge 20 is installed in the main body casing 2, is defined as the front side of the laser printer 1/process cartridge 20 (including a developing cartridge 30), and the side opposite to the front side is defined as the rear side.

(2) Feeder Unit

As shown in FIG. 1, the feeder unit 4 is provided, at a bottom portion in the main body casing 2, with a sheet supply tray 9 slidably installable in the main body casing 2 along the front-rear direction, a separation roller 10 and a separation pad 11 provided at upper front end portions of the sheet supply tray 9, and a pickup roller 12 provided at a rear side of the separation roller 10 (upstream side of the separation pad 11 in a sheet feeding direction). The feeder unit 4 further includes a sheet powder removing roller 13 provided at an upper front portion of the separation roller 10 (downstream side of the separation roller 10 in the sheet feeding direction) and a pinch roller 14 disposed to face the sheet powder removing roller 13.

The feeder unit 4 includes a pair of register rollers 15 disposed below the process cartridge 20 when installed, in a sheet feed path downstream of a U-turned portion thereof that makes a U-turn near the sheet powder removing roller 13 toward the rear side. Provided inside the sheet supply tray 9 is a sheet mount plate 16 configured to mount a stack of sheets 3 thereon. The sheet mount plate 16 is pivotable between a mounting position where the sheet mount plate 16 is substantially parallel to a bottom plate of the sheet supply tray 9 with a front end of the sheet mount plate 16 at a lower position and a supply position where the sheet mount plate 16 is at an angle with the front end thereof at a higher position.

A lever 17 for raising the front end of the sheet mount plate 16 is provided at the front end of the sheet supply tray 9. The lever 17 is supported at an underside of the front end portion of the sheet mount tray 16 so as to pivot about a lever shaft 18 disposed at a rear end of the lever 17. The lever 17 is pivotable between a parallel position where the front end of the lever 17 is substantially parallel to the bottom plate of the sheet supply tray 9 and an angled position where the front end of the lever 17 is at an angle to raise the sheet mount plate 16. When drive force is input to the lever shaft 18, the lever 17 pivots about the lever shaft 18. Accordingly, the front end of the lever 17 raises the front end of the sheet mount plate 16 to move the sheet mount plate 16 to the supply position.

As the sheet mount plate 16 is placed in the supply position, an uppermost sheet 3 on the sheet mount plate 16 is pressed against the pickup roller 12, and is fed to a separation position between the separation roller 10 and the separation pad 11, by the rotation of the pickup roller 12.

When the sheet supply tray 9 is removed from the main body casing 2, the sheet mount plate 16 is placed in the mounting position. As the sheet mount plate 16 is in the mounting position, a stack of sheets 3 can be mounted on the sheet mount plate 16.

The sheets 3 fed toward the separation position by the pickup roller 12 are separated one by one when sandwiched between the separation roller 10 and the separation pad 11 by the rotation of the separation roller 10. The fed sheet 3 passes through a portion between the sheet powder removing roller 13 and the pinch roller 14 where sheet powders or fibers are removed. Then, the sheet 3 is fed along the U-turned sheet feed path toward the register rollers 15.

The register rollers 15 register the sheet 3 or reduce the skew of the sheet 3. Then, the register rollers 15 feed the sheet 3 to a transfer position between a photoconductive drum 28, as a photoconductive member, and the transfer roller 31 where a toner image on the photoconductive drum 28 is transferred to the sheet 3.

Image Forming Unit

The image forming unit 5 includes a scanner unit 19, the process cartridge 20, and a fixing unit 21.

(a) Scanner Unit

The scanner unit 19 is disposed at an upper portion in the main body casing 2. The scanner unit 19 includes a laser light source (not shown), a polygon mirror 22 that is driven so as to spin, an fθ lens 23, a reflecting mirror 24, a lens 25, and a reflecting mirror 26. As shown in chain lines in FIG. 1, a laser beam emitted from the laser light source based on image data is deflected by the polygon mirror 22 and passes through the fθ lens 23. Then, the laser beam is reflected off the reflecting mirror 24, and directed, through the lens 25, to the reflecting mirror 26 where the laser beam is bent downward toward the surface of the photoconductive drum 28 of the process cartridge 20. Thus, the surface of the photoconductive drum 28 is irradiated with the laser beam.

(b) Process Cartridge

The process cartridge 20 is removably installed in the main body casing 2 below the scanner unit 19, through the opening 6. As shown in FIG. 2, the process cartridge 20 includes a drum cartridge 27, as a photoconductive cartridge, and a developing cartridge 30 according to at least one illustrative aspect, that is removably set in the drum cartridge 27.

(b-1) Drum Cartridge

As shown in FIG. 3, the drum cartridge 27 includes a drum frame 58, and the photoconductive drum 28, a scorotron charger 29, the transfer roller 31 and a cleaning member 32 that are disposed in the drum frame 58.

The drum frame 58 includes an upper frame 141 that supports the charger 29 and the cleaning member 32, and a lower frame 142 that supports the photoconductive drum 28 and the transfer roller 31.

Figure 16:
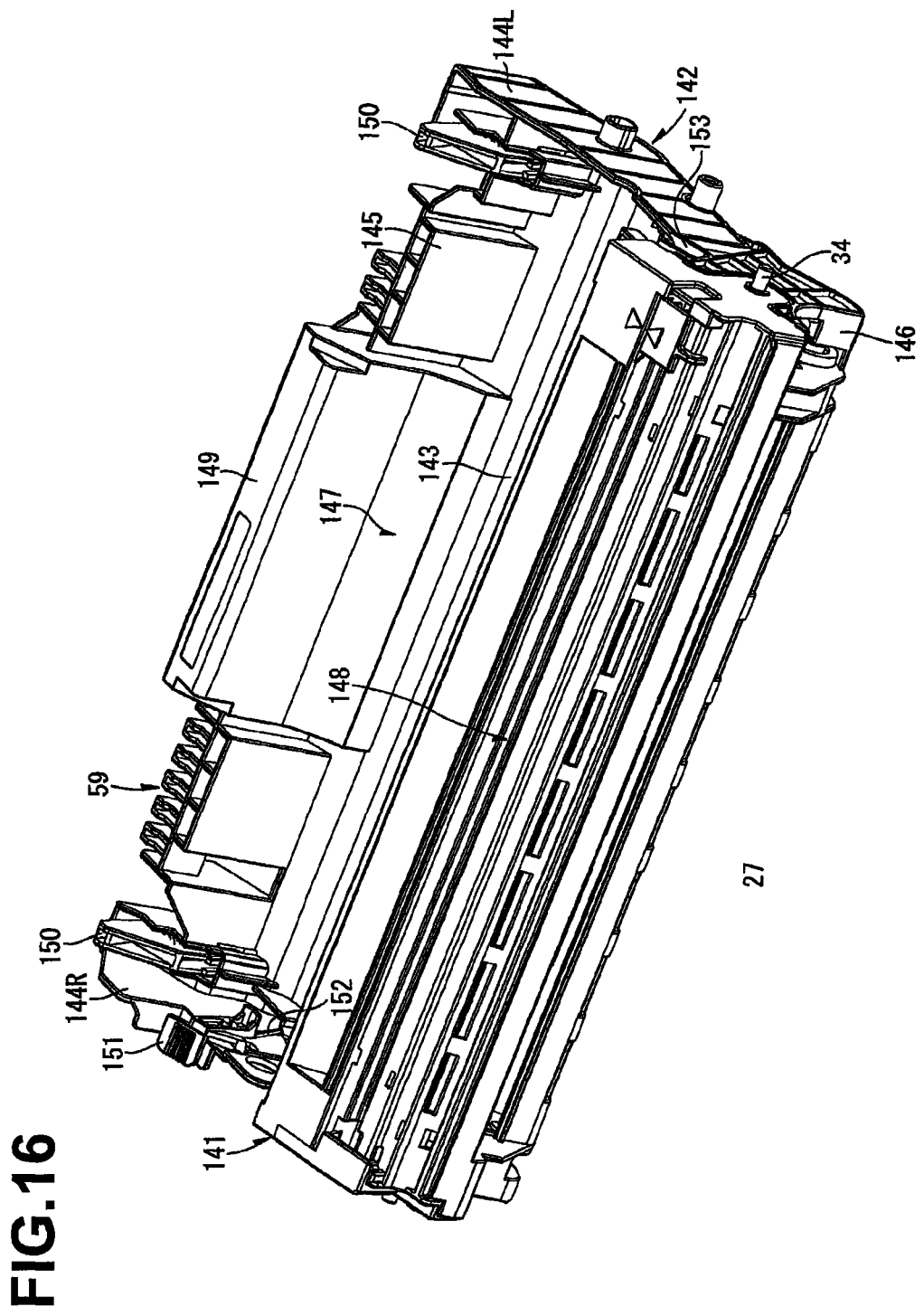
FIG. 16 is a perspective view of the drum cartridge viewed from an upper rear left side.

As shown in FIGS. 3 and 16, the lower frame 142 is provided with a bottom wall 143, left and right sidewalls 144L, 144R, a front wall 145 and a rear wall 146 that are integrally formed so as to open upward. The bottom wall 143 is of substantially rectangular plate shape. The left and right sidewalls 144L, 144R are disposed so as to face each other at the left and right ends of the bottom wall 143. The front wall 145 is disposed at the front end of the bottom wall 143. The rear wall 146 is disposed at the rear end of the bottom wall 143.

The front part of the lower frame 142 is defined as a developing cartridge installation portion 147 in which the developing cartridge 30 is installed. The rear part of the lower frame 142 is defined as a drum supporting portion 148 where the lower frame 142 and the upper frame 141 face each other in the vertical direction and the photoconductive drum 28 is supported.

As shown in FIG. 3, the photoconductive drum 28 includes a cylindrical drum body 33 having at its outermost surface a positively chargeable photoconductive layer made from, for example, polycarbonate and the metal drum shaft 34 disposed at an axis of the drum body 33 along an axial direction of the drum body 33. The drum shaft 34 is supported by the left sidewall 144L and the right sidewall 144R of the lower frame 142. The drum body 33 is rotatably supported on the drum shaft 34. The photoconductive drum 28 is driven so as to rotate on the drum shaft 34 by the input of the drive force from a motor (not shown) during image formation.

The scorotron charger 29 is supported by the upper frame 141 at an upper rear portion of the photoconductive drum 28. The scorotron charger 29 is disposed so as to face the photoconductive drum 28 with a predetermined distance therebetween, to prevent the scorotron charger 29 from contacting the photoconductive drum 28. The charger 29 includes a wire 67 disposed to face the photoconductive drum 28 with a predetermined distance therebetween and a grid 68 disposed between the wire 67 and the photoconductive drum 28 to control the amount of electric charge from the wire 67 to the photoconductive drum 28. During image formation, bias voltage is applied to the grid 68. At the same time, high voltage is applied to the wire 67, to generate corona discharge from the wire 67. Thus, the surface of the photoconductive drum 28 is uniformly and positively charged by the charger 29.

The transfer roller 31 is disposed in the lower frame 142 below the photoconductive drum 28. The transfer roller 31 contacts the photoconductive drum 28 in the vertical direction so as to form a nip portion between the transfer roller 31 and the photoconductive drum 28. The transfer roller 31 includes a metal transfer roller shaft 56 covered by a rubber roller 57 formed of a conductive rubber material. The transfer roller shaft 56 is rotatably supported by the left and right sidewalls 144L, 142R of the lower frame 142. During transfer of the toner on the sheet 3 (during image formation), drive force is input from a motor (not shown) to rotate the transfer roller 31. A transfer bias is applied to the transfer roller 31 during transfer of the toner onto the sheet 3.

The cleaning member 32 is supported by the upper frame 141 behind the photoconductive drum 28 so as to face the drum 28. The cleaning member 32 includes a cleaning brush 65 to catch the sheet powders or fibers on the photoconductive drum 28, and a supporting plate 66 that supports the cleaning brush 65 opposite to the photoconductive drum 28 with respect to the cleaning brush 65 (behind the photoconductive drum 28).

The cleaning brush 65 includes non-woven fabric with many conductive fiber-like brush bristles fixed thereon. The cleaning brush 65 is attached to the supporting plate 66 by double-sided adhesive tape. The cleaning brush 65 is disposed to contact the photoconductive drum 28. The supporting plate 66 is supported by the upper frame 141 while supporting the cleaning brush 65.

The direction parallel to the drum shaft 34 of the photoconductive drum 28 may be referred to as the "first direction". The direction perpendicular to the first direction directed toward the front side of the main body casing 2 may be referred to as the "second direction". In the developing cartridge installation portion 147, a handle 149, which is held during installation or removal of the drum cartridge 27, is formed on the substantially central portion of the front wall 145 in the first direction.

Disposed at each end of the front wall 145 with respect to the first direction is a pressing lever 150 that presses the developing cartridge 30 installed in the developing cartridge installation portion 147 toward the rear side, to firmly press the developing roller 38 against the photoconductive drum 28. Each pressing lever 150 is formed of a thick plate and into a substantially triangular shape in side view. The lower end of each pressing lever 150 is pivotally supported by a fixed shaft (not shown) extending inwardly in the first direction from each sidewall 144L, 144R.

A compression spring (not shown) is disposed between each pressing lever 150 and the front wall 145. Therefore, each pressing lever 150 is always pressed or inclined rearward by an urging force of the compression spring.

A lock lever 151 is provided on one sidewall (right sidewall 144R) with some distance between the lock lever 151 and one of the pressing levers 150 in the front-rear direction. The lock lever 151 is of substantially a rectangular shape in side view. The lock lever 151 is provided with a flexible portion 152 extending downward from the lock lever 151. The lock lever 151 is pivotally supported by the right sidewall 144R with the flexible portion 152 engaged with a rib (not shown) formed on the bottom wall 143.

Disposed in the developing cartridge installation portion 147 at the rear ends of the left and right sidewalls 144L, 144R are guide grooves 153 along which a collar member 116 and a developing roller shaft covering portion 118, which will be described below, are guided to install the developing cartridge 30 in the developing cartridge installation portion 147. As shown in FIGS. 2 and 3, formed in the developing cartridge installation portion 147 slightly forward of the central portion of the bottom wall 143 in the second direction are installation bases 155 on which installation portions 133 of the developing cartridge 30 are placed.

(b-2) Developing Cartridge

Figure 17:
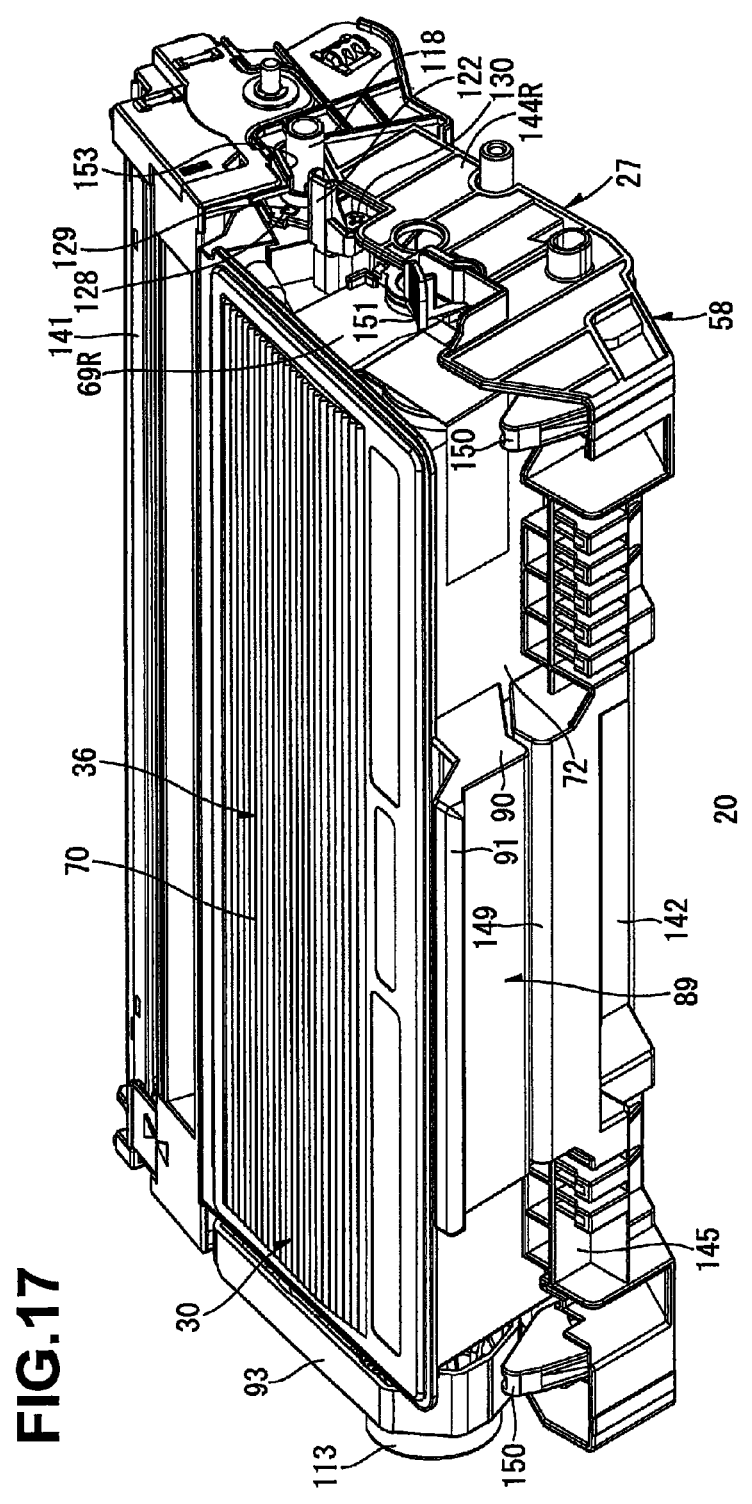

As shown in FIGS. 16 and 17, the developing cartridge 30 is removably installed in the developing cartridge installation portion 147 of the lower frame 142 when the process cartridge 20 is separated or removed from the main body casing 2. As shown in FIG. 4, the developing cartridge 30 includes a developing frame 36 and a supply roller 37, a developing roller 38, and a layer-thickness regulating blade 39 that are disposed in the developing frame 36.

The developing frame 36 is formed into a box-shape that is open rearward. Disposed in the developing frame 36 are a partition plate 40, and a toner chamber 41 and a developing chamber 42 that are partitioned by the partition plate 40. The partition plate 40 is disposed in the middle of the developing frame 36 in the second direction, so as to divide the developing frame 36 in the front-rear direction. A port 43 is formed in the middle portion of the partition plate 40 in the vertical direction.

The toner chamber 41 is defined in an internal space of the developing frame 36 on the front side thereof partitioned by the partition plate 40. The toner chamber 41 contains positively chargeable nonmagnetic single-component toner as a developing agent. The toner is, for example, polymerized toner that is obtained by copolymerizing polymerizable monomers using a polymerization method, such as a suspension polymerization method. The polymerizable monomers may be styrene-based monomers, such as styrene, and acrylic-based monomers, such as acrylic acid, alkyl (C1-C4) acrylate, and alkyl (C1-C4) methacrylate. The particle of such polymerized toner is of a substantially spherical shape, and thus the polymerized toner has excellent fluidity and contributes to high-quality image formation.

The toner is mixed with wax and a coloring agent, such as carbon black, as well as an external additive, such as silica, to improve the fluidity of the toner. Average toner particle sizes are approximately 6 to 10 µm.

Figure 15:
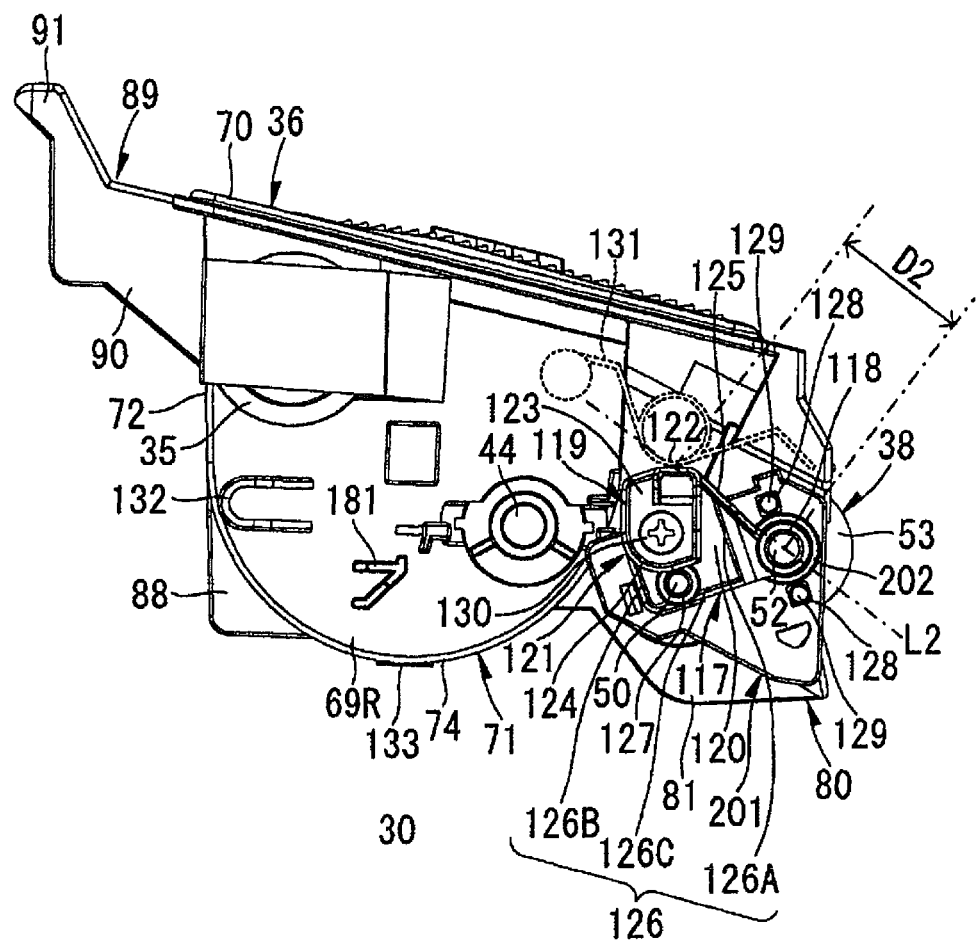
FIG. 15 is a right side view of the developing cartridge.

A toner filling port through which the toner is supplied into the toner chamber 41 is formed at left and right sidewalls 69L, 69R (described below) of the developing frame 36 in the toner chamber 41. The toner filling port is covered with a toner cap 35, as shown in FIG. 15.

Figure 13:
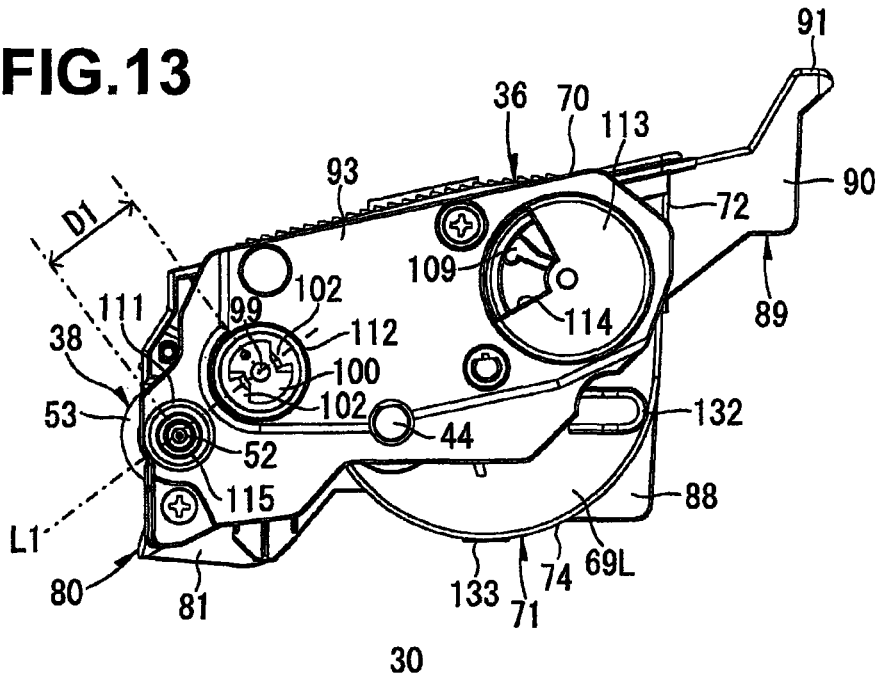
FIG. 13 is a left side view of the developing cartridge with a gear cover attached to the developing cartridge.
Figure 14:
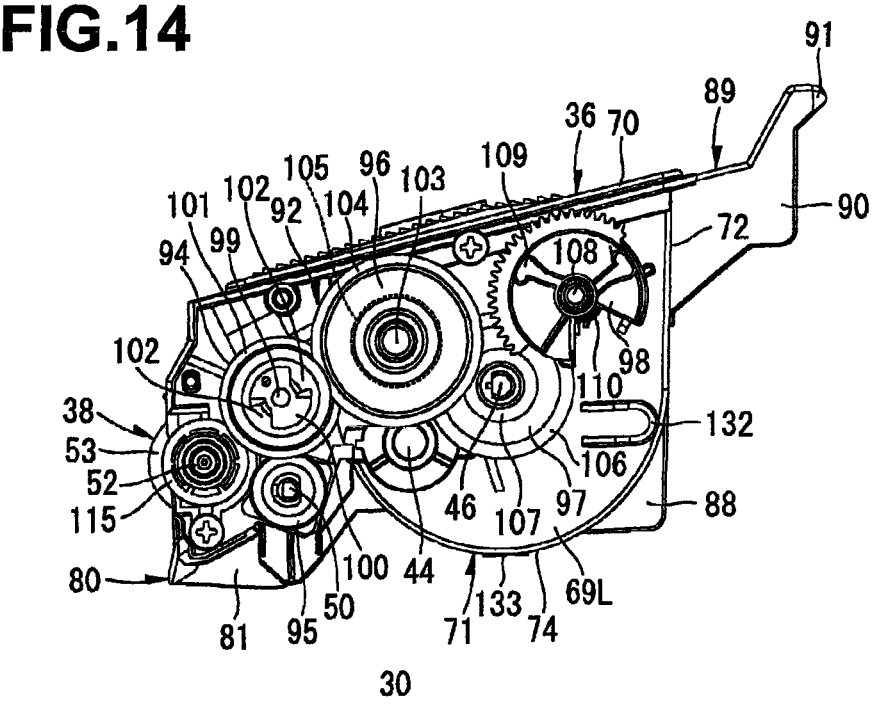
FIG. 14 is a left side view of the developing cartridge with a gear cover detached from the developing cartridge.

A toner detection window 44 for detecting a residual toner amount is provided on each of the left and right sidewalls 69L, 69R of the developing frame 36 in the toner chamber 41. The toner detection windows 44 are formed on the left and right sidewalls 69L, 69R of the developing frame 36 near the partition plate 40 so as to face each other along a width direction of the developing cartridge 30 (perpendicular to the front-rear direction and the vertical direction). Each toner detection window 44 is formed by embedding a transparent disk plate in an opening formed in the left and right sidewalls 69L, 69R of the developing frame 36, as shown in FIGS. 13, 14 and 15.

An agitator 45 that agitates the toner in the toner chamber 41 is provided in the toner chamber 41. The agitator 45 is provided with an agitator rotating shaft 46 and an agitating member 47. The agitator rotating shaft 46 is rotatably supported by the left and right sidewalls 69L, 69R of the developing frame 36 at a substantially central portion of the toner chamber 41. The agitating member 47 is provided on the agitator rotating shaft 46. Drive force from a motor (not shown) is input to the agitator rotating shaft 46 to rotate the agitator 45 during development (during image formation).

The agitator 45 is provided with wipers 48. Each wiper 48 is provided on each end of the agitator rotating shaft 46 with respect to its axial direction. When the agitator rotating shaft 46 rotates, each wiper 48 pivotally moves about the agitator rotating shaft 46 in a circumferential direction in the toner chamber 41, to wipe off the toner detection windows 44 provided on the left and right sidewalls 69L, 69R of the developing frame 36. Thus, the toner detection windows 44 are wiped off by the wipers 48.

The developing chamber 42 is defined in an internal space of the developing frame 36 on the rear side thereof partitioned by the partition plate 40. The supply roller 37 is disposed behind the port 43 above a central bottom wall 75 (described below). The supply roller 37 includes a metal supply roller shaft 50 covered by a sponge roller 51, as a supply roller member, formed of a conductive foaming material. The supply roller shaft 50 is rotatably supported by the left and right sidewalls 69L, 69R of the developing frame 36 in the developing chamber 42. Each end of the supply roller shaft 50 extends outward from the left and right sidewall 69L, 69R. Drive force from a motor (not shown) is input to the supply roller shaft 50 to rotate the supply roller 37 during development (during image formation). The same bias as the developing bias, which is applied to the developing roller 38, is applied to the supply roller 37 during development (during image formation).

The developing roller 38 is disposed in the developing chamber 42 behind the supply roller 37 and above a rear bottom wall 76 (described below), as shown in FIG. 4. The developing roller 38 contacts the supply roller 37, so as to apply some pressures to each other. The developing roller 38 includes a metal developing roller shaft 52 covered by a rubber roller 53, as a developing roller member, formed of conductive rubber material. The developing roller shaft 52 extends parallel to the supply roller shaft 50. The developing roller shaft 52 is rotatably supported by the left and right sidewalls 69L, 69R (described below) of the developing frame 36 in the developing chamber 42.

Each end of the developing roller shaft 52 extends outward from the left and right sidewall 69L, 69R (described below). The rubber roller 53 is formed of a conductive urethane or silicone rubber including fine carbon particles. A surface of the rubber roller 53 is coated with urethane rubber or silicone rubber including fluorine. Drive force is input to the developing roller shaft 52 from a motor (not shown) to rotate the developing roller 38 during development (during image formation). The developing bias is applied to the developing roller 38 during development (during image formation).

The layer-thickness regulating blade 39 includes a blade body 54 formed of metal leaf spring member and a pressing portion 55 that has a semicircular cross-sectional shape and is formed of insulating silicone rubber. The pressing portion 55 is provided at a free end of the blade body 54. A base end, opposite to the free end, of the blade body 54 of the layer-thickness regulating blade 39 is supported above the developing roller 38 in a blade attachment portion 77 (described below) by an attachment member 134. The free end of the blade body 54 extends obliquely downward and frontward toward the supply roller 37. The pressing portion 55 is pressed against the developing roller 38 by elastic force of the blade body 54.

(b-3) Development and Transfer Operations

During image formation, drive force from a motor (not shown) is input to the agitator rotating shaft 46 so that the agitating member 47 is pivotally moved about the agitator rotating shaft 46 in a circumferential direction in the toner chamber 41. Accordingly, toner in the toner chamber 41 is agitated by the agitating member 47, and is discharged toward the developing chamber 42, through the port 43 formed in the middle portion of the partition plate 40 in the vertical direction so as to allow the fluid communication in the front-rear direction.

The toner discharged through the port 43 toward the developing chamber 42 is supplied to the rubber roller 53 of the developing roller 38 by the sponge roller 51 of the supply roller 37, in accordance with the rotation of the supply roller shaft 50. At this time, the toner is positively charged by the friction between the sponge roller 51 of the supply roller 37 and the rubber roller 53 of the developing roller 38. The toner supplied onto the rubber roller 53 of the developing roller 38 passes between the pressing portion 55 of the layer-thickness regulating blade 39 and the rubber roller 53 of the developing roller 38, in accordance with the rotation of the developing roller shaft 52. The toner is carried on the rubber roller 53 of the developing roller 38, as a thin layer whose thickness has been regulated.

As shown in FIG. 2, while the photoconductive drum 28 rotates, the surface of the drum body 33 is uniformly and positively charged by the scorotron charger 29. Then, a laser beam from the scanner unit 19 scans across the surface of the drum body 33 at high speed, thereby forming, on the surface of the drum body 33, an electrostatic latent image corresponding to an image to be formed on the sheet 3.

Thereafter, as the toner, which is carried on the rubber roller 53 of the developing roller 38 and positively charged, makes contact with the drum body 33 of the photoconductive drum 28 in accordance with the rotation of the developing roller shaft 52, the toner is supplied to the electrostatic latent image formed on the surface of the drum body 33, that is, parts exposed to the laser beam, where the potential level is lower than the remaining part of the drum body 33 surface uniformly positively charged. Thus, the electrostatic latent image on the drum body 33 is made visible. Thus, a toner image is formed on the drum body 33 by reverse developing.

Then, the toner image carried on the surface of the drum body 33 is transferred onto the sheet 3, with the application of the transfer bias to the rubber roller 57 of the transfer roller 31, while the sheet 3 conveyed by the register rollers 15 passes through the transfer position between the drum body 33 and the rubber roller 57 of the transfer roller 31. The sheet 3 having the toner image transferred thereon is fed to the fixing unit 21.

The toner remaining on the surface of the drum body 33 after the toner image transfer is collected by the rubber roller 53 of the developing roller 38. Sheet powders or fibers attached to the surface of the drum body 33 after the toner image transfer due to the contact to the sheet 3, is removed by the cleaning brush 65 of the cleaning member 32 from the surface of the drum body 33 of the photoconductive drum 28.

(c) Fixing Unit

As shown in FIG. 1, the fixing unit 21 is provided behind the process cartridge 20, with some distance between the photoconductive drum 28 of the process cartridge 20 and the fixing unit 21 in the substantially horizontal direction. The fixing unit 21 includes a unit frame 59, and a heat roller 60 and a pressure roller 61 that are disposed in the unit frame 59.

The heat roller 60 includes a metal tube whose surface is coated with fluorocarbon resin and a halogen lamp inserted into the metal tube for heat application. The heat roller 60 is rotated by an input of power from a motor (not shown) during fixing (during image formation).

The pressure roller 61 is disposed below the heat roller 60 opposite to the heat roller 60, so as to press against the heat roller 60. The pressure roller 61 includes a metal roller shaft covered by a rubber roller formed of a rubber material. The pressure roller 61 is driven by the rotation of the heat roller 60.

In the fixing unit 21, the toner image transferred onto the sheet 3 at the transfer position is thermally fixed while the sheet 3 passes between the heat roller 60 and the pressure roller 61. The sheet 3 having the toner image fixed thereon is conveyed toward a sheet output tray 62 formed on the top surface of the main body casing 2. A sheet output path from the fixing unit 21 to the sheet output tray 62 is formed into a substantially "U" shape, so as to turn toward the front side from the fixing unit 21. A feeding roller 63 is disposed in the sheet output path. Output rollers 64 are disposed at downstream end portions of the sheet output path.

The sheet 3 that is subjected to the thermal fixing process in the fixing unit 21 is conveyed to the sheet output path. The sheet 3 is fed to the output rollers 64 by the feeding roller 63. Then, the sheet 3 is output on the sheet output tray 62 by the output rollers 64.

2. Developing Cartridge

Figure 5:
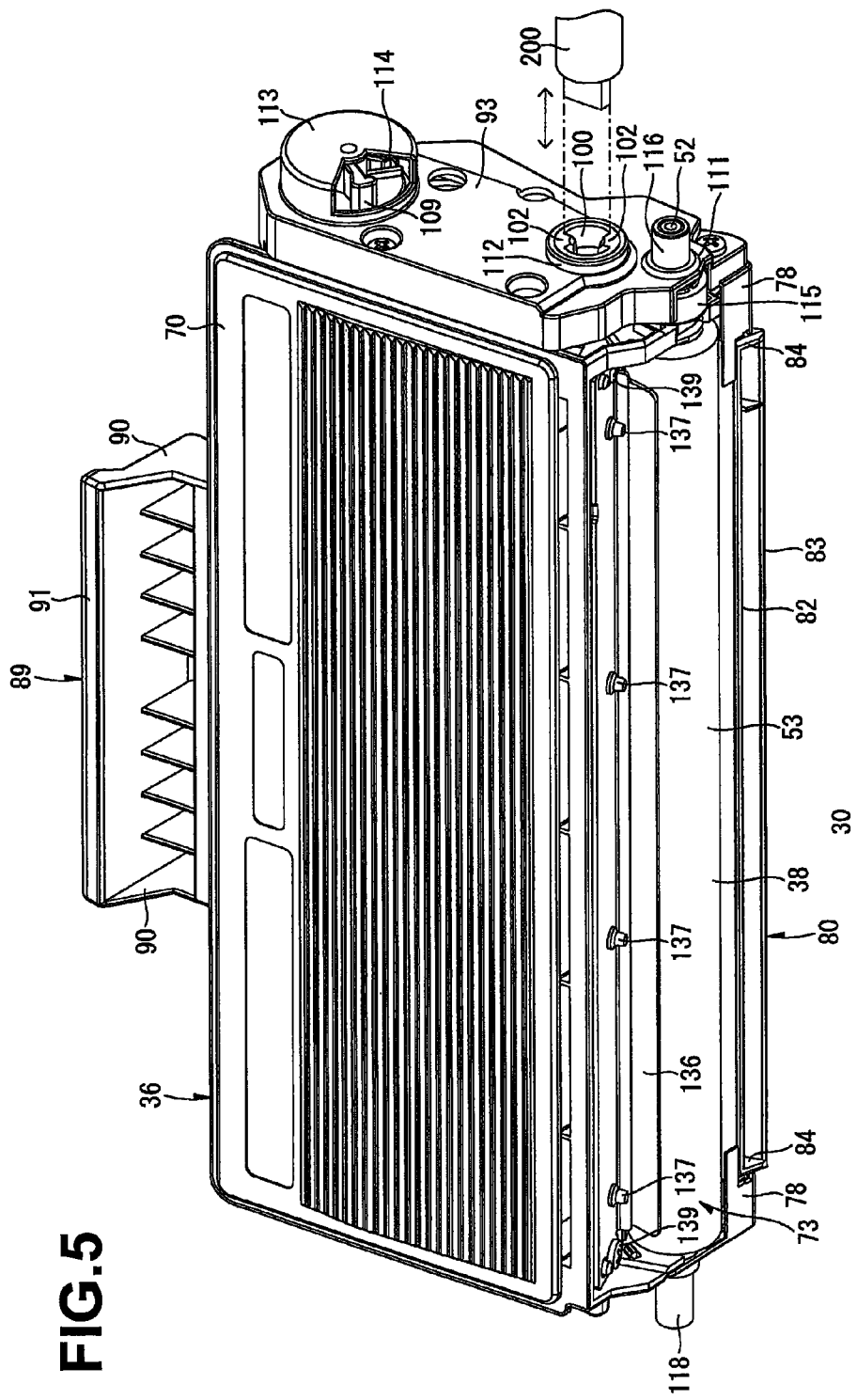
FIG. 5 is a perspective view of the developing cartridge viewed from an upper rear left side.
Figure 6:
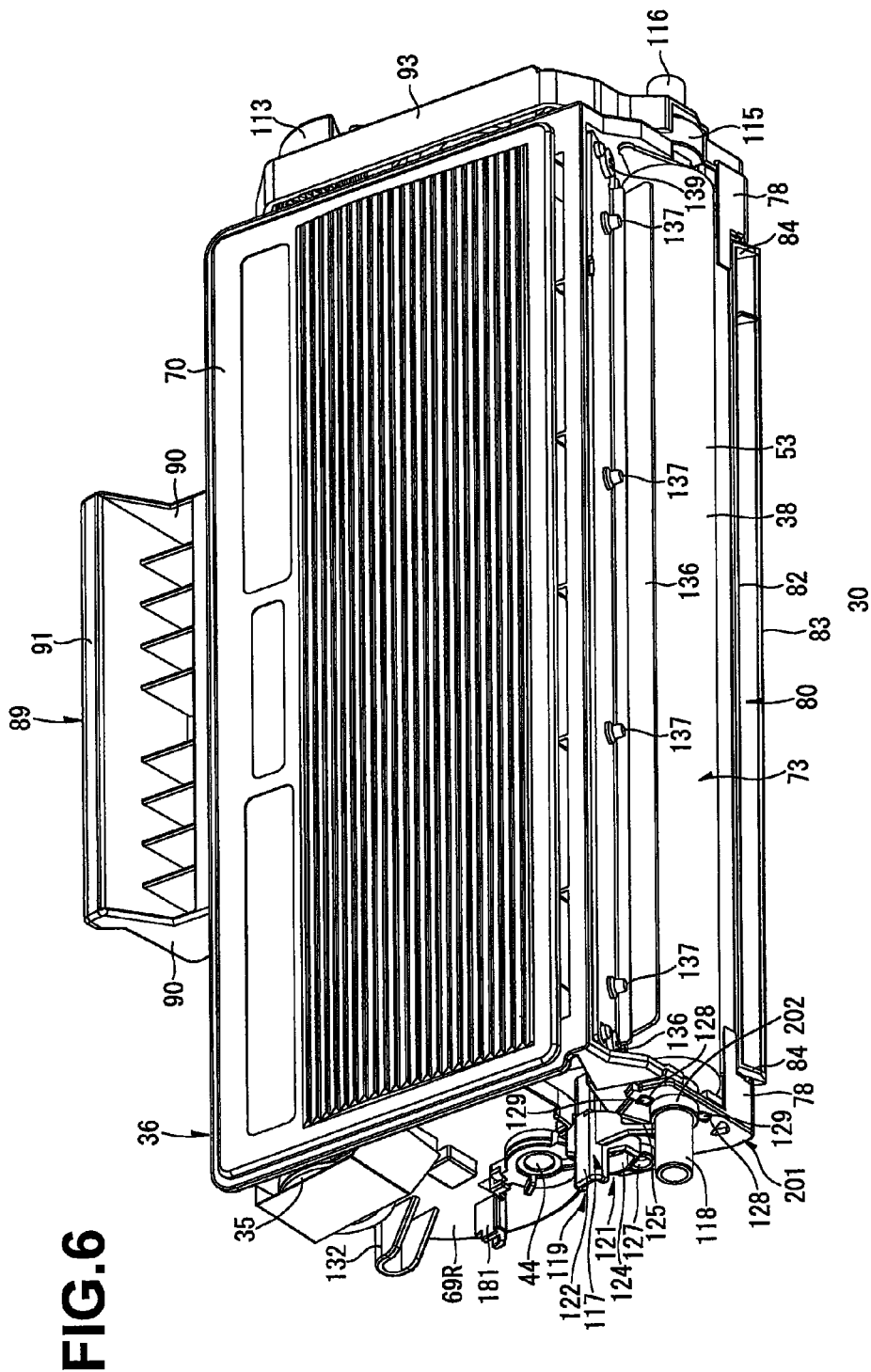
FIG. 6 is a perspective view of the developing cartridge viewed from an upper rear right side.
Figure 7:
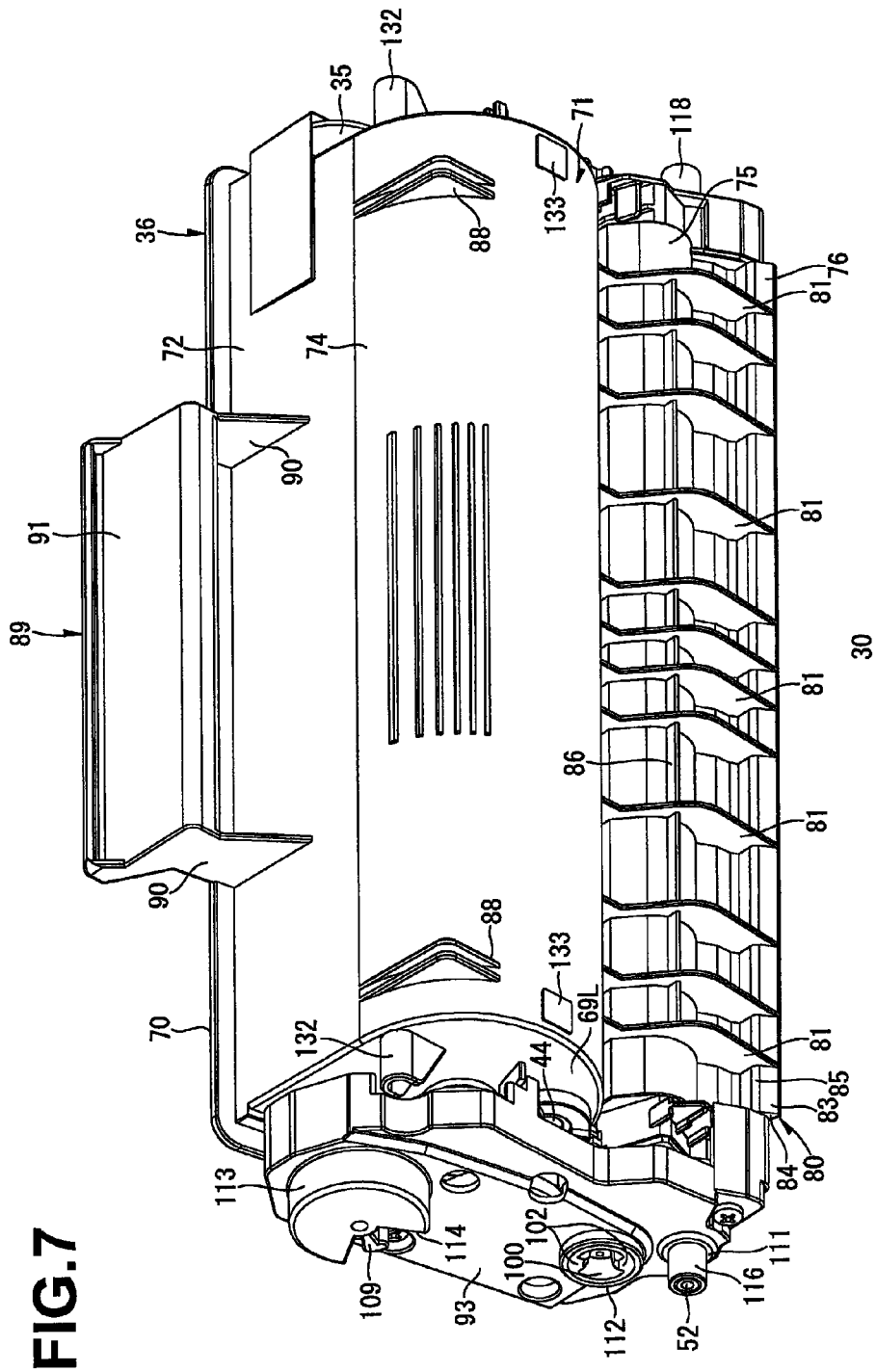
FIG. 7 is a perspective view of the developing cartridge viewed from a lower front left side.
Figure 8:
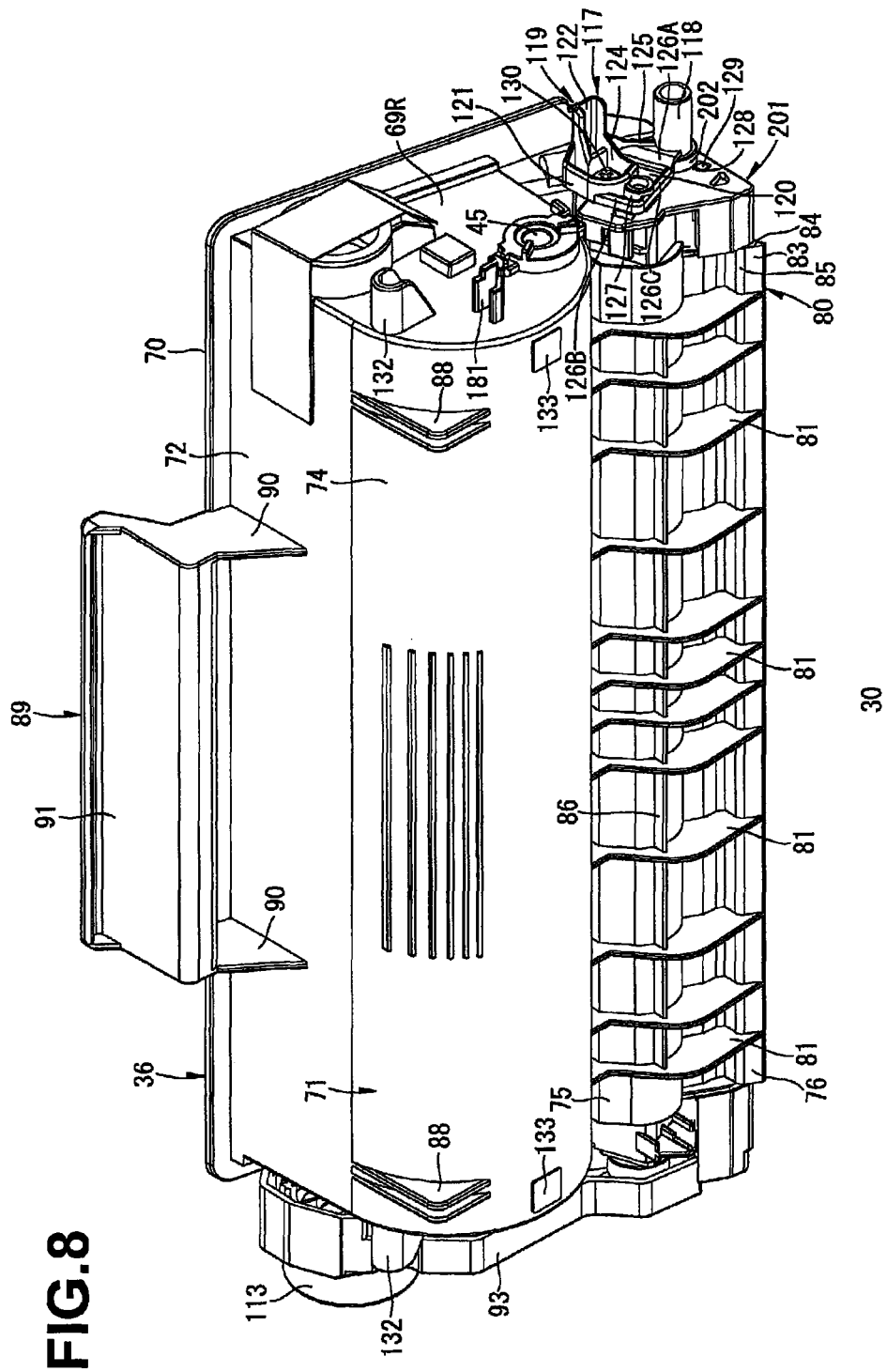
FIG. 8 is a perspective view of the developing cartridge viewed from a lower front right side.
Figure 9:
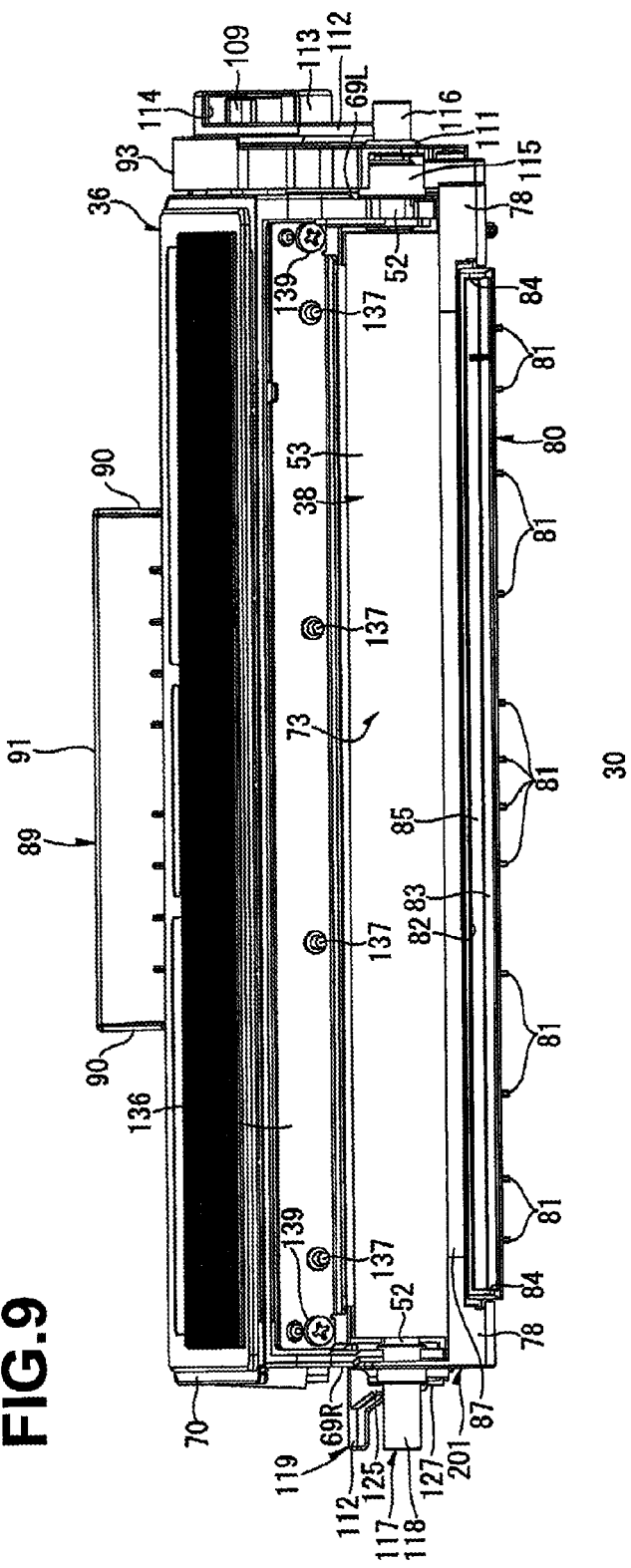
FIG. 9 is a plan view of the developing cartridge viewed from the rear side.
Figure 10:
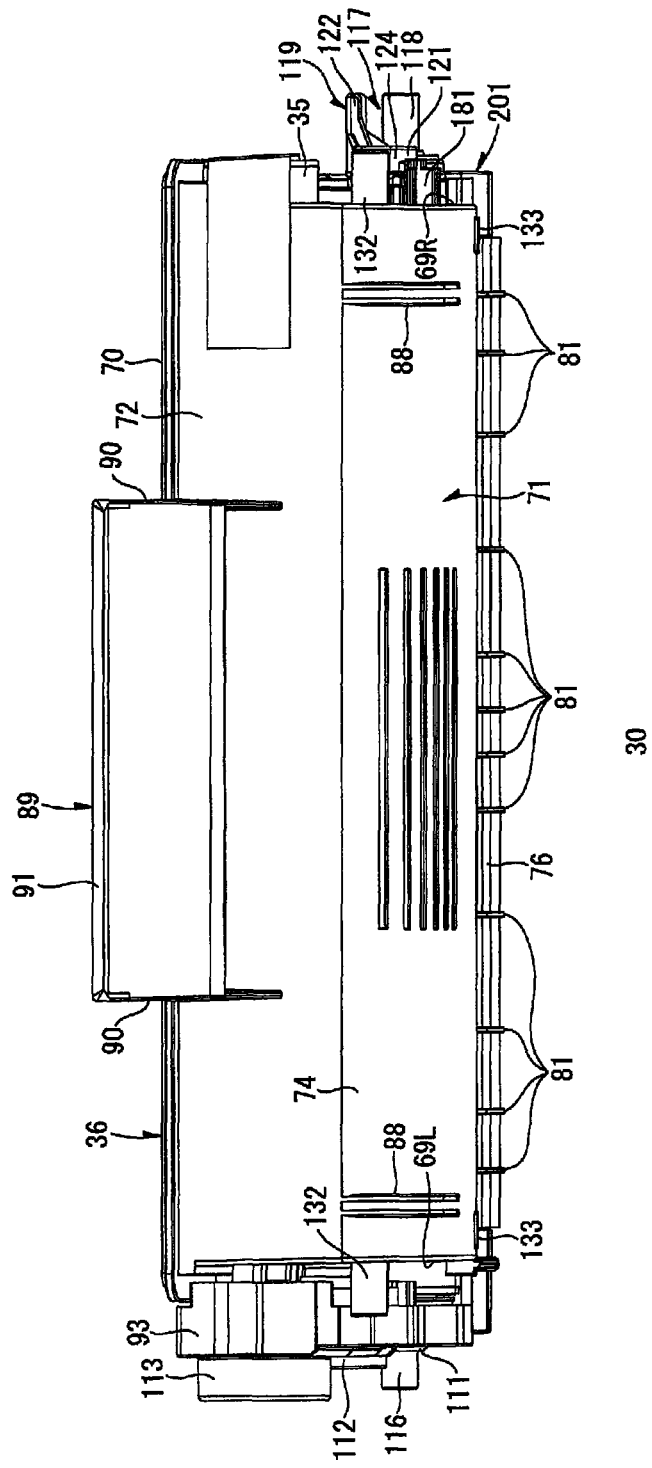
FIG. 10 is a plan view of the developing cartridge viewed from the front side.
Figure 11:
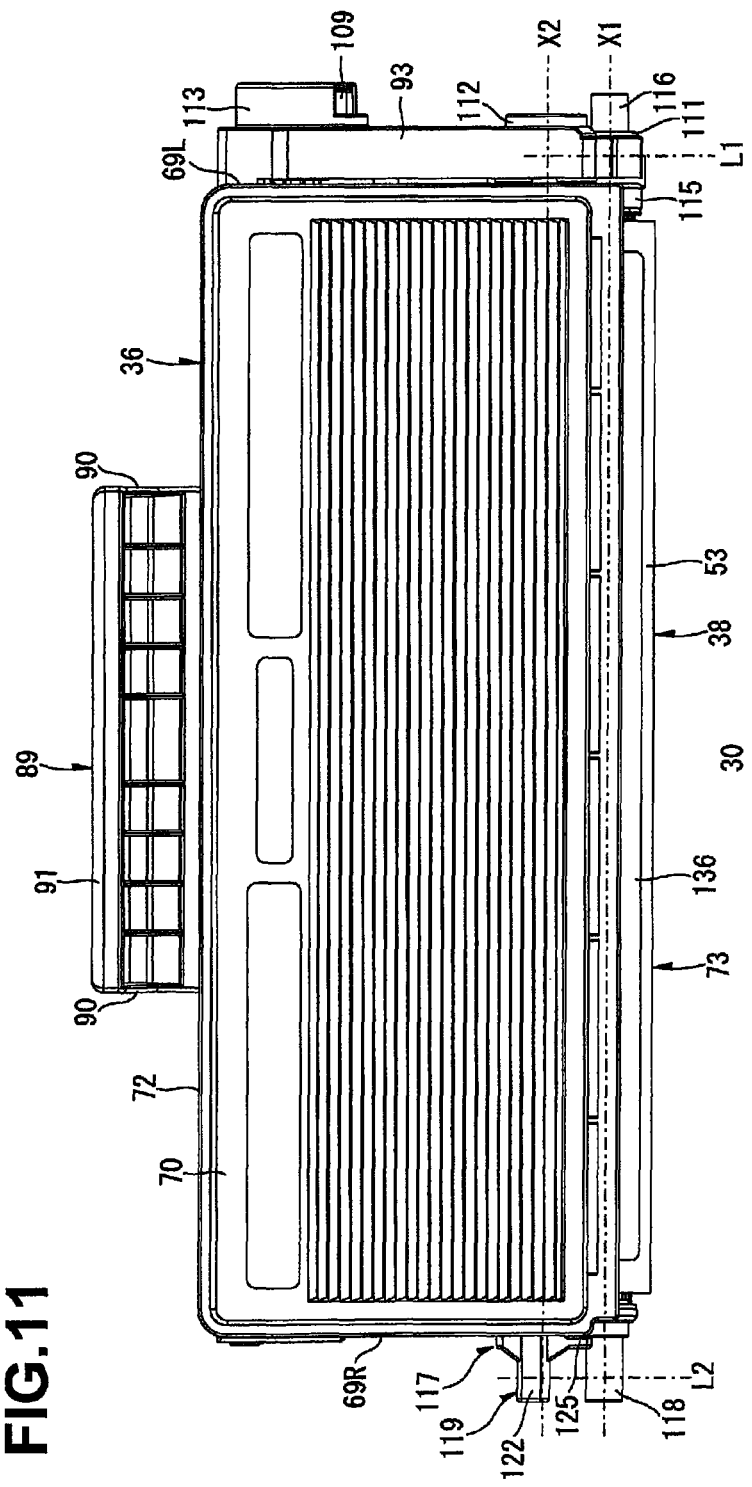
FIG. 11 is a plan view of the developing cartridge viewed from the top.
Figure 12:
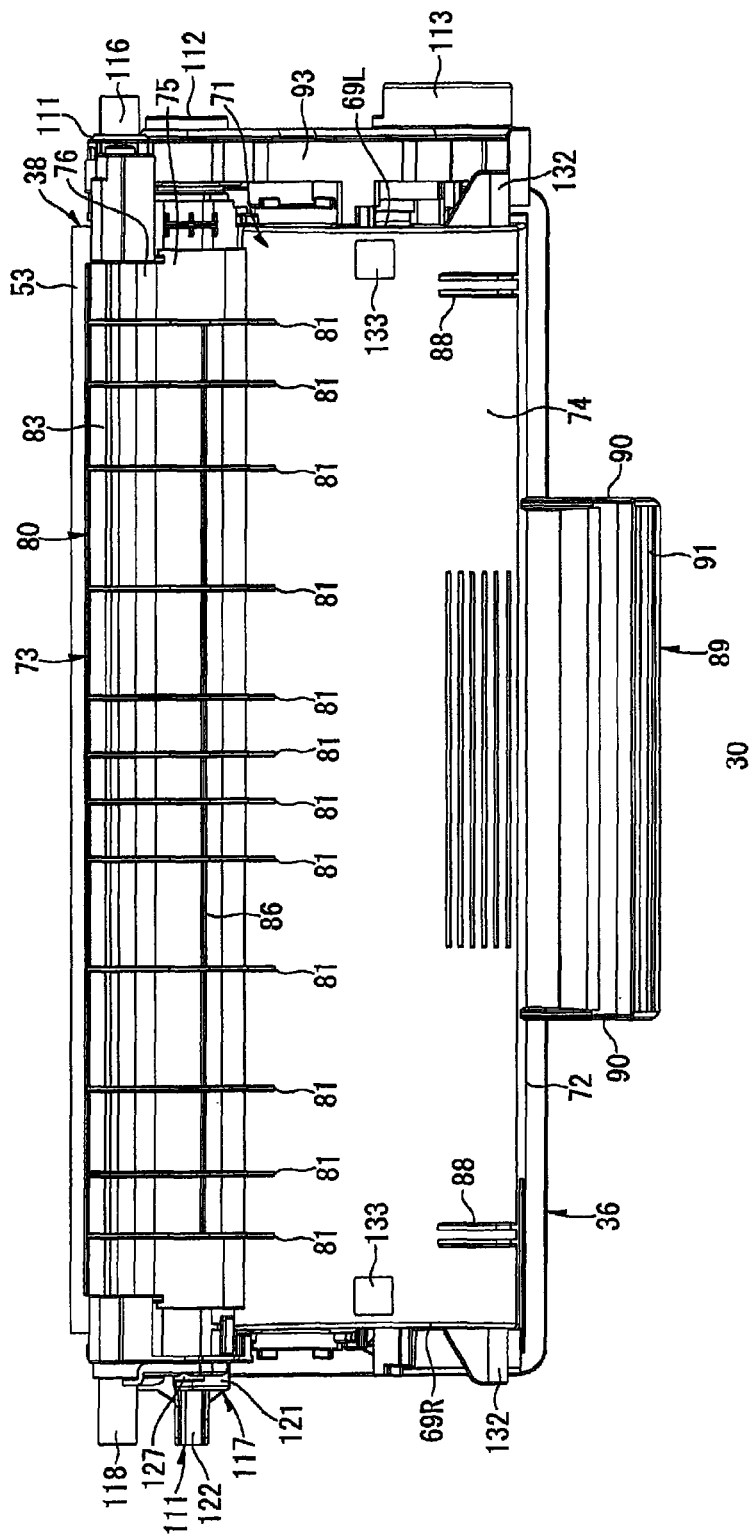
FIG. 12 is a plan view of the developing cartridge viewed from the bottom.
Figure 19:
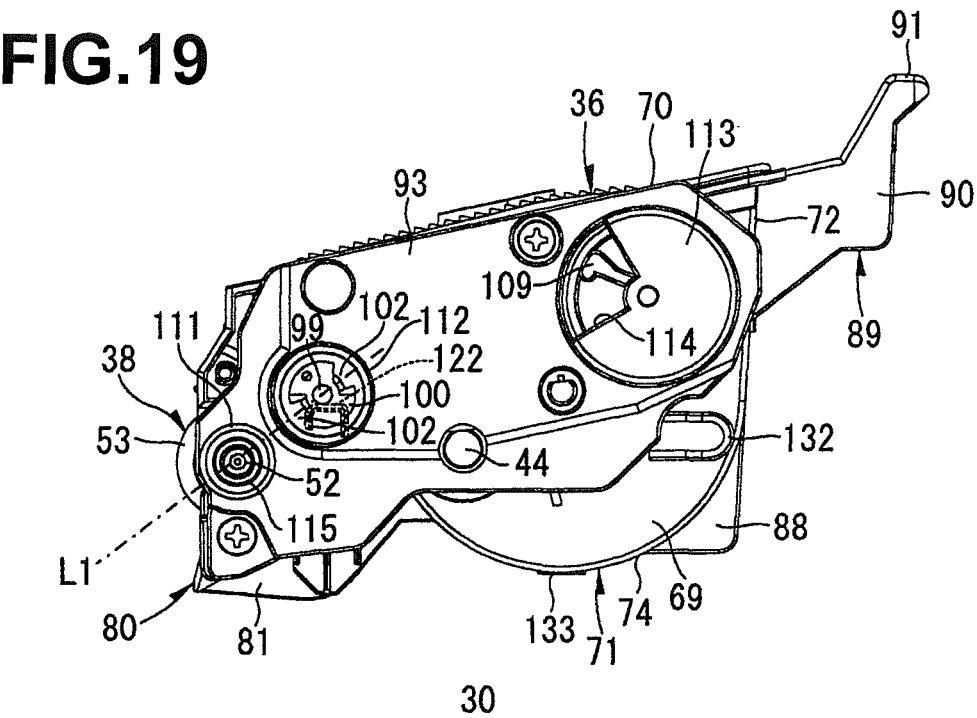
FIG. 19 is a left side view of the developing cartridge corresponding to FIG. 13, with a contact plate projected in a width direction of the developing cartridge according to an illustrative aspect.
Figure 20:
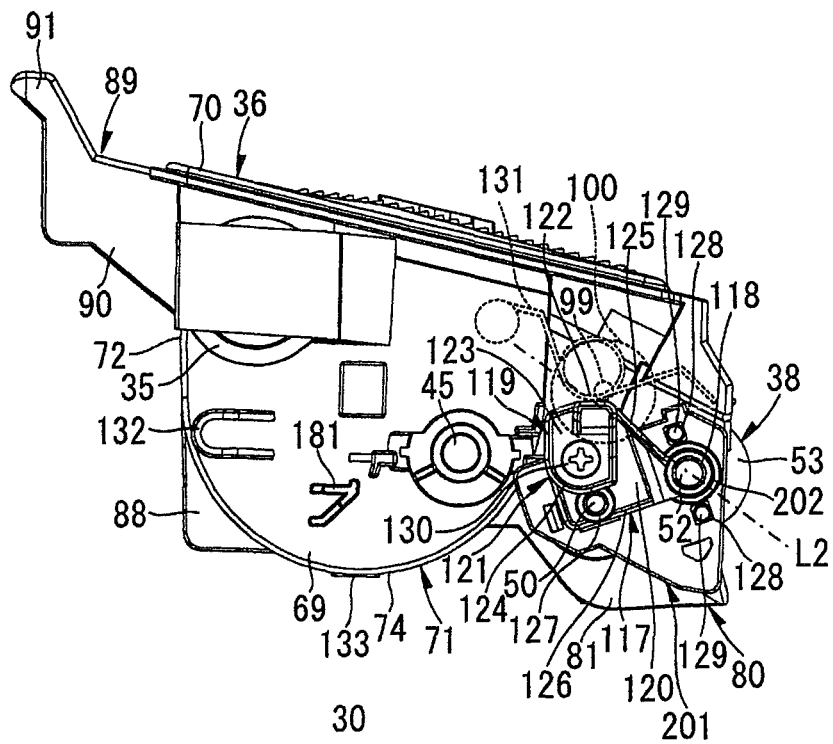
FIG. 20 is a right side view of the developing cartridge corresponding to FIG. 15, with a driven coupling part projected in the width direction of the developing cartridge according to an illustrative aspect.

FIG. 5 is a perspective view of the developing cartridge viewed from an upper rear left side. FIG. 6 is a perspective view of the developing cartridge viewed from an upper rear right side. FIG. 7 is a perspective view of the developing cartridge viewed from a lower front left side. FIG. 8 is a perspective view of the developing cartridge viewed from a lower front right side. FIG. 9 is a plan view of the developing cartridge viewed from the rear side. FIG. 10 is a plan view of the developing cartridge viewed from the front side. FIG. 11 is a plan view of the developing cartridge viewed from the top. FIG. 12 is a plan view of the developing cartridge viewed from the bottom. FIG. 13 is a left side view of the developing cartridge with a gear cover attached to the developing cartridge. FIG. 14 is a left side view of the developing cartridge with a gear cover unattached to the developing cartridge. FIG. 15 is a right side view of the developing cartridge. FIG. 19 is a left side view of the developing cartridge corresponding to FIG. 13, with a contact plate projected in a width direction of the developing cartridge. FIG. 20 is a right side view of the developing cartridge corresponding to FIG. 15, with a driven coupling part projected in the width direction of the developing cartridge.

The developing cartridge 30 will be described in detail below with reference to FIGS. 4-15 and FIGS. 19 and 20.

(1) Developing Frame

As shown in FIGS. 4 and 5, the developing frame 36 includes a pair of left and right sidewalls 69L, 69R, an upper wall 70, a bottom wall 71 and a front wall 72 that are integrally formed. The developing frame 36 is formed into a box shape with a rear opening portion 73 formed thereon.

The left and right sidewalls 69L, 69R are of a flat plate shape. As shown in FIG. 11, the left and right sidewalls 69L, 69R are disposed opposite to each other in the first direction, so as to interpose the toner chamber 41 and the developing chamber 42 between the left and right sidewalls 69L, 69R. As shown in FIGS. 14 and 15, the left and right sidewalls 69L, 69R close each end of the toner chamber 41 and the developing chamber 42. As shown in FIGS. 4 and 11, the upper wall 70 is of a flat plate shape. The upper wall 70 is connected to upper ends of the left and right sidewalls 69L, 69R, so as to extend between the left and right sidewalls 69L, 69R. The upper wall 70 closes an upper portion of the toner chamber 41 and the developing chamber 42.

As shown in FIGS. 4 and 7, the bottom wall 71 is of a curved plate shape. The bottom wall 71 is connected to lower ends of the left and right sidewalls 69L, 69R, so as to extend between the left and right sidewalls 69L, 69R. The bottom wall 71 closes a lower portion of the toner chamber 41 and the developing chamber 42. The bottom wall 71 includes a front bottom wall 74, a middle bottom wall 75, and a rear bottom wall 76 that are integrally formed.

The front bottom wall 74 is formed into a substantially semicircular cross-sectional shape in association with the rotating path of the agitator 45 in the toner chamber 41.

The middle bottom wall 75 is disposed behind the front bottom wall 74. The middle bottom wall 75 is formed into a substantially semicircular cross-sectional shape in association with the supply roller 37 in the developing chamber 42.

The rear bottom wall 76 is disposed behind the middle bottom wall 75. The rear bottom wall 76 is tilted downward from the front side to the rear side.

The front wall 72 is of a flat plate shape. The front wall 72 is connected to front ends of the left and right sidewalls 69L, 69R, so as to extend between the left and right sidewalls 69L, 69R. The front wall 72 closes a front portion of the toner chamber 41.

As shown in FIG. 4, the blade attachment portion 77 is provided at an upper rear portion of the left and right sidewalls 69L, 69R between the left and right sidewalls 69L, 69R. The blade attachment portion 77 is formed into a substantially triangular shape in sectional side view, such that the width of the blade attachment portion 77 becomes narrower toward the lower side. A rear end face of the blade attachment portion 77 is formed as an inclined surface that is inclined obliquely toward the front side from an upper end to a lower end of the blade attachment portion 77.

As shown in FIGS. 4 and 9, the base end of the blade body 54 is fixed to the rear end face of the blade attachment portion 77 by the attachment member 134, with a sealing member 135 interposed between the rear end face of the blade attachment portion 77 and the base end of the blade body 54. The sealing member 135 is provided on the rear end face of the blade attachment portion 77 to prevent toner from leaking from the portion between the rear end face of the blade attachment portion 77 and the attachment member 134.

The attachment member 134 includes a front supporting member 138 shaped like a plate, a back supporting member 136 of a substantially "L" shape in a sectional view, and screws 137. The front supporting member 138 is disposed on the rear side of the sealing member 135. The base end of the blade body 54 is disposed on the rear side of the front supporting member 138. The back supporting member 136 is disposed on the rear side of the base end of the blade body 54. The screws 137 pass through the back supporting member 136, the base end of the blade body 54, and the front supporting member 138 in the front-rear direction, to integrally secure the back supporting member 136, the base end of the blade body 54, and the front supporting member 138. With fixing screws 139, the base end of the blade body 54 is fixed to the blade attachment portion 77 while the base end of the blade body 54 and the attachment member 134 sandwich the sealing member 135 between the base end of the blade body 54 and the blade attachment portion 77.

As shown in FIGS. 4 and 5, the rear opening portion 73 is defined by the back supporting member 136 of the attachment member 134, the rear ends of the left and right sidewalls 69L, 69R, and the rear end of the rear bottom wall 76. The rear opening portion 73 is of a substantially rectangular shape extending in the first direction. A part of the developing roller 38 is exposed from the rear opening portion 73. More specifically, as shown in FIG. 13, a part of the developing roller 38 protrudes, in side view, from the inside to the outside of the developing frame 36, through the rear opening portion 73.

As shown in FIG. 9, the developing roller 38 is provided such that each end of the developing roller shaft 52 is rotatably supported in the opposing sidewalls 69L, 69R. A collar member 116 is mounted on an end of the developing roller shaft 52 extending from the left sidewall 69L. As shown in FIGS. 5 and 7, the end of the developing roller shaft 52 is inserted, together with the collar member 116, into a developing roller shaft inserting portion 111 of a gear cover 93 (described below), which is disposed on the side of the left sidewall 69L. The end of the developing roller shaft 52 is rotatably supported in the developing roller shaft inserting portion 111 of the gear cover 93.

As shown in FIGS. 6 and 8 and described in detail below, a bearing member 201, which is provided on the side of the right sidewall 69R, is fitted over the other end of the developing roller shaft 52 extending from the right sidewall 69R. The other end of the developing roller shaft 52 extends through the bearing member 201. An electrode member 117 is disposed on the side of the bearing member 201. A developing roller shaft covering portion 118 that is formed in the electrode member 117 is fitted over the other end of the developing roller shaft 52 passing through the bearing member 201. The developing roller shaft 52 is rotatably supported in the developing roller shaft covering portion 118 of the electrode member 117. Thus, the ends of the developing roller 38 is supported by the developing roller shaft inserting portion 111 of the gear cover 93, as well as the developing roller shaft covering portion 118 of the electrode member 117.

When the developing cartridge 30 is installed in the developing cartridge installation portion 147, the collar member 116 and the developing roller shaft covering portion 118 are guided by the guide grooves 153, as shown in FIG. 17, formed in the sidewalls 144L, 144R of the developing cartridge installation portion 147. Thus, smooth installation of the developing cartridge 30 into the developing cartridge installation portion 147 can be ensured.

As shown in FIGS. 5 and 9, a rear side-end wall 78 is disposed below the rear opening portion 73 on the rear end of the rear bottom wall 76 at its right and left sides with respect to the width direction of the developing cartridge 30. Each rear side-end wall 78 is formed into a substantially "L" shape with an inward lower portion thereof being cut out. A reinforcing portion 80 is disposed between the rear side-end walls 78 on the rear end of the rear bottom wall 76, which is disposed below the rear opening portion 73.

The reinforcing portion 80 extends, along the width direction of the developing cartridge 30, between the rear side-end walls 78. The reinforcing portion 80 fits in the cutout portions of the rear side-end walls 78. As shown in FIGS. 4 and 5, the reinforcing portion 80 is formed continuously from the rear end of the rear bottom wall 76. The reinforcing portion 80 includes a reinforcing upper wall 82, a reinforcing front wall 85, a reinforcing bottom wall 83, and reinforcing sidewalls 84. Those walls 82-85 are integrally formed into a substantially box shape that is open rearward. More specifically, in a sectional side view when taken along a direction perpendicular to the width direction of the developing cartridge 30, the reinforcing portion 80 is formed into a substantially "U" shape with a rear portion being open.

The reinforcing upper wall 82 is integrally formed with the rear end of the rear bottom wall 76, to extend rearward. The reinforcing front wall 85 is integrally formed with the rear end of the rear bottom wall 76, to extend downward from the front end of the reinforcing upper wall 82. The reinforcing bottom wall 83 is disposed to face the reinforcing upper wall 82 in the vertical direction. The reinforcing bottom wall 83 is integrally formed with the lower end of the reinforcing front wall 85 to extend rearward and downward.

The reinforcing sidewalls 84 are integrally formed with the ends of the reinforcing upper wall 82, the reinforcing front wall 85, and the reinforcing bottom wall 83, with respect to the width direction of the developing cartridge 30. As shown in FIG. 4, a lower film 87 is attached to the reinforcing upper wall 82. The lower film 87 is formed of, for example, polyethylene terephthalate. The rear end of the lower film 87 is attached to the upper surface of the reinforcing upper wall 82, extending frontward and upward to contact the lower surface of the rubber roller 53 of the developing roller 38. Accordingly, the lower film 87 closes a gap between the reinforcing upper wall 82 and the developing roller 38, to prevent toner from leaking from the gap.

As show in FIGS. 4 and 7, guide plates 81 are provided on the bottom wall 71 of the developing frame 36 continuously from the reinforcing portion 80. The guide plates 81 are formed into a rib or flat plate shape extending in the front-rear direction, as well as downward from the bottom wall 71. The adjacent guide plates 81 are provided parallel to each other with some distance therebetween in the width direction of the developing cartridge 30.

More specifically, the rear end of each guide plate 81 is connected to the reinforcing front wall 85 and the reinforcing bottom wall 83. The front end of each guide plate 81 is connected to the rear end portion of the front bottom wall 74. Each guide plate 81 extends downward from the rear bottom wall 76, the central bottom wall 75 and the front bottom wall 74. Each guide plate 81 is integrally formed with the reinforcing bottom wall 83, the reinforcing front wall 85, the rear bottom wall 76, the central bottom wall 75, and the front bottom wall 74. The lower end of each guide plate 81 extends in a substantially straight manner toward the front side from the rear end of the reinforcing bottom wall 83, and curves upward and frontward below the central bottom wall 75, reaching the rear end portion of the front bottom wall 74.

As show in FIGS. 7 and 12, a guide reinforcing plate 86 for reinforcing each guide plate 81 is provided on the central bottom wall 75. The guide reinforcing plate 86 is of a plate shape extending downward from the central bottom wall 75 at some middle portion of the guide plates 81 with respect to its front-rear direction, along a direction substantially perpendicular to the front-rear direction. The guide reinforcing plate 86 connects the guide plates 81 in the width direction of the developing cartridge 30 to reinforce each guide plate 81.

The front bottom wall 74 is provided with installation portions 133 and installation plates 88 for installing the developing cartridge 30 in the developing cartridge installation portion 147 of the drum frame 58. Each installation portion 133 is disposed on the middle portion, with respect to the front-rear direction, of the front bottom wall 74 at its each end, with respect to the width direction of the developing cartridge 30. Each installation portion 133 is formed on the bottom of the front bottom wall 74 into a substantially rectangular plate shape in a bottom view.

A pair of installation plates 88, which face each other in the width direction of the developing cartridge 30, is formed on the front ends of the front bottom wall 74 at each end, with respect to the width direction of the developing cartridge 30. Each installation plate 88 is formed into a substantially triangular shape extending downward from the front bottom wall 74. The lower end of each installation plate 88 extends in the front-rear direction slightly above each installation portion 133.

As shown in FIGS. 7 and 10, the front wall 72 of the developing frame 36 is provided with a grip portion 89. The grip portion 89 is formed into a substantially "U" shape in plane view. The handle 89 includes two handle supporting plates 90 disposed on the front wall 72 with some distance therebetween in the width direction of the developing cartridge 30 and a handle 91 disposed between the handle supporting plates 90. Each handle supporting plate 90 is of a plate shape extending forwardly from the upper portion of the front wall 72. The handle 91 is connected to the front ends of the handle supporting plates 90.

A boss 132, as a pressed portion, is provided on each left and right sidewall 69L, 69R of the developing frame 36. When the developing cartridge 30 is installed in the developing cartridge installation portion 147 of the drum frame 58, the bosses 132 contact the relevant pressing levers 150. Each boss 132 is provided at a front lower portion of each left and right sidewall 69L, 69R, so as to protrude outward from the outer surface of the sidewall 69L, 69R. As shown in FIGS. 14 and 15, each boss 132 is formed into a substantially "U" shape in side view that is open rearward. Each boss 132 is disposed on the left and right sidewall 69L, 69R at positions symmetric with respect to the first direction.

When the developing cartridge 30 is installed in the developing cartridge installation portion 147 of the drum frame 58, the installation portions 133 are placed on the relevant installation bases 155, as shown in FIG. 2 and the installation plates 88 are placed on the bottom wall 143 of the developing cartridge installation portion 147.

As shown in FIGS. 8, 16, and 17, the front end of each boss 132 contacts the relevant pressing lever 150. By the urging force of the compression spring that urges the pressing lever 150, each boss 132 is pressed rearward by the relevant pressing lever 150. Accordingly, the developing frame 36 moves rearward relative to the developing cartridge installation portion 147, so that the rubber roller 53 of the developing roller 38 is pressed against the photoconductive drum 28.

As shown in FIGS. 6 and 8, an engagement portion 181 is disposed integrally with the right sidewall 69R behind the boss 132 so as to extend outward. When the developing cartridge 30 is installed in the developing cartridge installation portion 147 of the drum cartridge 27, the engagement portion 181 is positioned below the lock lever 151. The lock lever 151 engages with the engagement portion 181 with the urging force of the flexible portion 152. When the developing cartridge 30 is removed from the developing cartridge installation portion 147, the lock lever 151 is pressed down to disengage the engagement portion 181 from the lock lever 151.

(2) Gear Mechanism Portion and Gear Cover

As shown in FIG. 14, ends of the agitator rotating shaft 46, the supply roller shaft 50, and the developing roller shaft 52 protrude outward in the first direction from the left sidewall 69L, as a second sidewall. Disposed on the left sidewall 69L are a gear mechanism portion 92 for driving the agitator rotating shaft 46, the supply roller shaft 50, and the developing roller shaft 52 to rotate, and a gear cover 93 that covers the gear mechanism portion 92 as shown in FIGS. 5 and 13.

As shown in FIG. 14, the gear mechanism portion 92 is disposed on the left sidewall 69L. The gear mechanism portion 92 includes an input gear 94, as a driven coupling, a supply roller drive gear 95, as a supply roller gear, a developing roller drive gear 115, as a developing roller gear, an intermediate gear 96, an agitator drive gear 97 and a detection gear 98.

The input gear 94 is rotatably supported between the developing roller shaft 52 and the agitator rotating shaft 46 by an input gear supporting shaft 99 that extends outward from the left sidewall 69L in the first direction.

The input gear 94 is integrally provided with a driven coupling part 100, as a first cylindrical portion, and a drive gear 101, as a second cylindrical portion, that is concentrically disposed with the driven coupling part 100 around the driven coupling part 100. The driven coupling part 100 is of a hollow cylindrical shape. Engagement stopper portions 102, as driven parts, that engage with a drive coupling part 200 (in FIG. 5), as a drive coupling, extend radially inward from the inner peripheral surface of the driven coupling part 100. The engagement stopper portions 102 are disposed opposite to each other with respect to the input gear supporting shaft 99. Thus, the driven coupling part 100 is formed as gear teeth that engage with the drive coupling part 200 (in FIG. 5).

The drive gear 101 is placed adjacent to the driven coupling part 100 in the first direction between the driven coupling part 100 and the left sidewall 69L.

The supply roller drive gear 95 is mounted on an end of the supply roller shaft 50 to engage with the input gear 94 below the input gear 94. The supply roller drive gear 95 is provided to rotate together with the supply roller shaft 50, so that the supply roller drive gear 95 does not rotate relative to the supply roller shaft 50.

The developing roller drive gear 115 is mounted on an end of the developing roller shaft 52 to engage with the input gear 94 on the lower rear side of the input gear 94. The developing roller drive gear 115 is provided to rotate together with the developing roller shaft 52, so that the developing roller drive gear 115 does not rotate relatively to the developing roller shaft 52.

The intermediate gear 96 is rotatably supported in front of the input gear 94 on an intermediate gear supporting shaft 103 extending outward in the first direction from the left sidewall 69L. The intermediate gear 96 is integrally provided with an external gear 104 that engages with the input gear 94 and an internal gear 105 that engages with the agitator drive gear 97. The internal gear 105 is disposed on the inner side of the external gear 104 with respect to the width direction of the developing cartridge 30.

The agitator drive gear 97 is mounted on an end of the agitator rotating shaft 46 to rotate together with the agitator rotating shaft 46, so that the agitator drive gear 97 does not rotate relative to the agitator rotating shaft 46. The agitator drive gear 97 is positioned at the lower front side of the intermediate gear 96. The agitator drive gear 97 is integrally provided with an internal gear 106 that engages with the internal gear 105 of the intermediate gear 96 and an external gear 107 that engages with the detection gear 98. The external gear 107 is disposed on the outer side of the internal gear 106 in the width direction of the developing cartridge 30.

The detection gear 98 is rotatably supported by a detection gear supporting shaft 108 that extends outward in the first direction from the left sidewall 69L at the upper front side of the agitator drive gear 97. The detection gear 98 is a partly tooth missing gear. The detection gear 98 is integrally formed with a usage determination projection 109 that extends outwardly in the radial direction of the detection gear supporting shaft 108. The detection gear 98 is urged by a coiled spring 110 wound around the detection gear supporting shaft 108 to engage with the external gear 107 of the agitator drive gear 97.

As shown in FIG. 13, the gear cover 93 is attached to the left sidewall 69L of the developing cartridge 30 to cover the gear mechanism portion 92 from its outside with respect to the width direction of the developing cartridge 30. The gear cover 93 has a developing roller shaft insertion hole 111 that the developing roller shaft 52 and the collar member 116 are inserted into, and an input hole 112 that exposes the driven coupling part 100 therethrough. In addition, the gear cover 93 is provided with a detection gear covering portion 113 that covers the detection gear 98 on the front side of the input hole 112.

The detection gear covering portion 113 extends outwardly in the first direction. The detection gear 98 fits into the extended portion of the detection gear covering portion 113. A sector-shaped detection window 114 is formed on the rear side of the detection gear covering portion 113. The usage determination projection 109, which moves along the circumferential direction of the detection gear 98 in accordance with the rotation of the detection gear 98, is exposed from the detection window 114.

When the process cartridge 20 having the developing cartridge 30 set therein is installed in the main body casing 2, the drive coupling part 200 is inserted into the driven coupling part 100 of the input gear 94 of the developing cartridge 30, as shown in FIG. 5, to which drive force from a motor (not shown) provided in the main body casing 2 is transmitted. Thus, the driven coupling part 100 engages with the drive coupling part 200.

The drive coupling part 200 is removably inserted into the driven coupling part 100, in association with operations of opening/closing the front cover 7 of the main body casing 2. More specifically, when the front cover 7 is open, the drive coupling part 200 withdraws from the driven coupling part 100, so that the process cartridge 20 can be removed from the main body casing 2. When the process cartridge 20 having the developing cartridge 30 set therein is installed in the main body casing 2 through the opening 6 and then the front cover 7 is closed, the drive coupling part 200 advances toward and is inserted into the driven coupling part 100.

When the drive force from the motor is input from the drive coupling part 200 to the driven coupling part 100, the input gear 94 is rotated. Then, the supply roller drive gear 95, which is directly engaged with the drive gear 101 of the input gear 94, is rotated. Accordingly, the supply roller shaft 50 causes the supply roller 37 to rotate. Further, the developing roller drive gear 115, which is directly engaged with the drive gear 101 of the input gear 94, is rotated. Accordingly, the developing roller shaft 52 causes the supply roller 37 to rotate.

Further, the external gear 104 of the intermediate gear 96, which is engaged with the drive gear 101 of the input gear 94, is rotated. The internal gear 105 of the intermediate gear 96, which is integrally formed with the external gear 104, is rotated. When the internal gear 105 of the intermediate gear 96 is rotated, the internal gear 106 of the agitator drive gear 97, which is engaged with the internal gear 105 of the intermediate gear 96, is rotated. Accordingly, the agitator rotating shaft 46 cause the agitator 45 to rotate.

When the internal gear 106 of the agitator drive gear 97 is rotated, the external gear 107 of the agitator drive gear 97 integrally formed with the internal gear 106 is rotated. Then, the detection gear 98 engaged with the external gear 107 of the agitator drive gear 97 rotates.

When the developing cartridge 30 is unused, the detection gear 98 is placed in such a position as shown in FIG. 14, where the detection gear 98 is urged by the coiled spring 110 to engage with the external gear 107 of the agitator drive gear 97. Once the detection gear 98 is rotated, the tooth missing portion of the detection gear 98 faces the external gear 107 of the agitator drive gear 97, so that the detection gear 98 does not engage with the external gear 107. Consequently, the detection gear 98 will not be rotated again. The usage determination projection 109 of the unused developing cartridge 30 moves across the detection window 114 only once in one direction. In the laser printer 1, the determination as to whether the installed developing cartridge 30 is used or unused is made by detecting whether the usage determination projection 109 has been moved, with a usage detection sensor (not shown) provided in the main body casing 2

(3) Electrode Member

As shown in FIGS. 6, 8 and 15, the bearing member 201 that supports an end of the developing roller shaft 52 is provided on the right sidewall 69R as a first sidewall. The bearing member 201 is formed of non-conductive resin material into a flat plate shape. A collar portion 202, which has an inside diameter substantially same as the diameter of the developing roller shaft 52, is integrally formed on the bearing member 201 at its rear end. The collar portion 202 is formed into a cylindrical shape and inserts therein the developing roller shaft 52. The end of the developing roller shaft 52 is slidably and rotatably supported on the inner peripheral surface of the collar portion 202.

Two engagement openings 128 are formed on the rear side of the bearing member 201, so as to interpose the collar portion 202 between the engagement openings 128 in the vertical direction. An opening (not shown) for receiving the supply roller shaft 50 is formed on the front side of the bearing member 201. Two engagement projections 129 are formed on the right sidewall 69R at positions corresponding to the engagement openings 128. The bearing member 201 is attached to the right sidewall 69R such that the rear end of the bearing member 201 becomes flush with the rear end of the right sidewall 69R. With the bearing member 201 attached to the right sidewall 69R, the developing roller shaft 52 and the supply roller shaft 50 are inserted into the collar portion 202 and the opening (not shown), respectively, and the engagement projections 129 are fitted into the relevant the engagement openings 128.

The electrode member 117 as an electrode for applying the developing bias to the developing roller shaft 52 is formed on the surface of the bearing member 201. The electrode member 117 is formed of a conductive resin including carbon powders. The electrode member 117 is provided integrally with an attachment plate 120, the developing roller shaft covering portion 118, as a developing roller shaft supporting portion, and a terminal portion 119.

The attachment plate 120 is formed of a thin plate into a substantially triangular shape in side view. The developing roller shaft covering portion 118 is provided on the rear end of the attachment plate 120. The developing roller shaft covering portion 118 is formed into a cylindrical shape to receive an end of the developing roller shaft 52 and is disposed concentrically with the collar portion 202. The developing roller shaft covering portion 118 extends in the first direction from the rear end of the attachment plate 120.

The developing roller shaft 52 has a large diameter portion, which is supported by the collar portion 202, and a small diameter portion, which is supported by the developing roller shaft covering portion 118. The diameter of the large diameter portion is greater than that of the small diameter portion. The outside diameter of the developing roller shaft covering portion 118 is substantially the same as the inside diameter of the collar portion 202. When the developing roller shaft covering portion 118 is inserted over the developing roller shaft 52, a part of the developing roller shaft covering portion 118 is fitted into the collar portion 202.

The terminal portion 119 is provided on the front end of the attachment plate 120 with some distance between the terminal portion 119 and the developing roller shaft covering portion 118 in the front-rear direction. The terminal portion 119 is provided with a base 121, a contact plate 122, as a contact portion.

The base 121 is provided integrally with a base plate 123 that extends in the vertical direction to form a substantially elliptical shape in side view, and a loop-shaped outer rim plate 124 that extends outward in the width direction of the developing cartridge 30 from the outer periphery of the base plate 123. A part of the outer rim plate 124 formed on the upper end of the base plate 123, extends outward in the first direction longer than the remaining part of the outer rim plate 124.

The contact plate 122 is of a substantially "U" shape in side view that is open downward. The contact plate 122 extends outward in the first direction from the outer rim plate 124 formed on the upper end of the base 121.

The attachment plate 120 is formed with an upper reinforcing rib 125, a lower reinforcing rib 126, and a supply roller shaft covering portion 127, as a supply roller supporting portion. The upper reinforcing rib 125 extends outward in the first direction from the attachment plate 120. The upper reinforcing rib 125 is formed such that it extends rearward and downward toward the developing roller shaft covering portion 118 from the rear end of the contact plate 122 and is connected to the developing roller shaft covering portion 118.

The lower reinforcing rib 126 extends outward in the first direction from the attachment plate 120 to form a substantially upward-open "U" shape in side view while covering the lower part of the terminal portion 119. More specifically, the lower reinforcing rib 126 includes a first lower reinforcing rib 126A, a second lower reinforcing rib 126B, and a third lower reinforcing rib 126C that are continuously formed.

The first lower reinforcing rib 126A extends rearward and downward from its upper end. The upper end of the first lower reinforcing rib 126A is connected to the upper reinforcing rib 125 provided between the developing roller shaft covering portion 118 and the terminal portion 119. The lower end of the first lower reinforcing rib 126A is connected to the third lower reinforcing rib 126C.

The upper end of the second lower reinforcing rib 126B is connected to the front lower end of the base 121. The upper end of the second lower reinforcing rib 126B extends rearward and downward parallel to the first lower reinforcing rib 126A. The lower end of the second lower reinforcing rib 126B is connected to the third lower reinforcing rib 126C.

The third lower reinforcing rib 126C is disposed below the base 121 so as to connect the lower ends of the first lower reinforcing rib 126A and the second lower reinforcing rib 126B.

The supply roller shaft covering portion 127 is disposed between the base 121 and the third lower reinforcing rib 126C. The supply roller shaft covering portion 127 is formed into a cylindrical shape to receive an end of the supply roller shaft 50. The supply roller shaft covering portion 127 extends outward in the first direction from the attachment plate 120 shorter than the outer rim plate 124.

A screw hole (not shown) is formed on the base plate 123 of the base 121. A screw hole (not shown) is formed on the bearing member 201 at a position corresponding to the screw hole on the base plate 123. A threaded hole (not shown) is formed on the right sidewall 69R at a position corresponding to the screw hole on the base plate 123.

The electrode member 117 is attached to the right sidewall 69R, while inserting ends of the developing roller shaft 52 and the supply roller shaft 50 into the developing roller shaft covering portion 118 and the supply roller shaft covering portion 127, respectively, using a screw 130 that is inserted into the screw hole on the base plate 123 and screwed into the threaded hole of the right sidewall 69R, through the screw hole on the bearing member 201.

With such a structure, the end of the developing roller shaft 52 slidably contacts the inner peripheral surface of the developing roller shaft covering portion 118. Similarly, the end of the supply roller supply shaft 50 slidably contacts the inner peripheral surface of the supply roller shaft covering portion 127.

When the process cartridge 20 having the developing cartridge 30 set therein is installed in the main body casing 2, a developing bias terminal 131, as a feeding member, provided in the main body casing 2, elastically contacts the upper surface of the contact plate 122, as shown in FIG. 15 by the imaginary line.

More specifically, the contact plate 122 is disposed near the supply roller shaft 50 inserted into the supply roller shaft covering portion 127 with respect to the vertical direction. The developing bias terminal 131 elastically contacts the contact plate 122 on its surface opposite to the surface facing the supply roller supply shaft 50.

The developing bias terminal 131 is connected to a high-voltage circuit board (not shown) that is provided in the main body casing 2 to apply the developing bias. When the developing bias terminal 131 elastically contacts the upper surface of the contact plate 122, the developing bias from the high-voltage circuit board is applied to the developing roller shaft 52, via the electrode member 117 formed of conductive resin. Then, the developing bias is applied to the conductive rubber roller 53 from the developing roller shaft 52.

The electrode member 117 supports both the developing roller shaft 52 and the supply roller shaft 50, so that the same bias as the developing bias is applied to the conductive sponge roller 51, via the supply roller shaft 50.

(4) Relative Positions of Input Gear and Electrode Member

In the developing cartridge 30, the contact plate 122 of the electrode member 117 is disposed within a plane of projection when the input gear 94 is projected in a direction parallel to the developing roller shaft 52, that is in the first direction, as shown in FIGS. 11, 13, and 15.

More specifically, as shown in FIGS. 19 and 20, the contact plate 122 of the electrode member 117 is disposed within a plane of projection when the driven coupling part 100 of the input gear 94 is projected in the first direction. Further, the contact plate 122 is disposed to contact the developing bias terminal 131 in a plane of projection when the driven coupling part 100 is projected in the first direction. Especially, the contact plate 122 is disposed to contact the developing bias terminal 131 on the extension line (a second axis line X2 as will be described below) of the input gear supporting shaft 99 on which the driven coupling part 100 rotates.

As shown in FIG. 11, a first axis line X1, which is an axis of the developing roller shaft 52, and the second axis line X2 which is an axis of the input gear 94, are disposed in parallel and equidistantly in the front-rear direction. A part of the contact plate 122 of the electrode member 117 is disposed on the second axis line X2. More specifically, as shown in FIG. 13, a first line L1 connects, in a direction perpendicular to the axial direction of the developing roller shaft 52, an axis of the input gear supporting shaft 99, on which the input gear 94 rotates, and an axis of the developing roller shaft 52, on which the developing roller 38 rotates. As shown in FIG. 15, a second line L2 connects, in a direction perpendicular to the axial direction of the developing roller shaft 52, a contact point of the contact plate 122 to the developing bias terminal 131, which is a part of the contact plate 122 of the electrode member 117, and the axis of the developing roller shaft 52, on which the developing roller 38 rotates. As shown in FIG. 11, the first line L1 and the second line L2 are parallel to each other. A first distance D1 between the first axis line X1 and the second axis line X2 on the first line L1, as shown in FIG. 13, and a second distance D2 between the first axis line X1 and the second axis line X2 on the second line L2, as shown in FIG. 15, are equal.

(5) Effects of Developing Cartridge

In the above-structured developing cartridge 30, the contact plate 122 of the electrode member 117 is disposed within a plane of projection when the input gear 94 is projected in a direction parallel to the developing roller shaft 52, which is in the first direction. More specifically, the contact plate 122 of the electrode member 117 is disposed in a plane of projection when the driven coupling part 100 is projected in the first direction. In some aspects, the contact plate 122 contacts the developing bias terminal 131 within a plane of projection when the driven coupling part 100 is projected in the first direction. Especially, the contact plate 122 contacts the developing bias terminal 131 on the extension line of the input gear supporting shaft 99 on which the driven coupling part 100 rotates. Further, the first axis line X1 and the second axis line X2 are parallel to each other. A part of the contact plate 122 of the electrode member 117 is disposed on the second axis line X2. More specifically, the first line L1 and the second first line L2 are parallel to each other and the first distance D1 and the second distance D2 are equal.

Therefore, even when such rotation or torsion power is exerted on the developing cartridge 30 that produces rotation or torsion of the developing cartridge 30 about the input gear 94 when the drive force from the motor is input to the driven coupling part 100 from the drive coupling part 200, significant influences of the rotation or torsion power on the contact plate 122 of the electrode member 117 can be prevented. Consequently, the contact plate 122 is prevented from being placed out of position. Thus, the contact plate 122 and the developing bias terminal 131 stably contact each other, so that power can be stably supplied to the developing roller shaft 52 from the electrode member 117.

If the contact point between the contact plate 122 and the developing bias terminal 131 is placed at any position within a plane of projection when the driven coupling part 100 is projected in the first direction, influences by the rotation or torsion power can be minimized.

Further, in the developing cartridge 30, each end of the developing roller 38 is supported in the left or right sidewalls 69L, 69R by rotatably supporting each end of the developing roller shaft 52 in the left or right sidewalls 69L, 69R. Accordingly, while the developing roller 38 is securely supported, the developing bias can be stably applied to the rubber roller 53.

One end of the developing roller shaft 52 is rotatably supported in the developing roller shaft inserting portion 111 of the gear cover 93, via the collar member 116. The other end of the developing roller shaft 52 is rotatably supported in the developing roller shaft covering portion 118 of the electrode member 117. Each end of the developing roller 38 is also supported by the developing roller shaft inserting portion 111 of the gear cover 93 or the developing roller shaft covering portion 118 of the electrode member 117. Thus, the developing roller 38 can be securely supported while the developing roller shaft 52 is efficiently inserted into the developing roller shaft inserting portion 111 of the gear cover 93 and the developing roller shaft covering portion 118 of the electrode member 117. Therefore, the developing bias can be stably applied to the rubber roller 53.

In the developing cartridge 30, the electrode member 117 is formed of conductive resin. Therefore, the electrode member 117 can be formed into any shape to stably apply the developing bias to the rubber roller 53.

When the process cartridge 20 having the developing cartridge 30 set therein is installed in the main body casing 2, the developing bias terminal 131 elastically contacts the upper surface of the contact plate 122. The developing bias is applied from the developing bias terminal 131 to the developing roller shaft 52 by the high-voltage circuit board, via the electrode member 117. Then, the developing bias is applied from the developing roller shaft 52 to the conductive rubber roller 53. Thus, the developing bias can be reliably applied from the electrode member 117 to the rubber roller 53.

The developing roller shaft 52 is formed of metal, so that the developing bias can be further reliably applied from the electrode member 117 to the rubber roller 53. In addition, in the developing cartridge 30, the developing roller shaft covering portion 118 of the electrode member 117 rotatably supports the developing roller shaft 52. Therefore, it is not necessary to support the developing roller shaft 52 with another member or components. Thus, reduction of the number of components and costs can be achieved.

In the developing cartridge 30, the input gear 94 is provided integrally with the driven coupling part 100 and the drive gear 101. Therefore, while the driven coupling part 100 can reliably receive the drive force from the drive coupling part 200, the drive gear 101 conveys the drive force to the supply roller drive gear 95, the developing roller drive gear 115, and the intermediate gear 96. Thus, the supply roller shaft 50 and the developing roller shaft 52, as well as the agitator rotating shaft 46 can be reliably rotated.

The driven coupling part 100 is of a hollow cylindrical shape. The driven coupling part 100 is formed as gear teeth with the engagement stopper portions 102 extending radially inward from the inner peripheral surface of the driven coupling part 100. Therefore, as the engagement stopper portions 102 are engaged with the drive coupling part 200, the drive force can be reliably received from the drive coupling part 200.

As the drive gear 101 of the input gear 94 is engaged directly with the developing roller drive gear 115, the drive force, which is input from the drive coupling part 200 to the input gear 94, is directly transmitted to the developing roller drive gear 115 from the input gear 94. Therefore, the developing roller 38 can be reliably rotated. Further, as the drive force is thus transmitted, drive force from the main body casing 2 is not directly transmitted to the developing roller drive gear 115, so that the developing roller shaft 52 can be used as a guide. More specifically, when the developing cartridge 30 is installed in the developing cartridge installation portion 147, the collar member 116 and the developing roller shaft covering portion 118 provided on the developing roller shaft 52 are guided along the guide grooves 153. Thus, the developing roller shaft 52 can be used as a guide. Consequently, a guide does not have to be additionally provided, and the number of components to be used and costs can be reduced.

The drive gear 101 of the input gear 94 also engages directly with the supply roller drive gear 95, so that the drive force input from the drive coupling part 200 to the input gear 94 is transmitted directly to the supply roller drive gear 95. Therefore, the supply roller 37 can be reliably rotated. Further, as the drive force is thus transmitted, the drive force is directly transmitted from the input gear 94 to the developing roller drive gear 115 and the supply roller drive gear 95. Thus, the drive force can be transmitted effectively, and the developing roller 38 and the supply roller 37 can be effectively rotated.

The electrode member 117 is provided with the developing roller shaft covering portion 118 and the supply roller shaft covering portion 127. Accordingly, the developing roller shaft 52 and the supply roller shaft 50 can be reliably supported by the developing roller shaft covering portion 118 and the supply roller shaft covering portion 127, respectively.

When the developing cartridge 30 is installed in the main body casing 2, the developing bias terminal 131 elastically contacts the upper surface of the contact plate 122, which is positioned above the developing roller shaft covering portion 118 and the supply roller shaft covering portion 127 and is opposite to the surface facing the supply roller shaft 50. Therefore, reliable contact between the developing bias terminal 131 and the contact plate 121 can be achieved. Thus, the developing bias can be reliably applied by the high-voltage circuit board (not shown) to the contact plate 122, via the developing bias terminal 131.

When the developing cartridge 30 is installed in the developing cartridge installation portion 147 of the drum frame 58, the front ends of the bosses 132 contact the relevant pressing levers 150. By the urging force of the compression springs that urge the pressing levers 150, each boss 132 is pressed rearward by the relevant pressing lever 150. Thus, the developing roller 38 is pressed against the photoconductive drum 28. With the reliable contact between the developing roller 38 and the photoconductive drum 28, the electrostatic latent image formed on the photoconductive drum 28 can be reliably developed by the toner carried on the developing roller 38.

Each boss 132 extends outwardly in the first direction from the outer surface of each left and right sidewall 69L, 69R at a front lower side of each sidewall 69L, 69R. With such a structure, the bosses 132 can reliably contact the relevant pressing levers 150, so that reliable contact between the developing roller 38 and the photoconductive drum 28 can be ensured.

The developing cartridge 30 is removably installed in the drum cartridge 27. The developing cartridge 30 can be replaced with a new one in accordance with the residual amount of the toner, regardless of the life of the photoconductive drum 28. The drum cartridge 27 can be replaced in accordance with the life of the photoconductive drum 28, regardless of the residual amount of the toner contained in the developing cartridge 30.

3. Other Aspects (1) Electrode Member According to Other Aspects

In the above description, the electrode member 117, as an electrode, including the attachment plate 120, the developing roller shaft covering portion 118, and the terminal portion 119, is integrally formed of conductive resin, as shown in FIGS. 6, 8 and 15. However, the attachment plate 120, the developing roller shaft covering portion 118, and the terminal portion 119 may be separately formed and then assembled together into the electrode member 117.

For example, the terminal portion 119 provided with the base 121 and the contact plate 122 may be integrally formed of metal, as an electrode. The attachment plate 120 and the developing roller shaft covering portion 118 may be integrally formed of conductive resin, as a conductive member. Then, the terminal portion 119 may be secured to the attachment plate 120 using the screw 130. Thus, the electrode member 117 may be formed.

With such electrode member 117, the developing bias can be reliably applied to the contact plate 122 from the developing bias terminal 131 because the terminal portion 119 is formed of metal. Power can be reliably supplied to the developing shaft 52, via the attachment plate 120 and the developing roller shaft covering portion 118, from the terminal portion 119, which is a part of the electrode member 117.

The terminal portion 119 indirectly contacts the developing shaft 52, via the attachment plate 120 and the developing roller shaft covering portion 118. Therefore, the position of the terminal portion 119 relative to the developing roller shaft 52 or the position of the developing roller shaft 52 relative to the terminal portion 119 can be selected freely. Thus, while improving the design efficiency, power can be reliably supplied from the contact plate 122 to the developing roller shaft 52.

(2) Developing Roller Shaft According to Other Aspects

In the above description, the developing roller shaft 52 is formed of metal. However, the developing roller shaft 52 may be formed of conductive resin. Further, the developing roller shaft 52 may be formed of an insulating material, such as an insulating resin material.

When the developing roller shaft 52 is formed of an insulating material, the electrode member 117 and the rubber roller 53 may be electrically connected and the developing bias may be directly applied from the electrode member 117 to the rubber roller 53. In this case, the resistance of the rubber roller 53 may be set lower than that of the rubber roller 53 according to the above-described aspects.

Figure 18A:
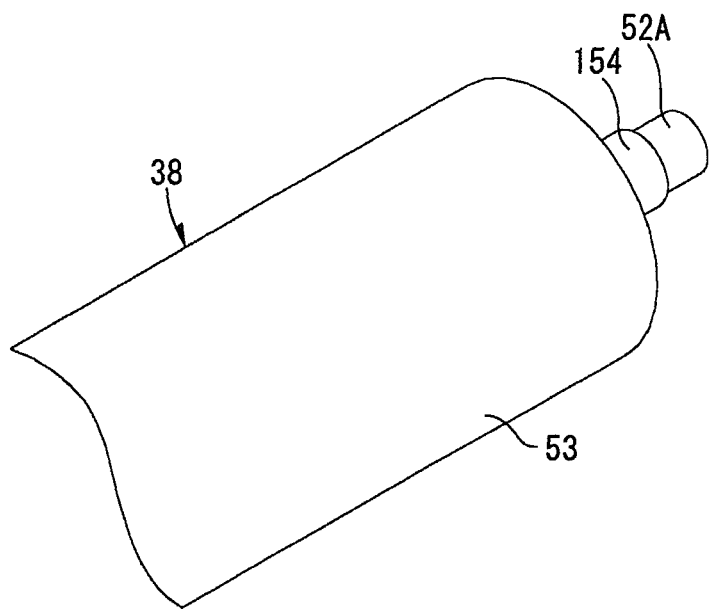
FIG. 18A and FIG. 18B provide a perspective view showing a part of a developing shaft and a side view of the developing shaft, respectively, according to an illustrative aspect.
Figure 18B:
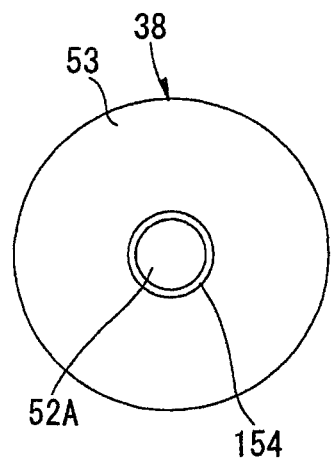

For example, as shown in FIG. 18, the surface of an insulating developing roller shaft 52A, may be covered with a conductive sheet 154 formed of metal foil, such as an aluminum foil, so as to contact the rubber roller 53. The conductive sheet 154 may contact the inner peripheral surface of the developing roller shaft covering portion 118. With such a structure, the developing bias may be applied from the electrode member 117 to the rubber roller 53, via the conductive sheet 154.

(3) Input Gear According to Other Aspects

In the above description, the input gear 94 is integrally formed with the driven coupling part 100 and the drive gear 101. However, the input gear 94 may be integrally formed with, for example, the drive gear 101 and the engagement stopper portions 102.

Figure 21:
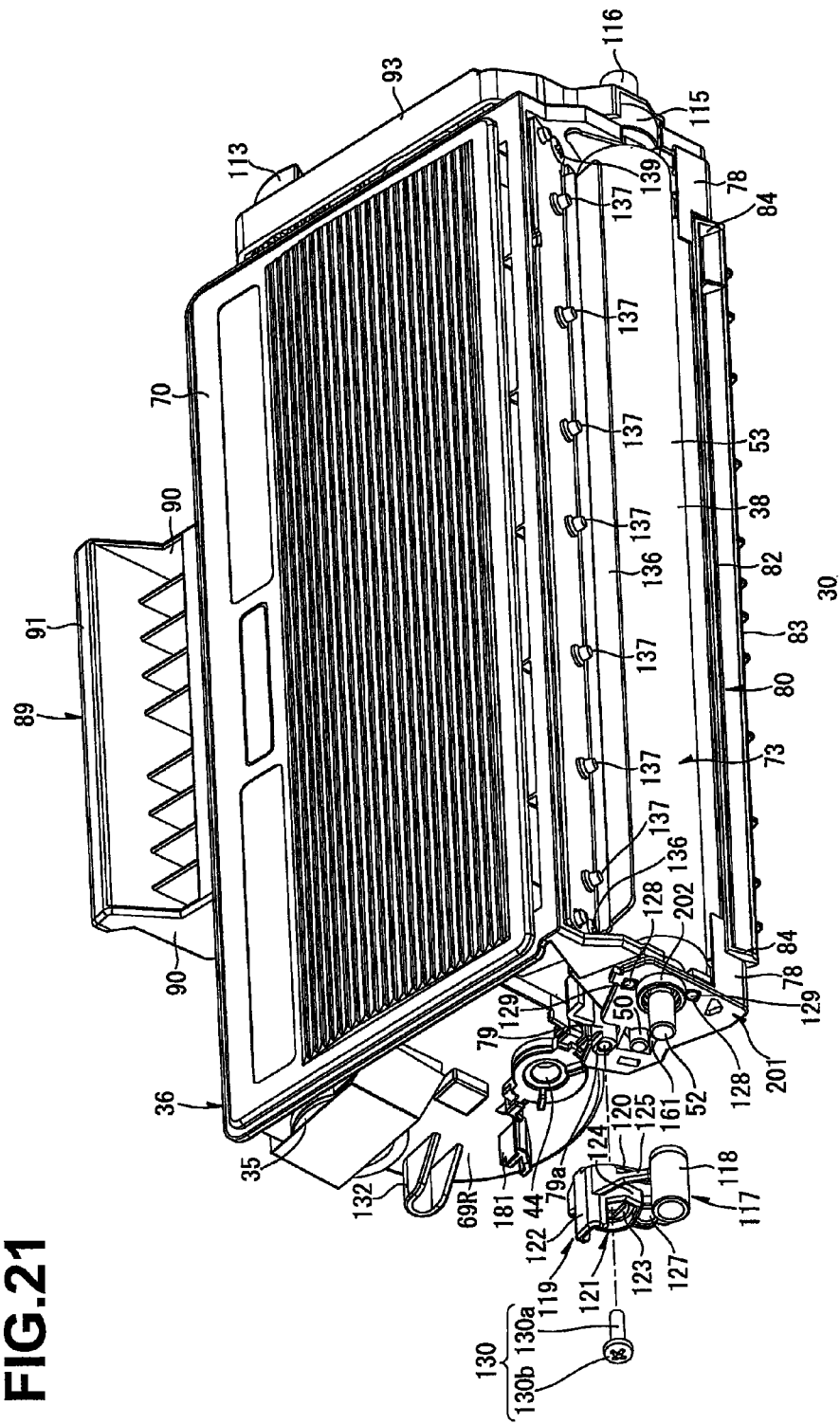
FIG. 21 is a perspective view of the developing cartridge, corresponding to FIG. 6, viewed from an upper rear right side, with an electrode member detached from the developing cartridge according to an illustrative aspect.
Figure 22:
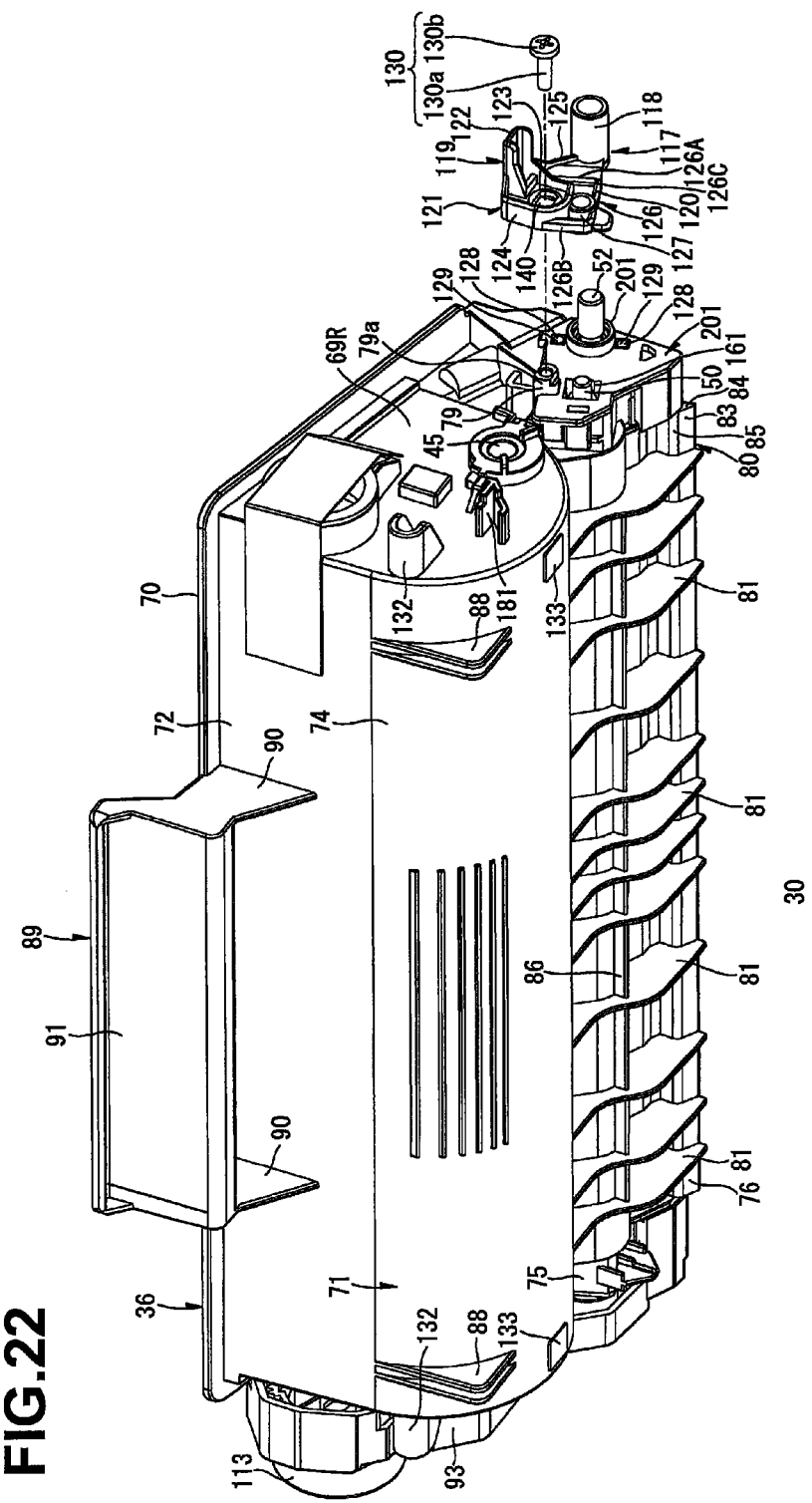
FIG. 22 is a perspective view of the developing cartridge, corresponding to FIG. 8, viewed from a lower front right side, with the electrode member detached from the developing cartridge.
Figure 23:
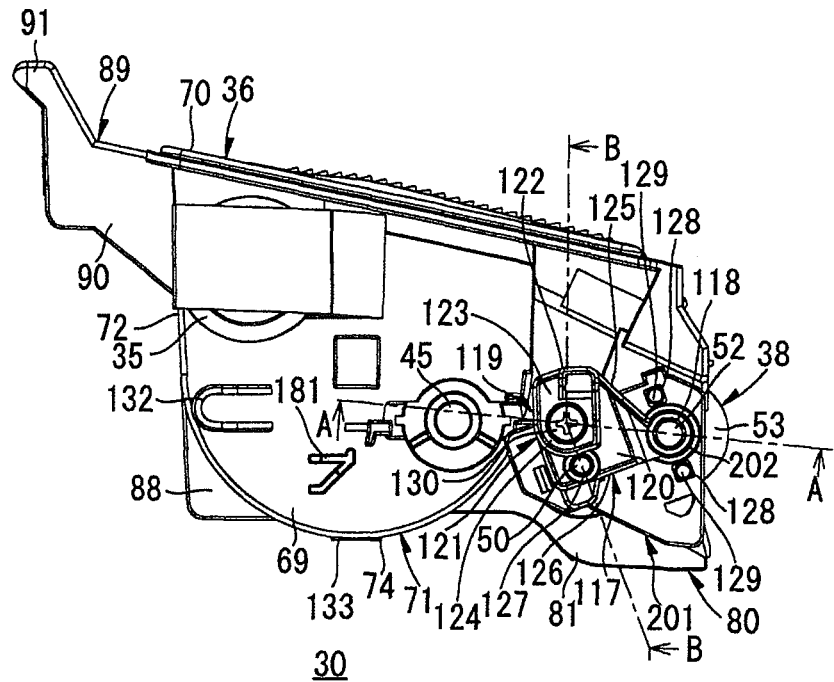
FIG. 23 is a right side view of the developing cartridge, corresponding to FIG. 15.
Figure 24:
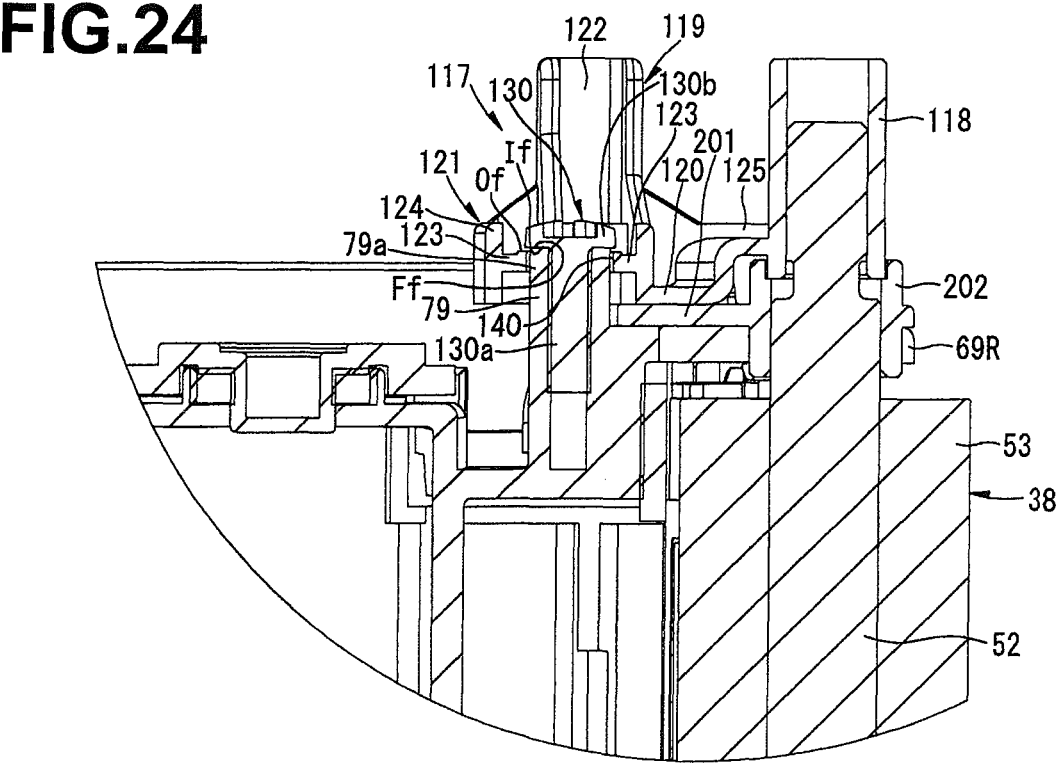
FIG. 24 is a sectional view of the developing cartridge taken along line A-A of FIG. 23.
Figure 25:
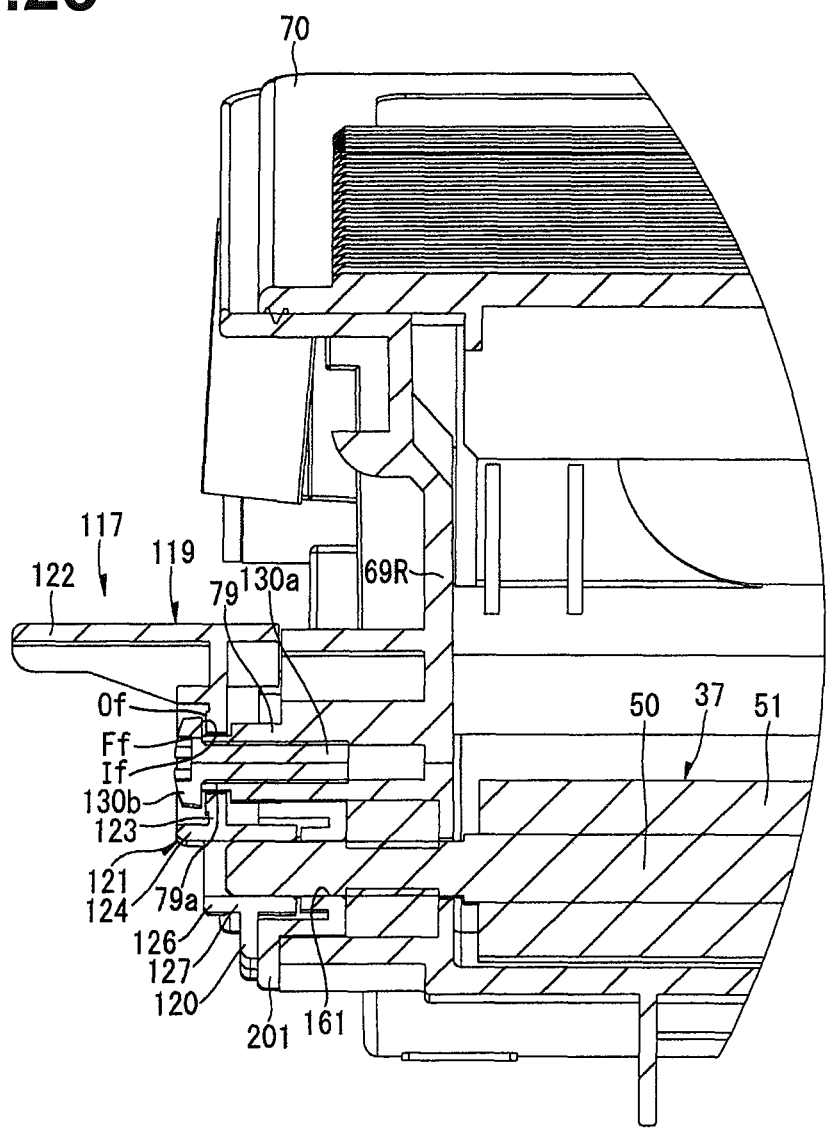
FIG. 25 is a sectional view of the developing cartridge taken along line B-B of FIG. 23.

FIG. 21 is a perspective view of the developing cartridge, corresponding to FIG. 6, with an electrode member detached from the developing cartridge. FIG. 22 is a perspective view of the developing cartridge, corresponding to FIG. 8, with the electrode member detached from the developing cartridge. FIG. 23 is a right side view of the developing cartridge, corresponding to FIG. 15. FIG. 24 is a sectional view of the developing cartridge taken along line A-A of FIG. 23. FIG. 25 is a sectional view of the developing cartridge taken along line B-B of FIG. 23.

With reference to FIGS. 21 to 25, the developing cartridge according to some further aspects will be described in detail below. It is to be noted that the similar reference numerals designate similar components, and a detailed explanation thereof is omitted.

(1) Developing Frame

The developing cartridge 30 according to some aspects has the developing frame 36 similar to that of the developing cartridge 30 according to above-described aspects, except for the following structures.

As shown in FIGS. 21 and 22, the developing frame 36 according to some aspects has a cylindrical screw portion 79, as a screw portion, for attaching the electrode member 117 to the right sidewall 69R closing the side (right side) of the developing chamber 42. The cylindrical screw portion 79 is of a cylindrical shape extending outward from the right sidewall 69R. Threaded grooves are formed on the inner circumferential surface of the cylindrical screw portion 79 for screwing a shaft 130a of the screw 130 into the cylindrical screw portion 79. Upper and lower ends of a free end 79a of the cylindrical screw portion 79 are cut out along the front-rear direction. Thus, the free end 79a is of substantially oval shape having flat portions on the upper and lower end thereof extending in the front-rear direction.

(2) Gear Mechanism Portion and Gear Cover

The developing cartridge 30 according to some aspects has the gear mechanism portion 92 and the gear cover 93 similar to those of the developing cartridge 30 according to earlier described aspects.

(3) Electrode Member

The developing cartridge 30 according to some aspects has the electrode member 117 similar to that of the developing cartridge 30 according to earlier described aspects, except for the following structures.

An opening 161 is formed on the front side of the bearing member 201. When the bearing member 201 is attached to the right sidewall 69R, the developing roller shaft 52 is inserted into the collar portion 202 and the supply roller shaft 50 is inserted into the opening 161. To prevent the cylindrical screw portion 79, which extends outward from the right sidewall 69R in the first direction from interfering with the bearing member 201, a part of the outer periphery of the bearing member 201 where the cylindrical screw portion 79 extends, is cut out. When the bearing member 201 is attached to the right sidewall 69R, the cylindrical screw portion 79 is exposed from the outer periphery of the bearing member 201.

The electrode member 117, as an electrode for applying developing bias to the developing roller shaft 52, is provided separately from the bearing member 201 on the right sidewall 69R, such that a part of the bearing member 201 is interposed between the right sidewall 69R and the electrode member 117. As shown in FIG. 24, the base plate 123, as an attached portion, of the electrode member 117, is disposed parallel to the attachment plate 120 at a position outward of the attachment plate 120 with respect to the first direction. As shown FIGS. 21 and 22, a screw hole 140, as an insertion portion, is formed at a substantially central portion of the base plate 123. In association with the free end 79a of the cylindrical screw portion 79, the screw hole 140 is of a substantially oval shape having flat portions that extend in the front-rear direction.

The outer rim plate 124 extends in the first direction from the outer periphery of the base plate 123 so as to connect the base plate 123 and the attachment plate 120. In the developing cartridge 30 according to some aspects, the electrode member 117 is attached to the right sidewall 69R in the following manner. First, ends of the developing roller shaft 52 and the supply roller shaft 50 are inserted into the developing roller shaft covering portion 118 and the supply roller shaft covering portion 127, respectively. At the same time, the cylindrical screw portion 79 provided on the right sidewall 69R is inserted into the screw hole 140 on the base plate 123, to fit the free end 79a of the cylindrical screw portion 79 in the screw hole 140. Thereafter, the screw 130, as a fixing member, is screwed into the cylindrical screw portion 79 exposed from the base plate 123.

The screw 130 is integrally formed with the shaft 130a having screw threads formed along an axial direction thereof and a screw head 130b provided on an end of the shaft 130a, as a separation prevention part, that extends, like a mushroom, in the radial direction of the shaft 130a. The diameter of the screw head 130b is the same as or slightly larger than the diameter of the cylindrical screw portion 79.

As shown in FIGS. 24 and 25, the screw 130 is screwed into the cylindrical screw portion 79, until an inward end face If, as a second end face, of the screw head 130b with respect to the axial direction of the screws 130 contacts a free end face Ff, as a third end face, of the cylindrical screw portion 79.

As the electrode member 117 is thus attached to the right sidewall 69R, the attachment plate 120 disposed between the developing roller shaft covering portion 118 and the base 121 contacts the bearing member 201, so that the electrode member 117 is positioned with respect to the first direction (width direction of the developing cartridge 30). The free end face Ff of the cylindrical screw portion 79 is disposed to protrude outward in the first direction toward the side of the screw head 130b slightly (e.g., 0.2 mm) from an outward face Of, as a first end face, of the base plate 123.

The inward end face If of the screw head 130b with respect to the axial direction of the screws 130 is disposed so as to contact the free end face Ff of the cylindrical screw portion 79 and to face the outward face Of the base plate 123 with a small distance (e.g., 0.2 mm) above and below the screw shaft 130a. The screw head 130b restricts or prevents, at a position opposite to the free end face Ff of the cylindrical screw portion 79, the separation or removal of the base plate 123 from the cylindrical screw portion 79.

Due to the distance between the inward end face If of the screw head 130b and the outward face Of the base plate 123, the electrode member 117 does not make intimate contact with the outward face Of the base plate 123. Accordingly, the electrode member 117 can move slightly, in association with a small clearance between the electrode member 117 and the cylindrical screw portion 79. When the developing bias terminal 131 provided in the main body casing 2 elastically contacts the upper surface of the contact plate 122, the developing roller shaft covering portion 118 moves slightly within the range of the small clearance between the electrode member 117 and the cylindrical screw portion 79. Accordingly, the outer circumferential surface of the end of the developing roller shaft 52 makes slidable and intimate contact with the inner circumferential surface of the developing roller shaft covering portion 118. Thus, the end of the developing roller shaft 52 is rotatably supported by the developing roller shaft covering portion 118. The supply roller shaft covering portion 127 also moves within the range of the small clearance. Therefore, the outer circumferential surface of the end of the supply roller shaft 50 also makes slidable and intimate contact with the inner circumferential surface of the supply roller shaft covering portion 127. Thus, the end of the supply roller shaft 50 is rotatably supported by the supply roller shaft covering portion 127.

(4) Effects of Developing Cartridge

As described above, in the developing cartridge 30, the electrode member 117 can move slightly within the range of the small clearance. When the developing bias terminal 131 provided in the main body casing 2 elastically contacts the upper surface of the contact plate 122, the developing roller shaft covering portion 118 moves within the range of the small clearance. Accordingly, while the outer circumferential surface of the end of the developing roller shaft 52 reliably makes contact with the inner circumferential surface of the developing roller shaft covering portion 118, the developing roller shaft 52 is rotated. In other words, the developing roller shaft covering portion 118 rotatably supports the developing roller shaft 52, and the electrode member 117 is moved such that the developing roller shaft covering portion 118 makes reliable contact with the developing roller 52 when the developing bias terminal 131 contacts the contact plates 122. Therefore, the developing bias is reliably applied from the developing bias terminal 131 to the developing shaft 52, via the contact plate 122 and the developing roller shaft covering portion 118.

In the developing cartridge 30, the electrode member 117 is attached to the right sidewall 69R readily using the screw 130, such that the electrode member can move slightly by the small clearance.

More specifically, when the inward end face If of the screw head 130b with respect to the axial direction of the screws 130 contacts the free end face Ff of the cylindrical screw portion 79, the screw head 130b and the base plate 123 are disposed with some distance therebetween. Thus, the distance between the outward face Of the base plate 123 and the inward end face If of the screw head 130b can be provided precisely and reliably. Consequently, the developing roller shaft covering portion 118 can make reliable contact with the developing roller shaft 52 while ensuring smooth rotation of the developing roller shaft 52 relative to the developing roller shaft covering portion 118.

In the developing cartridge 30, the developing roller shaft covering portion 118 and the contact plate 122 are provided so as to extend outward in the first direction from the right sidewall 69R along the developing roller shaft 52. Therefore, while the contact plate 122 reliably makes contact with the developing bias terminal 131, the smooth rotation of the developing roller shaft 52 relative to the developing roller shaft covering portion 118 can be ensured and the developing roller shaft covering portion 118 can reliably make contact with the developing roller shaft 52.

In the developing cartridge 30, the supply roller shaft covering portion 127 is provided in the electrode member 117. While the supply roller shaft 50 is rotatably supported by the supply roller shaft covering portion 127, the developing bias can be applied to the supply roller shaft 50 as well.

In the developing cartridge 30, the bearing member 201 is provided on the right sidewall 69R separately from the electrode member 117. As the bearing member 201 can bear or support the developing roller shaft 52, the developing roller shaft covering portion 118 can reliably make contact with the developing roller shaft 52 while ensuring smooth rotation of the developing roller shaft 52. Even when a bearing cannot be used as the electrode member 117, power can be reliably supplied to the developing roller shaft 52.

(5) Electrode Member According to Other Aspects

In the above-described description, with the distance between the inward end face If of the screw head 130b and the outward face Of the base plate 123, the developing roller shaft covering portion 118 is moved such that its inner peripheral surface reliably contacts the outer peripheral surface of the end of the developing roller shaft 52. However, the developing roller shaft covering portion 118 may be moved by a different manner, such that its inner peripheral surface reliably contacts the outer peripheral surface of the end of the developing roller shaft 52.

For example, before the electrode member 117 is attached to the right sidewall 69R, the electrode member 117 may be formed such that distance between a center of the screw hole 140 of the electrode member 117 and an axis of the developing roller shaft covering portion 118 slightly differs from distance between an axis of the cylindrical screw portion 79 and an axis of the developing roller shaft 52. As the thus-formed electrode member 117 is attached to the right sidewall 69R, the center of the screw hole 140 and the axis of the cylindrical screw portion 79 match with each other. However, the axis of the developing roller shaft covering portion 118 and the axis of the developing roller shaft 52 slightly differs from each other and does not match. Therefore, the outer peripheral surface of the end of the developing roller shaft 52 reliably contacts the inner peripheral surface of the developing roller shaft covering portion 118.

General Structure of Laser Printer

Figure 26:
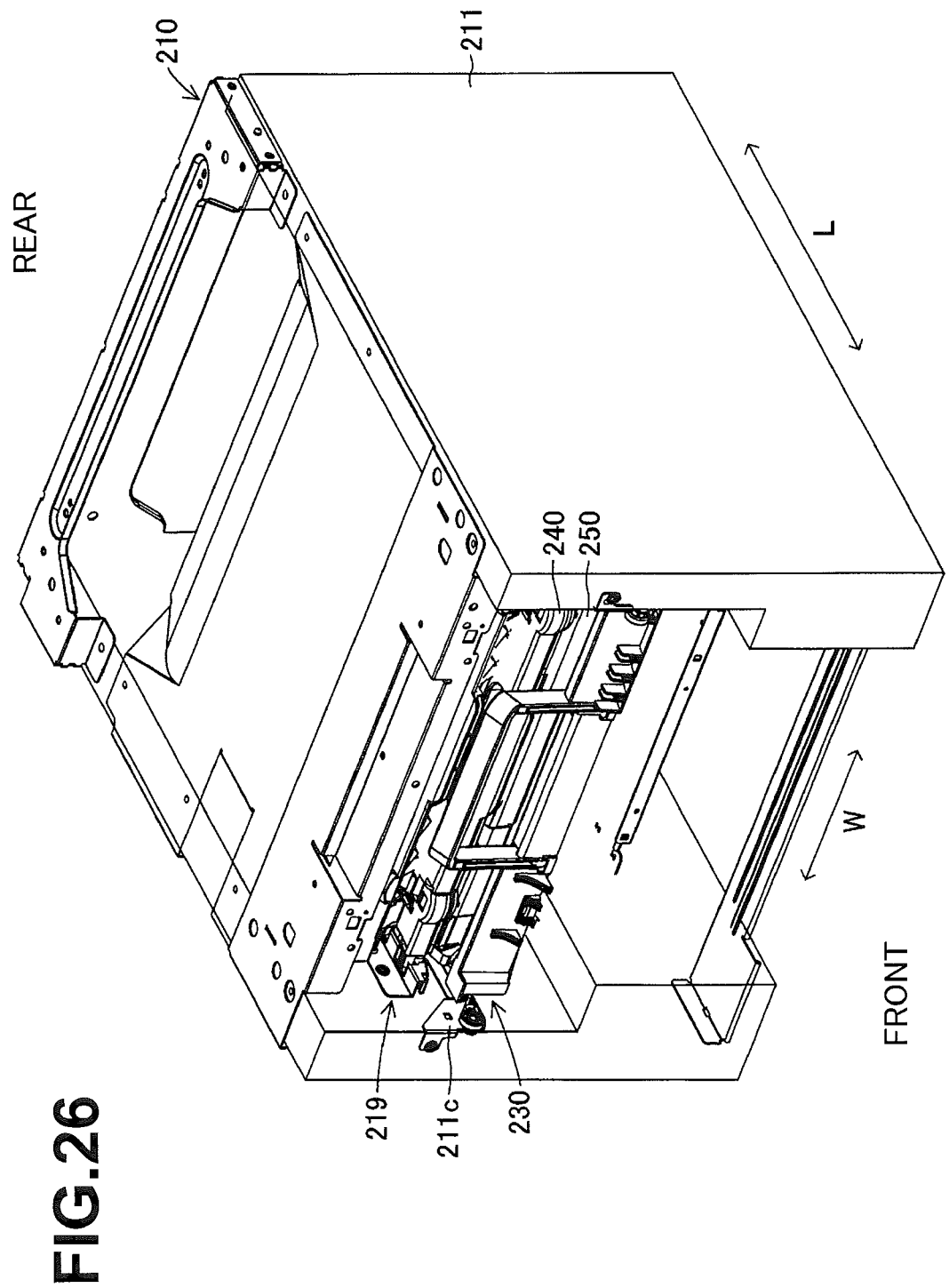
FIG. 26 is a perspective view of a color laser printer, as an image forming apparatus, according to another illustrative aspect of the invention.

FIG. 26 shows a perspective view of a color laser printer 210, as an image forming apparatus, according to another aspect of the invention. It should be noted that like numerals are used for like corresponding parts, a detailed description thereof is omitted and the above description may be applied.

Referring to FIG. 26, a main body casing 211 of the color laser printer 210 is structured so as to allow a process cartridge 230 to be removably installed therein. The process cartridge 230 according to this aspect is provided with sets of developing cartridges 240 and drum units 250. The developing cartridges 240 are installed in the process cartridge 230, with a longitudinal direction of the developing cartridges 240 parallel to a width direction of the color laser printer 210, as indicated by the arrow W. The developing cartridges 240 and the drum units 250 are arranged in a front-rear direction L, along a longitudinal direction of the color laser printer 210.

A pair of slide guide frames 211c is provided on inner wall surfaces of the main body casing 211. The slide guide frames 211c are structured to support the process cartridge 230 in the main body casing 211 and to guide the installation/removal of the process cartridge 230 in/from the main body casing 211 along the front-rear direction L. The slide guide frames 211c will be described in detail below.

A pair of linear cam mechanisms 219 is provided on the inner wall surfaces of the walls of the main body casing 211. The linear cam mechanisms 219 are structured to selectively press down the developing cartridges 240 arranged along the front-rear direction L. The linear cam mechanisms 219 will be described in detail below.

The color laser printer 210 according to this aspect is structured to perform full-color printing using the developing cartridges 240 containing toner of different colors, that is, using a black developing cartridge 240K, a cyan developing cartridge 240C, a magenta developing cartridge 240M, and a yellow developing cartridge 240Y. Toner images of multiple colors are attached and fused onto a recording medium (sheet).

(1) General Structure of Developing Cartridge

Figure 27:
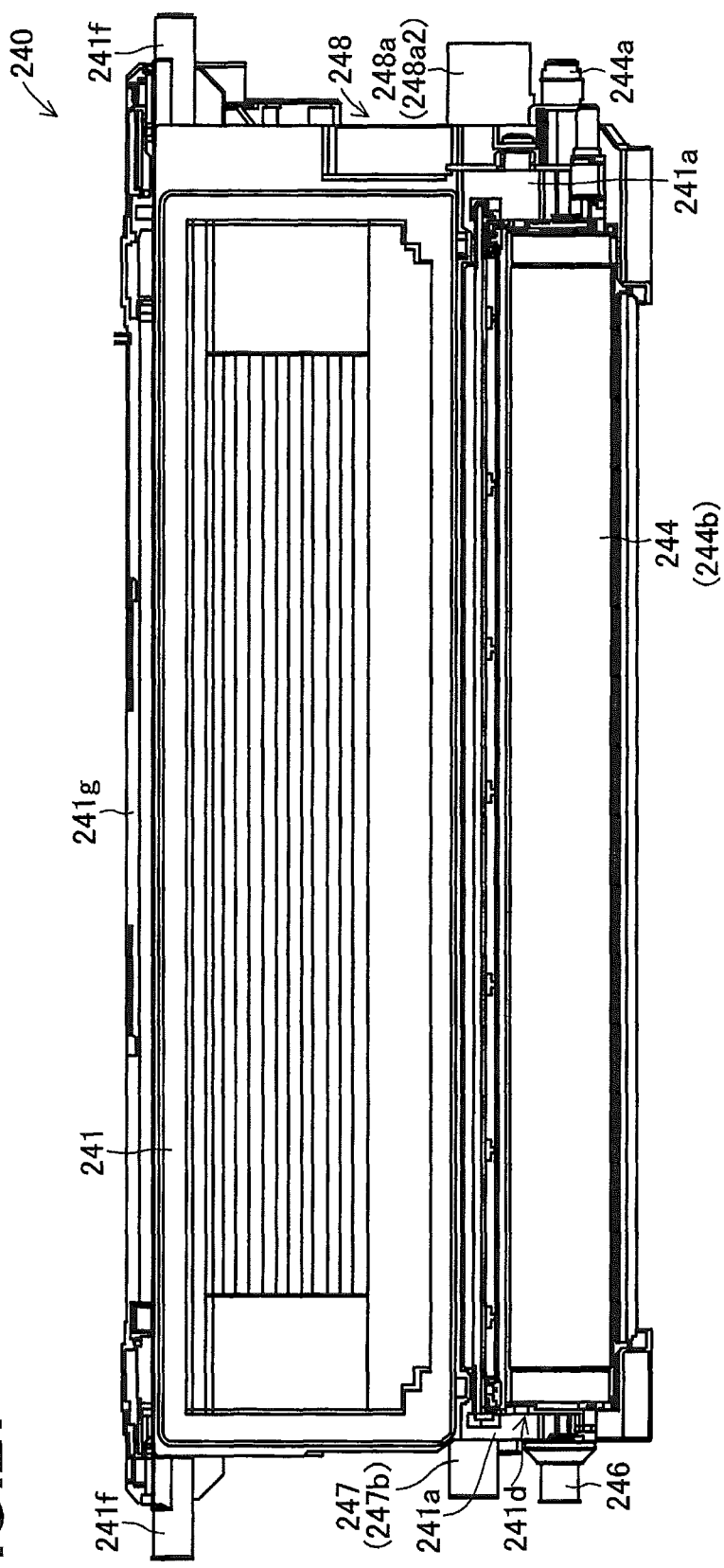
FIG. 27 is a front view of a developing cartridge according to the illustrative aspect shown in FIG. 26.
Figure 28:
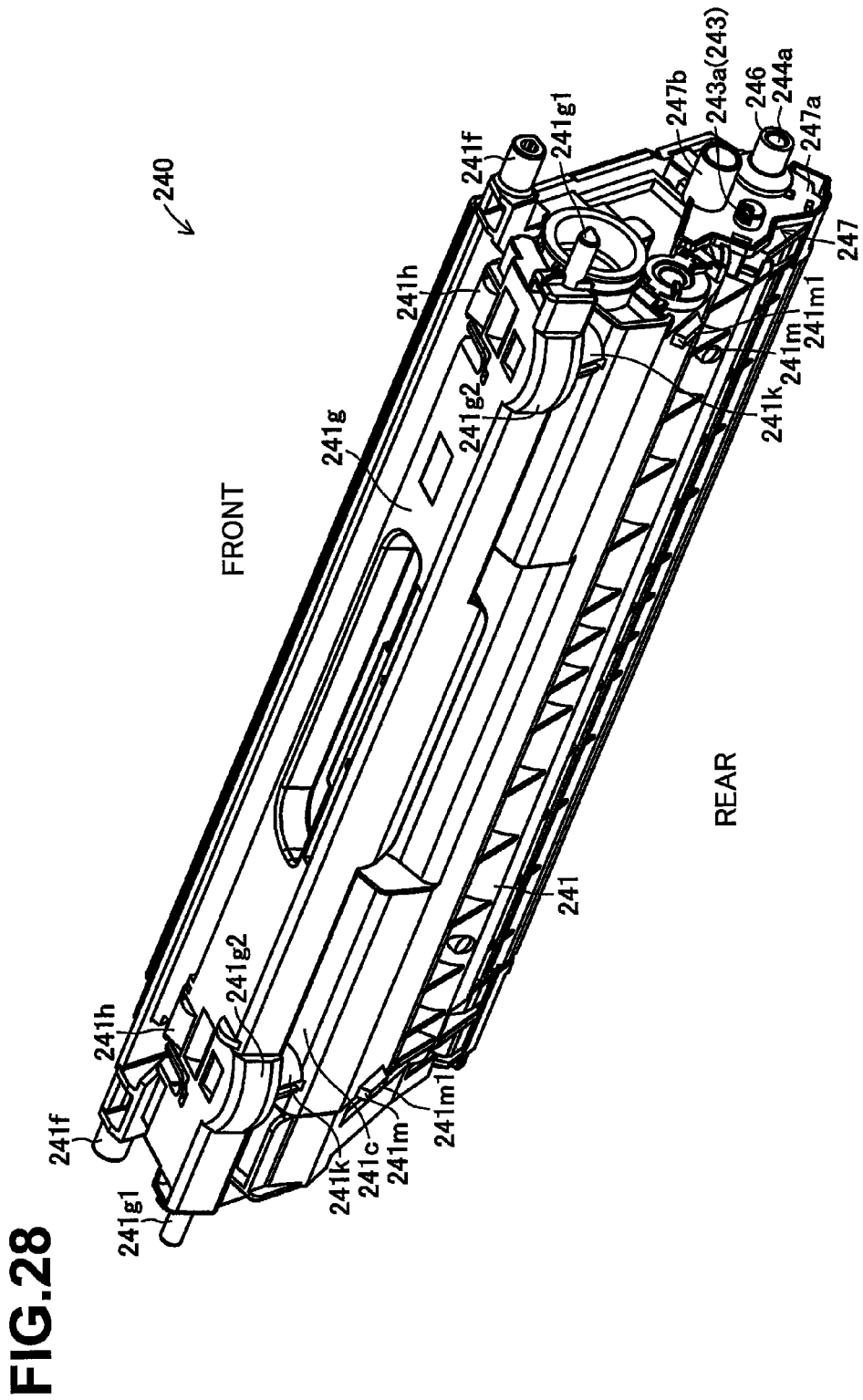
FIG. 28 is a perspective back view of the developing cartridge shown in FIG. 27.
Figure 29:
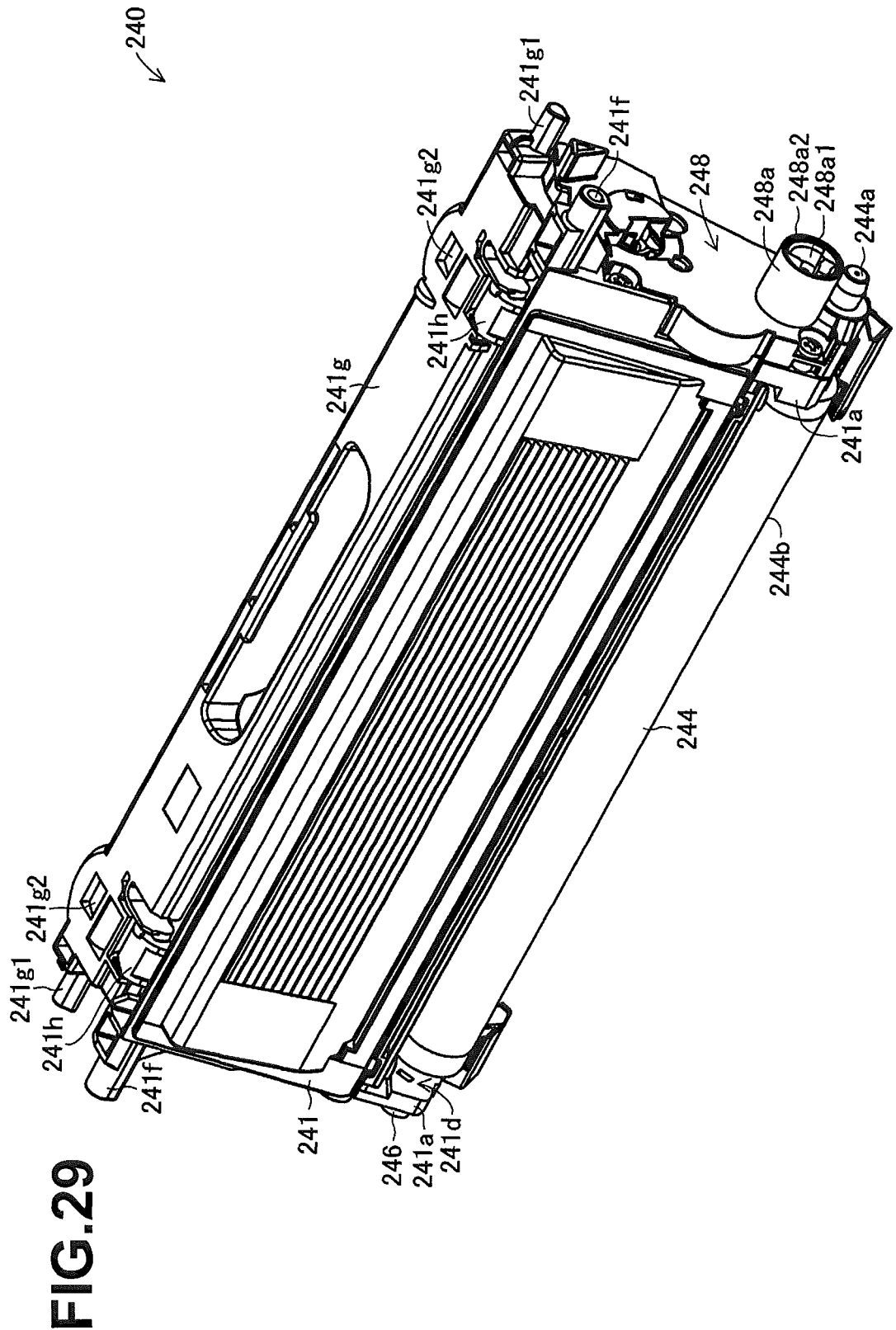
FIG. 29 is a perspective front view of the developing cartridge shown in FIG. 27.
Figure 30:
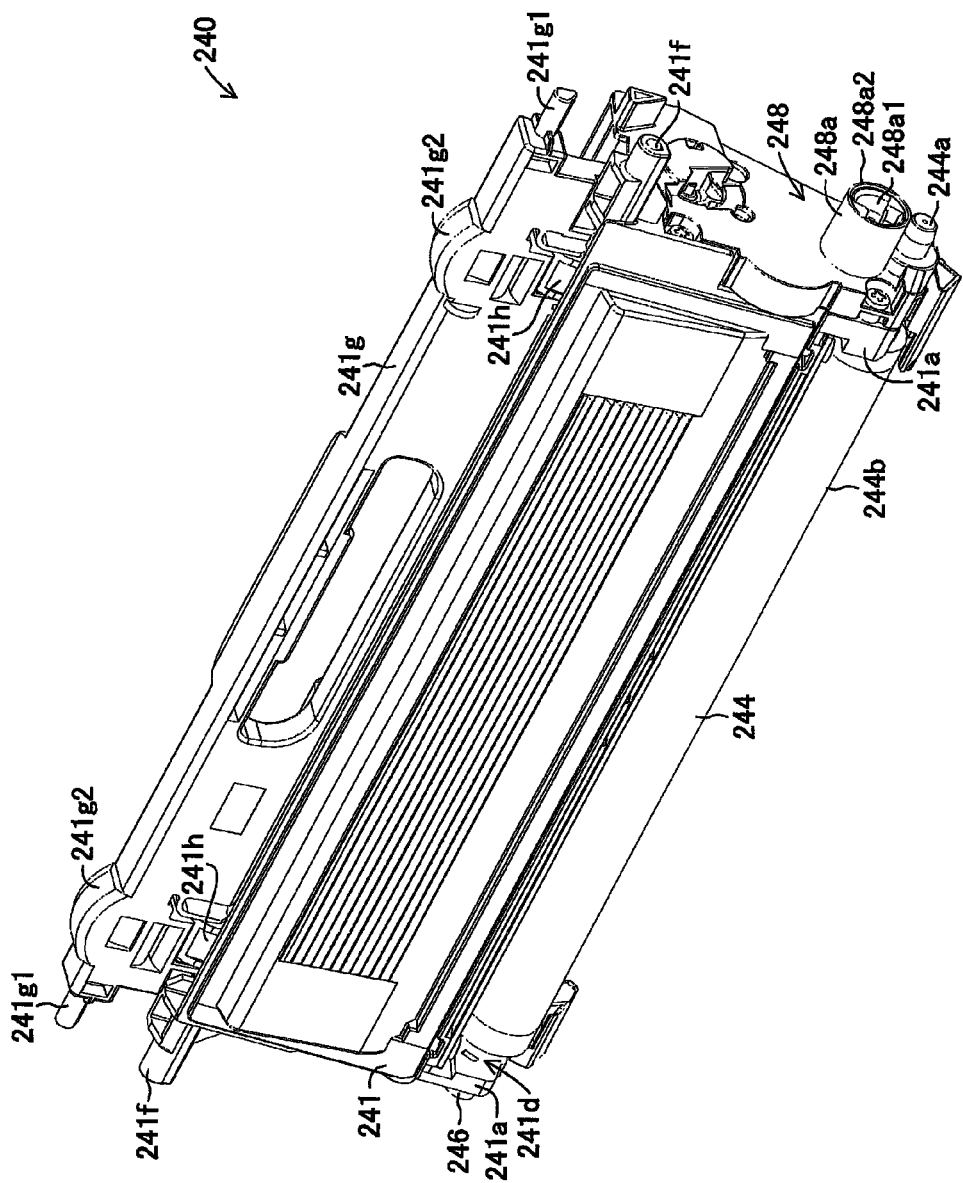
FIG. 30 is a perspective front view of the developing cartridge shown in FIG. 27.

FIG. 27 is a front view of the developing cartridge 240 according to the illustrative aspect shown in FIG. 26. FIG. 28 is a perspective back view of the developing cartridge 240 shown in FIG. 27. FIGS. 29 and 30 are perspective front views of the developing cartridge 240 shown in FIG. 27.

Referring to FIG. 27, a developing roller 244 is disposed in a developing frame 241. The developing frame 241 is structured such that a part of a toner carrying peripheral surface 244b of the developing roller 244 may be exposed outside from an opening portion 241d formed on a lower part of the developing frame 241. A developing roller shaft 244a, which constitutes an axis of the developing roller 244, is rotatably supported by a pair of side walls 241a of the developing frame 241.

(a) Structures of Conductive Member and Drive Force Input Portion

A collar member 246 is mounted on an end of the developing roller shaft 244a associated with one of the side walls 241a (left side wall in FIG. 27). An electrode member 247 is provided on the one of the side walls 241a on which the collar member 246 is provided. A gear mechanism portion 248 is disposed on the other side wall 241a (right side wall in FIG. 27).

Referring to FIG. 28, the electrode member 247 includes an attachment plate 247a and a terminal portion 247b. The attachment plate 247a is formed of a substantially flat shape. The attachment plate 247a has holes into which a supply roller shaft 243a and the developing roller shaft 244a are inserted. The attachment plate 247a is electrically connected to the supply roller shaft 243a and the developing roller shaft 244a by contacting thereto.

The terminal portion 247b extends outward from the attachment plate 247. An outer shape of the terminal portion 247b is of a cylindrical shape. In other words, the outer shape of the terminal portion 247b is substantially ring shaped when viewed from a side along the longitudinal direction of the developing cartridge 240. An outer peripheral surface of the terminal portion 247b is formed as a smooth cylindrical surface, so that a feeding member, which is configured to feed power to the terminal portion 247b by contacting the outer peripheral surface of the terminal portion 247b, may smoothly slide on the outer peripheral surface of the terminal portion 247b.

Referring to FIG. 29, the gear mechanism portion 248 includes a coupling part 248a. The coupling part 248a includes a driven coupling part 248a1 and an input opening portion 248a2.

The driven coupling part 248a1 is structured to engage with a drive rotor disposed on the main body casing 211 as shown in FIG. 26, to receive drive force via the drive rotor. The input opening portion 248a2 is formed of a cylindrical thin member so as to extend outward. The driven coupling part 248a1 is rotatably disposed in the input opening portion 248a2.

An outer shape of the driven coupling part 248a1 is formed so as to have a larger outside diameter than that of the collar member 246 and the terminal portion 247b of the electrode member 247, when viewed from a side along the longitudinal direction of the developing cartridge 240. More specifically, the outside diameter of the driven coupling part 248a1 is about one-and-a-half times larger than that of the terminal portion 247b and a small diameter portion 246a (in FIG. 38) of the collar member 246 that engages with the drum unit 250 (as shown in FIG. 26). The outer shape of the driven coupling part 248a1 is formed to include the outside diameter of the terminal portion 247b when viewed along the longitudinal direction of the developing roller shaft 244a. More specifically, as will be described in detail below, inside the outer shape of the driven coupling part 248a1 is a feeding member pressing position where the terminal portion 247b and the feeding member contact each other, when viewed along the longitudinal direction of the developing roller shaft 244a.

(b) General Structure of Developing Frame

Referring back to FIG. 28, formed on an upper wall 241c of the developing frame 241 is a pair of separation bosses 241f configured to urge the developing cartridge 240 upward when an image forming operation is not performed. The separation bosses 241f extend outward along the longitudinal direction of the developing cartridge 240 from front ends of the upper wall 241c.

A holding portion 241g is disposed on the upper wall 241c of the developing frame 241. The holding portion 241g is pivotally supported about hinges 241h disposed on front portions of the upper wall 241c. For the installation and removal of the developing cartridge 240, the holding portion 241g is pivotally moved to an upright position, as shown in FIG. 30, so that a user may hold the holding portion 241g. The holding portion 241g is structured to urge the developing frame 241 downward as the holding portion 241g placed in a rest position, as shown in FIGS. 28 and 29, is pressed down during the image forming operation.

Referring to FIG. 28, the holding portion 241g is formed with a pair of pressed bosses 241g1 for urging the developing frame 241 downward during the image forming operation. The pressed bosses 241g1 extend outward along the longitudinal direction of the developing cartridge 240 from free ends of the holding portion 241g. Pressing portions 241g2 are disposed inwardly of the pressed bosses 241g1 with respect to the longitudinal direction of the developing cartridge 240. When the pressed bosses 241g1 are pressed down, the pressing portions 241g2 may be urged toward press actuation mechanisms 241k disposed below the pressing portions 241g2.

A pair of the press actuation mechanisms 241k is disposed on the upper wall 241c of the developing frame 241. The press actuation mechanisms 241k are disposed at ends of the upper wall 241c with respect to its longitudinal direction, in association with a pair of the pressing portions 241g2. The press actuation mechanisms 241k are structured to urge the developing frame 241 downward as the press actuation mechanisms 241k are pressed down by the pressing portions 241g2. The press actuation mechanisms 241k will be described in detail below.

A pair of guide projections 241m is formed on upper portions of a rear side of the developing frame 241. Each guide projection 241m has a guide surface 241m1 formed into a substantially flat shape.

Figure 31:
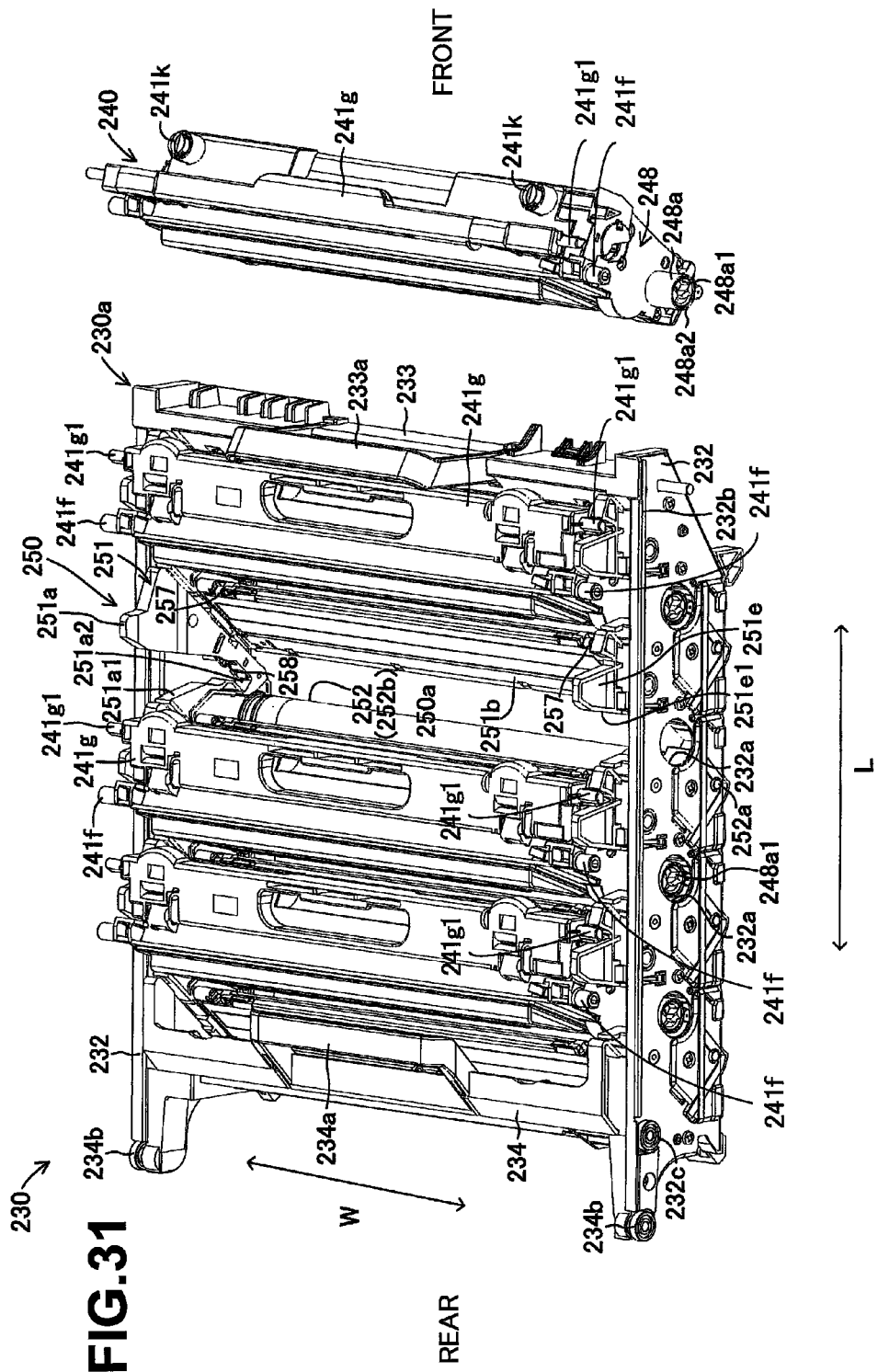
FIG. 31 is a perspective overhead view of a process cartridge shown in FIG. 26 according to an illustrative aspect.
Figure 32:
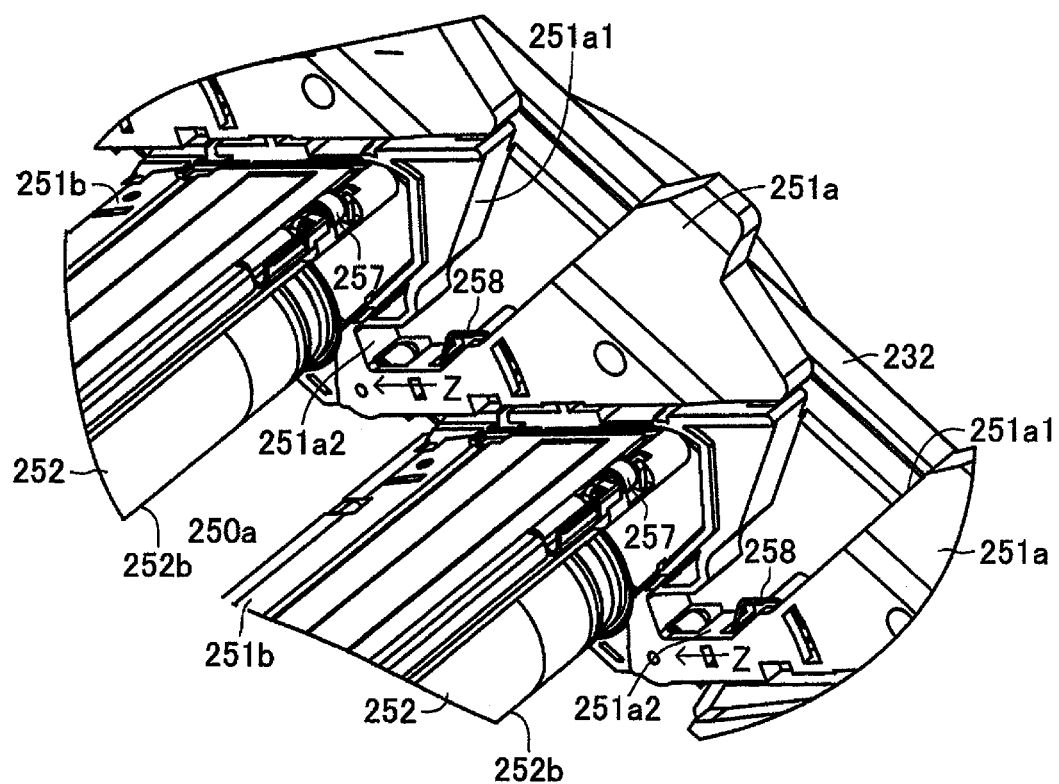
FIG. 32 is a partially enlarged perspective view of a photoconductive unit shown in FIG. 31 according to an illustrative aspect.
Figure 33A:
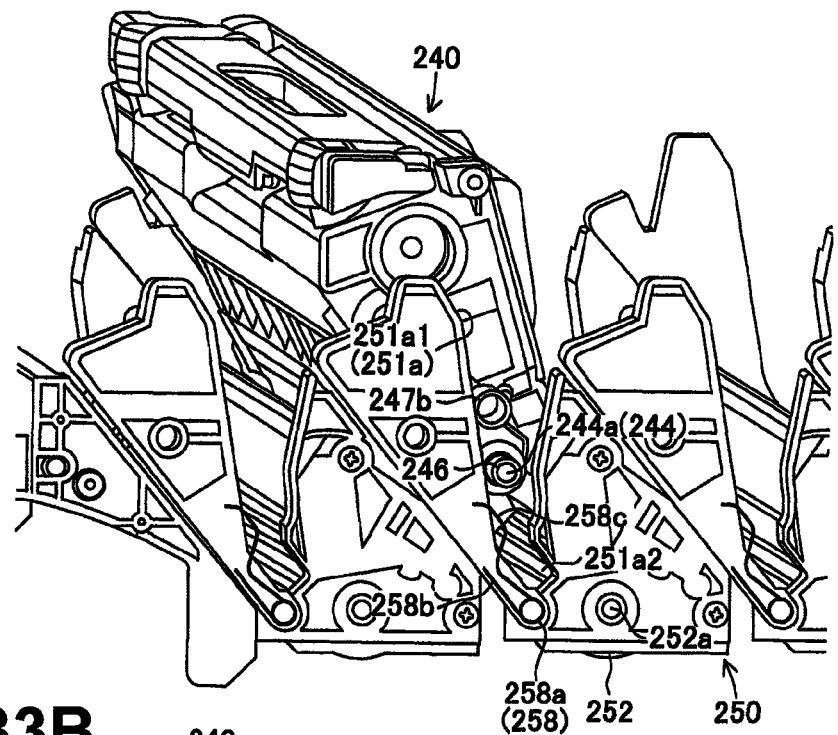
FIGS. 33A and 33B are perspective views of the photoconductive unit shown in FIG. 31, viewed from a side at an angle.
Figure 33B:
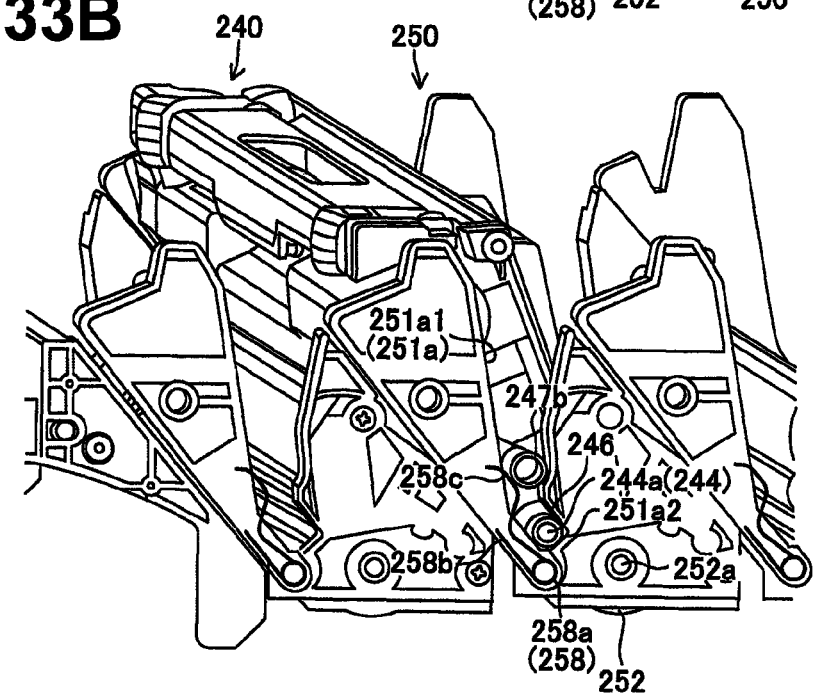
Figure 34A:
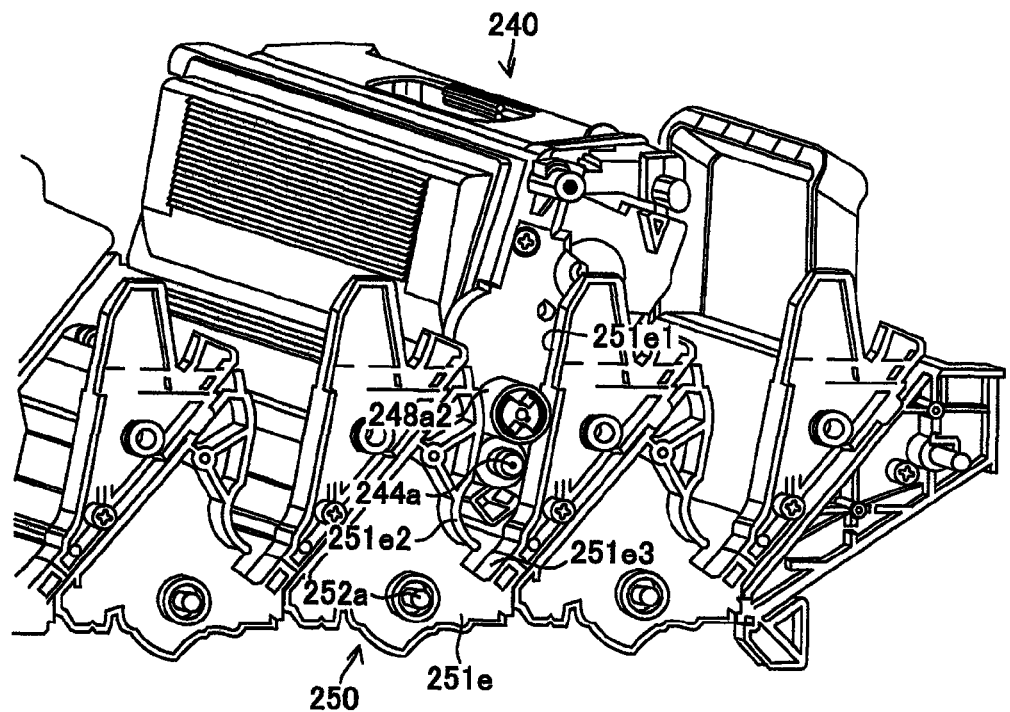
FIGS. 34A and 34B are perspective views of the photoconductive unit shown in FIG. 31, viewed from a side at an angle opposite to the side shown in FIGS. 33A and 33B.
Figure 34B:
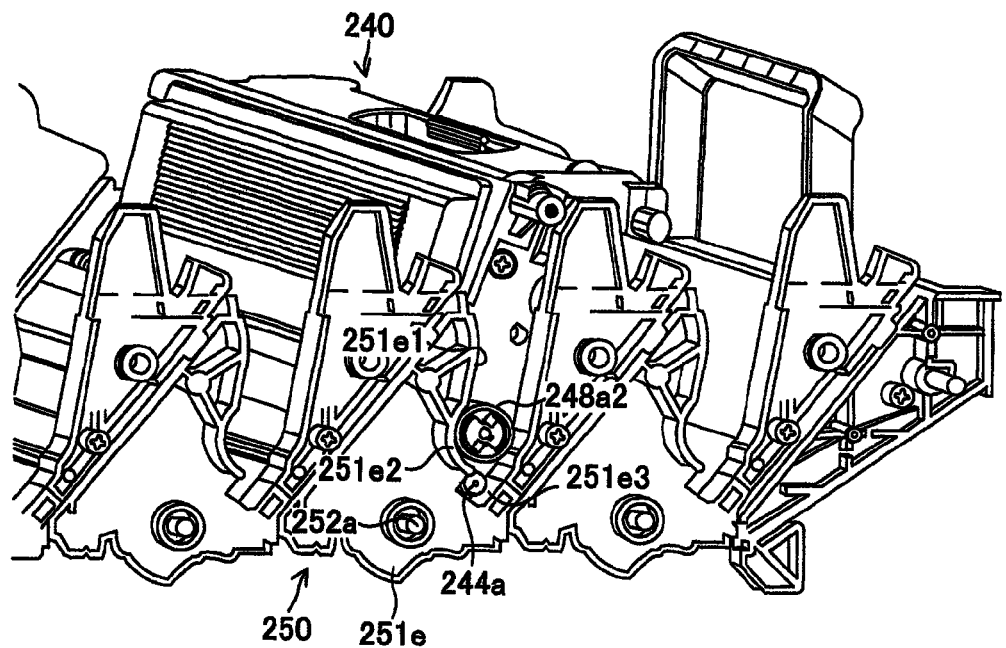

2. Detailed Structure of Removably Installing Developing Cartridge and Photoconductive Unit FIG. 31 is a perspective overhead view of the process cartridge 230 shown in FIG. 26. FIG. 31 shows that one of the four developing cartridges 240 is removed from the process cartridge 230. FIG. 32 is a partially enlarged perspective view of the drum unit 250 shown in FIG. 31. More specifically, FIG. 32 is an enlarged perspective view showing one end portion of the drum unit 250, with respect to its width direction, from which one developing cartridge 240 is removed. FIGS. 33A and 33B are perspective views of the drum unit 250 shown in FIG. 31, viewed from a side at an angle. FIGS. 34A and 34B are perspective views of the drum unit 250 shown in FIG. 31, viewed from a side at an angle opposite to the side shown in FIGS. 33A and 33B.

Referring to FIG. 31, the process cartridge 230 includes four sets of the developing cartridges 240 and the drum units 250 that are arranged along the front-rear direction L. The developing cartridges 240 and the drum units 250 are installed in a process cartridge frame 230a.

The process cartridge frame 230a includes a pair of side frames 232, a front beam 233 and a rear beam 234. The front beam 233 is disposed at front ends (right side in FIG. 31) of the side frames 232 between the side frames 232. The rear beam 234 is disposed at rear ends (left side in FIG. 31) of the side frames 232 between the side frames 232. In a substantially rectangular area, in plan view, defined by the side frames 232, the front beam 233 and the rear beam 234, the four drum units 250 are fixed. The developing cartridges 240 may be installed in the process cartridge frame 230a via the drum units 250.

Coupling exposure holes 232a, as through holes, are formed at substantially central portions of the side frame 232 with respect to its height direction. The coupling exposure hole 232a is structured to expose the coupling part 248a outward of the process cartridge frame 230a, through the coupling exposure hole 232a when the developing cartridge 240 is installed in the process cartridge frame 230a.

A guide rib 232b is formed on an upper end of each side frame 232. The guide rib 232b extends outward in the width direction W. The guide rib 232b has a length parallel to the front-rear direction L. Side frame guide rollers 232c are rotatably supported at the rear end portions of the side frames 232 just below the guide ribs 232b.

The side frames 232 are structured to guide the installation and removal of the process cartridge 230 along the front-rear direction L, by making the guide ribs 232b and the side frame guide rollers 232c slide on the slide guide frames 211c (in FIG. 26) of the main body casing 211.

A front beam handle 233a is formed on an upper end of the front beam 233 at a central portion thereof with respect to the width direction W. A rear beam handle 234a is formed on an upper end of the rear beam 234 at a central portion thereof with respect to the width direction W. The front beam handle 233a and the rear beam handle 234a extend upward so as to form an inverted U shape such that a user can hold the handles 233a, 234a when the process cartridge 230 removed from the main body casing 211 (in FIG. 26) is handled.

A pair of rear beam guide rollers 234b is rotatably supported at each end of the rear beam 234. The rear beam guide roller 234b and the side frame guide roller 232c are arranged along the front-rear direction L. The rear beam guide rollers 234b are structured to operate similar to the side frame guide rollers 232c.

(1) Detailed Structure of Drum Unit

A drum frame 251 is supported by a pair of the side frames 232. The drum frame 251 includes a right side wall 251a, a bottom wall 251b, and a left side wall 251e. An area defined by the right side wall 251a, the bottom wall 251b, and the left side wall 251e is formed as a developing cartridge installation portion 250a in which the developing cartridge 240 is installed. A photoconductive drum 252 is rotatably supported below the developing cartridge installation portion 250a between the right side wall 251a and the left side wall 251e.

Referring to FIGS. 31 and 32, the right side wall 251a is fixed, for example, by a screw to one of the side frames 232 (upper side frame in FIG. 31). An upward-open collar positioning guide groove 251a1 is formed on the right side wall 251a. A collar positioning accommodation base 251a2 is formed at a lower end of the collar positioning guide groove 251a1. The collar positioning accommodation base 251a2 is formed substantially straightly toward the photoconductive drum 252 along a guiding direction Z, as shown by an arrow in FIG. 32. An end of a drum shaft 252a of the photoconductive drum 252 is exposed outside the side frame 232 for grounding.

As shown in FIGS. 33A and 33B, the collar positioning guide groove 251a1 is formed to guide the collar member 246, which is disposed on an end of the developing cartridge 240, in the substantially vertical direction. As shown in FIG. 33B, the collar positioning accommodation base 251a2 is formed to perform positioning of the developing cartridge 240 and the drum unit 250 as the collar positioning accommodation base 251a2 contacts the collar member 246. More specifically, when the collar member 246 is guided in the collar positioning accommodation base 251a2 along the guiding direction Z and contacts the lower end of the collar positioning accommodation base 251a2, the developing roller shaft 244a and the drum shaft 252a are placed in position. Thus, the positional relation between the developing roller 244 and the photoconductive drum 252 can be set properly to a predetermined state.

Referring to FIGS. 31 and 32, a developing cartridge insertion roller 257 is rotatably supported at each upper end of the bottom wall 251b with respect to the width direction W. The developing cartridge insertion rollers 257 are structured to guide the installation of the developing cartridge 240 in the developing cartridge installation portion 250a along the guiding direction Z, as shown in FIG. 32, by contacting to the guide surfaces 241m1 of the guide projections 241m (in FIG. 28) provided in the developing cartridge 240.

Referring to FIG. 31, the left side wall 251e is fixed, for example, by a screw to the other one of the side frames 232 (lower side frame in FIG. 31). An upward-open coupling part guide groove 251e1 is formed on the left side wall 251e. The coupling part guide groove 251e1 is formed to guide the input opening portion 248a2 of the coupling part 248a, which is provided on the other end of the developing cartridge 240, along the substantially vertical direction.

Referring to FIGS. 34A and 34B, a coupling accommodation base 251e2 is formed at a lower end of the coupling part guide groove 251e1. As shown in FIG. 34B, the coupling accommodation base 251e2 is formed to perform positioning of the developing cartridge 240 and the drum unit 250 as the coupling accommodation base 251e2 contacts the input opening portion 248a2. In other words, when the input opening portion 248a2 is accommodated in the coupling accommodation base 251e2, the developing roller shaft 244a and the drum shaft 252a may be placed in position.

A developing roller shaft end accommodating portion 251e3 is formed below the coupling accommodation base 251e2. The developing roller shaft end accommodating portion 251e3 is structured to receive an end of the developing roller shaft 244a when the input opening portion 248a2 is accommodated in the coupling accommodation base 251e2.

Referring to FIGS. 33A to 34B, the width of at least a lower half of the collar positioning guide groove 251a1 is set smaller than that of the coupling part guide groove 251e1. In other words, the collar positioning guide groove 251a1 is formed to have such a width that does not accommodate the input opening portion 248a2 in the base portion of the collar positioning guide groove 251a1, that is, in the collar positioning accommodation base 251a2.

(2) Structure of Feeding Power to Developing Roller

Referring to FIGS. 33A and 33B, a developing bias terminal 258, as a relay-electrode member (feeding member), is provided on an outer surface of the right side wall 251a. The developing bias terminal 258 includes a base 258a, a fixed part 258b, and a movable part 258c, which are integrally formed by bending a wire.

The base 258a is formed into a coiled shape with two or three loops. The fixed part 258b and the movable part 258c are connected to ends of the base 258a. The base 258a and the fixed part 258b are engaged with the outer surface of the right side wall 251a and fixed thereon. The fixed part 258b is structured and disposed such that it may be electrically connected, when the drum units 250 are installed in the main body casing 211 (in FIG. 26), to a power feed output electrode provided in the main body casing 211.

The movable part 258c is structured to elastically pivot about the base 258a. The developing bias terminal 258 is disposed such that the movable part 258c is exposed in the collar positioning guide groove 251a1. As shown in FIG. 33B, the movable part 258c contacts the terminal portion 247b while the movable part 258c and the terminal portion 247b press each other, when the developing cartridge 240 is set with the drum unit 250. Thus, the movable part 258c may be electrically connected to the terminal portion 247b.

Figure 37B:
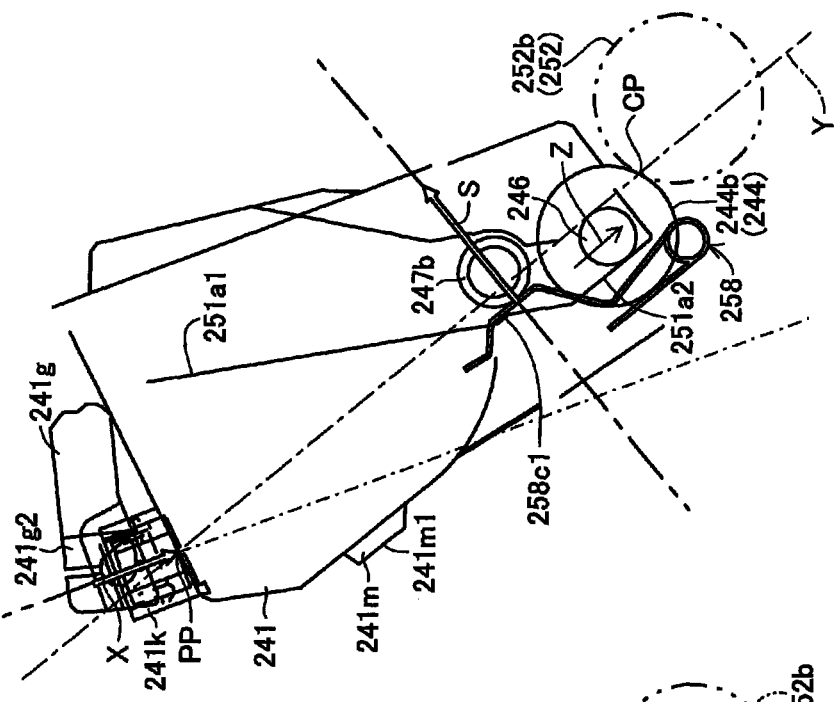
FIG. 37B is an explanatory schematic showing forces exerted on the developing cartridge in the pressing state (position) shown in FIG. 37A.
Figure 37A:
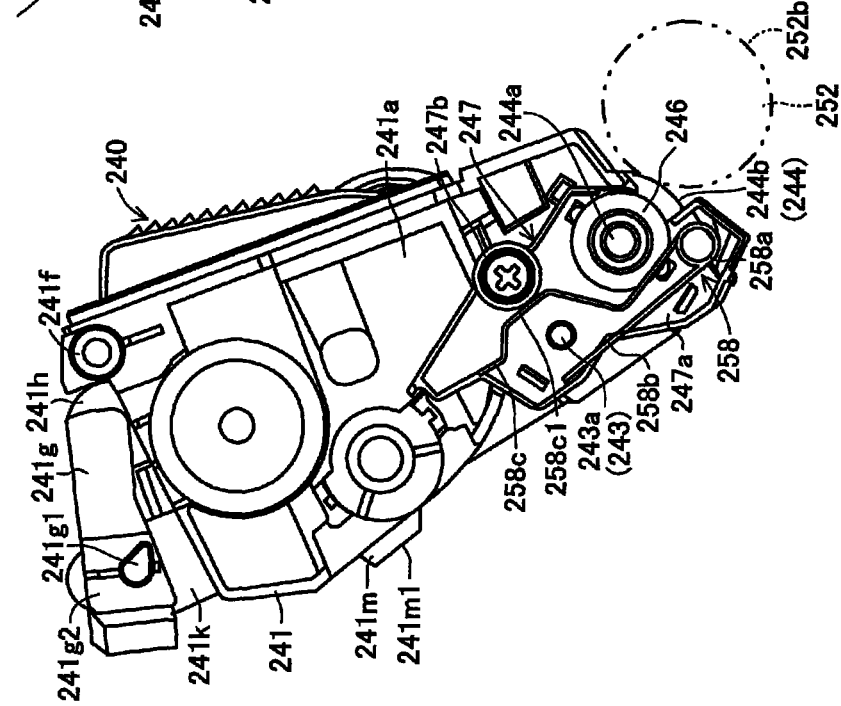
FIG. 37A is a side view of the developing cartridge in the press state (position), viewed from a side opposite to the side shown in FIG. 35B.

3. Detailed Structure of Pressing Developing Cartridge Toward Photoconductive Drum FIG. 35A is a side view of the developing cartridge 240, shown in FIG. 27, in a non-pressing (retracted) state (position). FIG. 35B is a side view of the developing cartridge 240, shown in FIG. 27, in a pressing state (position). FIG. 36A is an enlarged cross-sectional side view of the press actuation mechanism 241k in the non-pressing state (position), viewed from a side opposite to the side shown in FIG. 35A. FIG. 36B is an enlarged cross-sectional side view of the press actuation mechanism 241k in the pressing state (position), viewed from a side opposite to the side shown in FIG. 35B. FIG. 37A is a side view of the developing cartridge 240 in the pressing state (position), viewed from a side opposite to the side shown in FIG. 35B. FIG. 37B is an explanatory schematic showing forces exerted on the developing cartridge 240 in the pressing state (position) shown in FIG. 37A.

Referring to FIGS. 35A and 35B, the press actuation mechanisms 241k are structured such that the developing frame 241 may be elastically urged toward the guiding direction Z, based on a very little pivotal movement of the holding portion 241g about hinges 241h in the clockwise direction in FIGS. 35A and 35B. In other words, the press actuation mechanisms 241k are structured to convert the downward movement of the pressing portions 241g2 exerted when the pressed bosses 241g1 disposed on the free-end side of the holding portion 241g are pressed down, into a force for elastically urging the developing frame 241 along the guiding direction Z.

The guide surfaces 241m1 of the guide projections 241m make slidable contact with the developing cartridge insertion rollers 257, so that the developing frame 241 may be guided along the guiding direction Z.

Referring to FIGS. 36A and 36B, each press actuation mechanism 241k includes a movement member 241k1, a guide cylinder 241k2, and a developing cartridge urging spring 241k3.

The movement member 241k1 is accommodated in the guide cylinder 241k2, which is formed into a substantially cylindrical shape. The movement member 241k1 may reciprocate in the substantially vertical direction along an axis of the guide cylinder 241k2.

The developing cartridge urging spring 241k3 is disposed between the movement member 241k1 and the upper wall 241c of the developing frame 241. The developing cartridge urging spring 241k3 is structured to urge the movement member 241k1 substantially upward. In other words, the developing cartridge urging spring 241k3 is structured to urge or press the upper wall 241c of the developing frame 241 substantially downward when the movement member 241k1 is pressed substantially downward, as shown in FIG. 36B. In this aspect, an action point (pressing position PP), where the downward pressing (urging) by the developing cartridge urging spring 241k3 is acted on the upper wall 241c, is provided at an intersection of the upper wall 241c and the axial line of the developing cartridge urging spring 241k3.

A hook 241k4 is formed on a lower end of the movement member 241k1, so as to extend outward. The hook 241k4 is movable along the substantially vertical direction in a hook movement guide slit 241k5 formed in the guide cylinder 241k2. An upper end of the hook movement guide slit 241k5 is closed by a hook stopper 241k6. More specifically, as the hook 241k4 contacts the hook stopper 241k6, the movement member 241k1 can be prevented from being separated from the guide cylinder 241k2.

Referring to FIGS. 37A and 37B, the guide surface 241m1 of the guide projection 241m is formed to have a surface parallel to a pressing action line Y connecting a pressing position PP, which is the action point, and a contact position (developing position) CP. More specifically, the pressing action line Y is set parallel to the collar positioning accommodation base 251a2 (guiding direction Z).

In this aspect, an angle formed between a developing cartridge pressing direction X at the pressing position PP and the pressing action line Y is about 20 degrees. Thus, the guide surfaces 241m1 of the guide projections 241m are set to press the developing cartridge insertion rollers 257 (FIGS. 35A and 35B) at a predetermined force.

In this aspect, the movable part 258c of the developing bias terminal 258 includes a feeding member opposing portion 258c1 formed straightly at a position facing the terminal portion 247b. The developing bias terminal 258 is structured such that the feeding member opposing portion 258c1 is parallel to the pressing action line Y and the guiding direction Z, when the developing cartridge 240 is pressed, that is, when the toner carrying peripheral surface 244b of the developing roller 244 and an image carrying peripheral surface 252b of the photoconductive drum 252 contact with each other at the contact position CP at a predetermined pressure.

In this aspect, the developing bias terminal 258 is structured such that a direction (feeding member pressing direction) S in which the feeding member opposing portion 258c1 of the movable part 258c of the developing bias terminal 258 and the terminal portion 247b of the electrode member 247 press each other, is set substantially perpendicular to the pressing action line Y and the guiding direction Z. More specifically, the angle formed between the direction S and the pressing action line Y/the guiding direction Z is set to about 90 degrees (e.g., between 89 and 91 inclusive).

Figure 38:
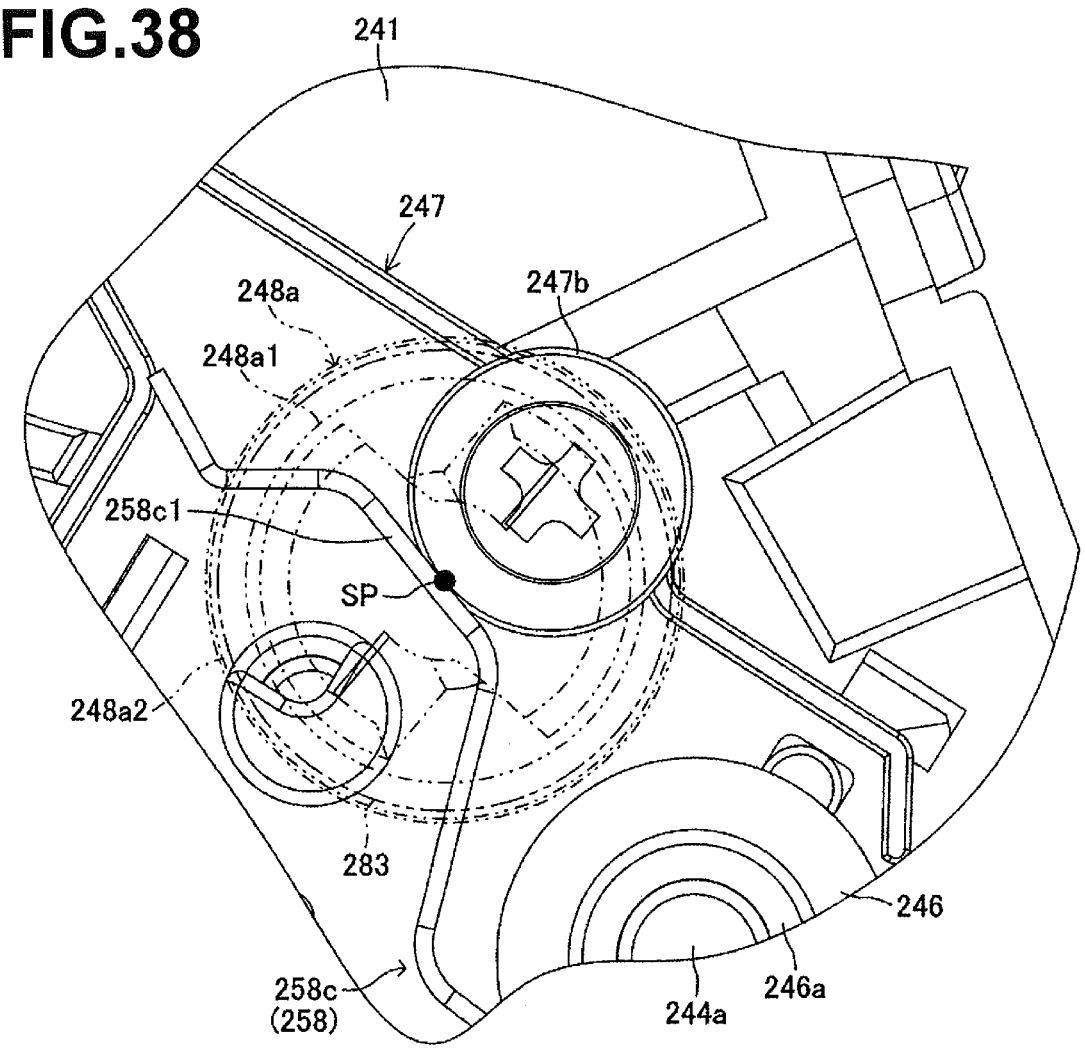
FIG. 38 is an enlarged side view showing a periphery of a terminal portion shown in FIG. 37A.

FIG. 38 is an enlarged side view showing a periphery of the terminal portion 247b shown in FIG. 37A. In FIG. 38, the coupling part 248a provided on the developing frame 241 opposite side of the terminal portion 247b and a coupling drive gear 283, as a second cylindrical portion, provided concentrically with the coupling part 248a, are indicated in double dashed chain lines.

Referring to FIG. 38, the driven coupling part 248a1 of the coupling part 248a is formed to have a larger outside diameter than that of a small diameter portion 246a of the collar member 246 and the terminal portion 247b. The outer shape of the driven coupling part 248a1 and the coupling drive gear 283 is formed to include a feeding member pressing position SP when viewed from a side along the longitudinal direction of the developing cartridge 240. At the feeding member pressing position SP, the terminal portion 247b contacts the feeding member opposing portion 258c1 of the movable part 258c of the developing bias terminal 258. In this aspect, the coupling part 248a and the coupling drive gear 283 are structured such that the feeding member pressing position SP substantially matches with the axis of the driven coupling part 248a1 and the coupling drive gear 283.

4. Detailed Structure of Selectively Pressing the Developing Cartridges

Figure 39:
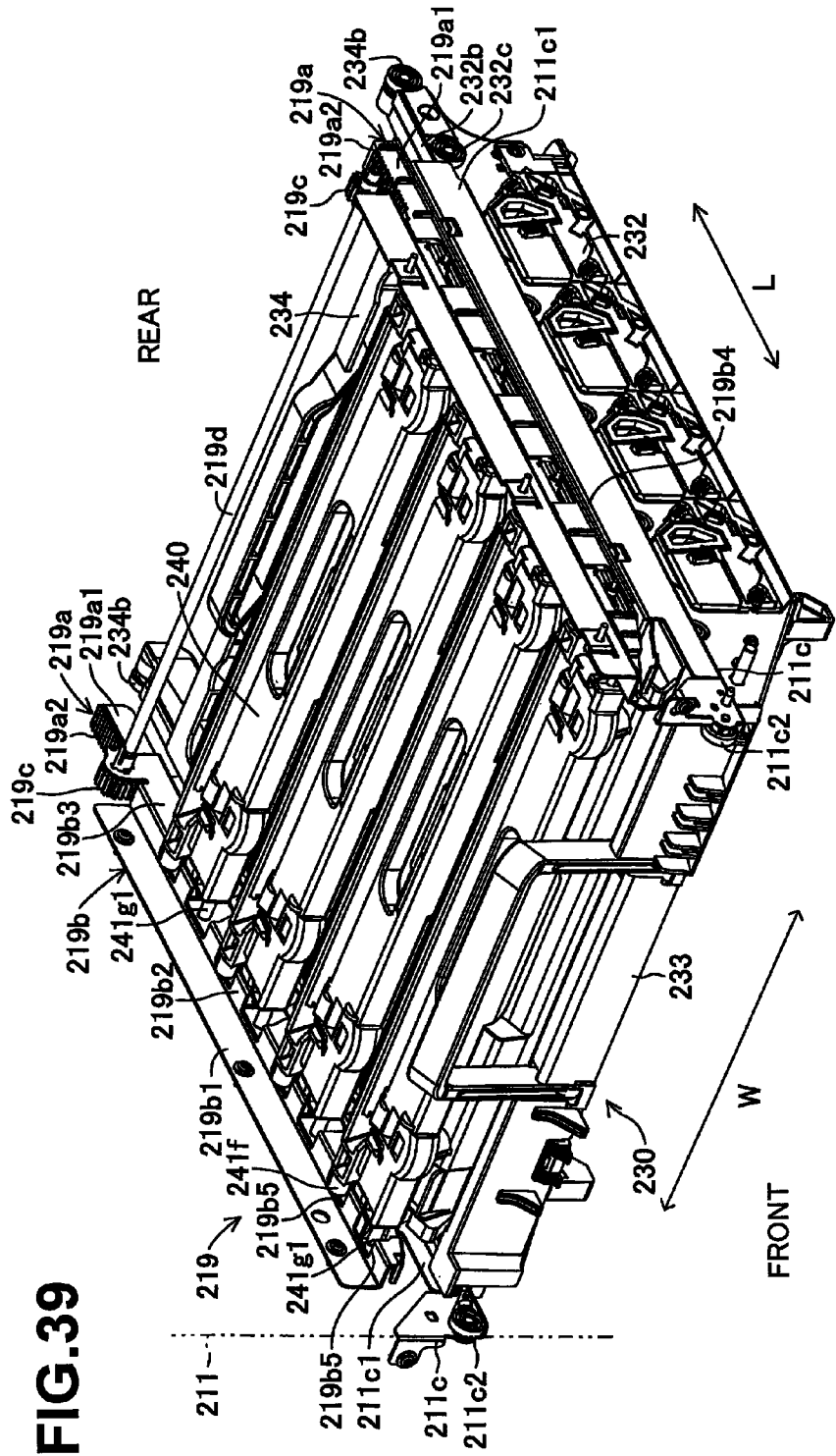
FIG. 39 is an enlarged perspective view showing a periphery of the process cartridge shown in FIG. 26 according to an illustrative aspect.
Figure 40:
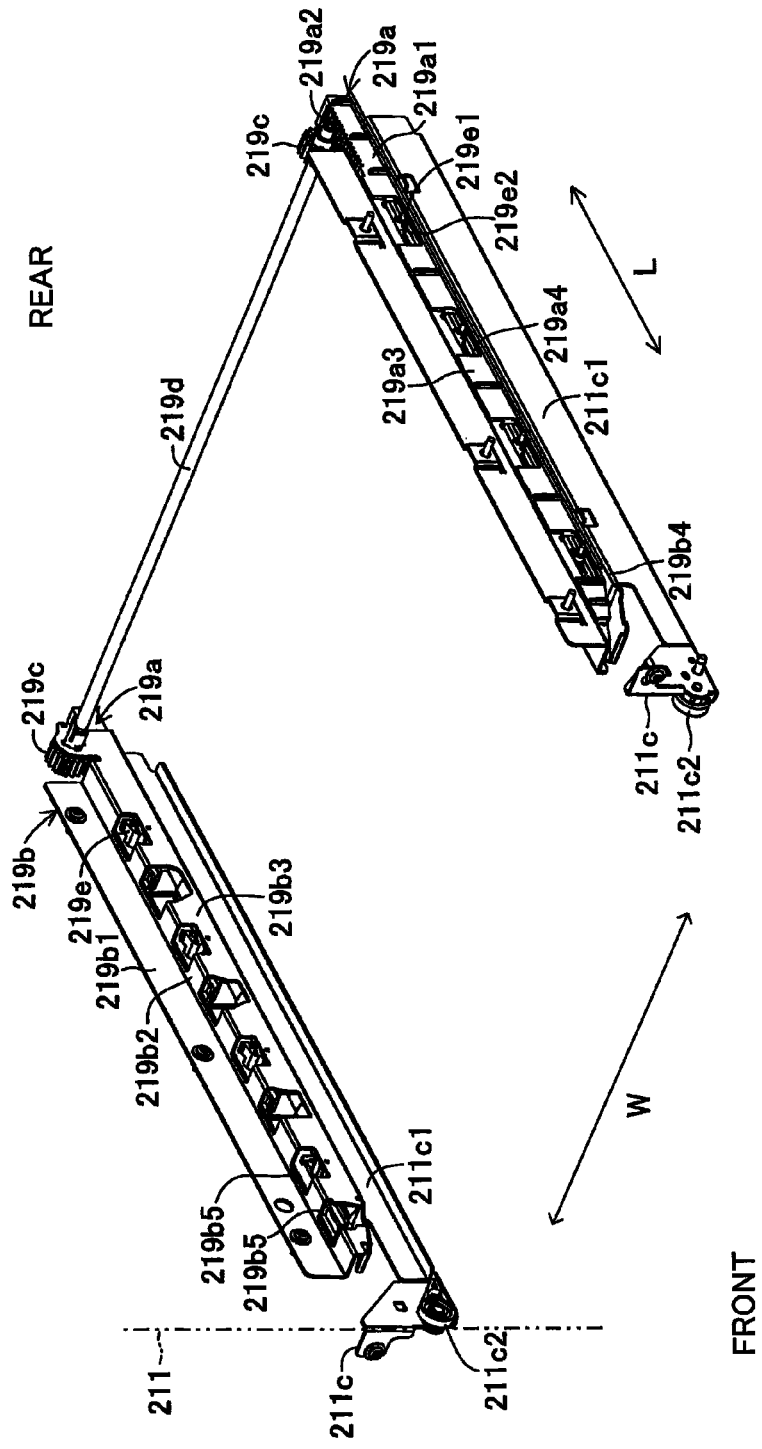
FIG. 40 is an enlarged perspective view showing a periphery of slide guide frames and linear cam mechanisms shown in FIG. 26 according to an illustrative aspect.

FIG. 39 is an enlarged perspective view showing a periphery of the process cartridge 230 shown in FIG. 26. FIG. 40 is an enlarged perspective view showing a periphery of the slide guide frames 211c and the linear cam mechanisms 219 shown in FIG. 26. FIG. 40 shows the process cartridge 230 removed from FIG. 39.

Referring to FIG. 39, the slide guide frames 211c are structured to support each end of the process cartridge 230 with respect to its width direction W, and upper ends of the process cartridge 230 with respect to its height direction. Each of the slide guide frames 211c includes a slide rail 211c1 and a slide guide roller 211c2.

As shown in FIG. 39, the slide rails 211c1 are structured to engage with the upper ends of the side frames 232 (i.e., the guide ribs 232b in FIG. 31) when the process cartridge 230 is installed in the main body casing 211. The slide rails 211c1 and the slide guide rollers 211c2 are structured to guide the movement of the process cartridge 230 in the front-rear direction L, in cooperation with the side frames 232 of the process cartridge 230 (side frame guide rollers 232c and guide ribs 232b in FIG. 31) and the rear beam guide rollers 234b.

Each linear cam mechanism 219 includes a bar cam member 219a, as a liner cam member, a cam supporting frame 219b, a pinion gear 219c, and a gear shaft 219d.

The bar cam member 219a is a cam formed to have a length parallel to the front-rear direction L. The bar cam member 219a is disposed and structured to reciprocate along the front-rear direction L. More specifically, a rack gear 219a2 is formed on an upper surface of a cam base end 219a1, which is provided on the rear side of the bar cam member 219a. The rack gear 219a2 is structured to engage with the pinion gear 219c.

A pair of the pinion gears 219c is directly connected by the gear shaft 219d, so as not rotate relative to each other. A pair of the pinion gears 219c and the gear shaft 219d are structured such that when one of the bar cam members 219d is moved in the front-rear direction L by a drive source (not shown) provided in the main body casing 211, the one of the bar cam members 219d and the other one of the bar cam members 219d may be synchronously reciprocated in the front-rear direction L in phase with each other (with respect to the position in the front-rear direction L).

FIG. 39 illustrates the left bar cam member 219a that is moved to the rearmost position and the right bar cam member 219a that is moved to a middle position. This illustration is provided only for the purpose of describing that the bar cam members 219 are movable along the front-rear direction L. It should be noted that the linear cam mechanisms 219 are moved in synchronization with each other and the situation such as shown in FIG. 39 will not occur in actuality.

The cam supporting frame 219b includes a cam supporting frame base 219b1, a cam supporting frame upper plate 219b2, a cam supporting frame side plate 219b3, and a cam supporting frame bottom plate 219b4, which are integrally formed of a metal plate.

The cam supporting frame base 219b1 is provided to extend upwardly in the vertical direction from an outer end of the supporting frame upper plate 219b2, with respect to its width direction W. The cam supporting frame base 219b1 is fixed to an inner wall of the main body casing 211 using, for example, a screw, so that the cam supporting frame 219b may be supported on the inner side of the main body casing 211.

The cam supporting frame side plate 219b3 is provided to extend downwardly in the vertical direction from an inner end of the supporting frame upper plate 219b2, with respect to its width direction W. The cam supporting frame bottom plate 219b4 is provided to extend outward in the width direction W from a lower end of the cam supporting frame side plate 219b3. The bar cam member 219a is disposed in a space defined by the cam supporting frame upper plate 219b2, the cam supporting frame side plate 219b3, and the cam supporting frame bottom plate 219b4.

Boss accommodating openings 219b5 are formed on the cam supporting frame upper plate 219b2 and the cam supporting frame side plate 219b3. As shown in FIG. 39, the boss accommodating openings 219b5 are structured to make the separation bosses 241f and the pressed bosses 241g1 of the developing cartridges 240 oppose the bar cam member 219a when the process cartridge 230 is installed in the main body casing 211.

Figure 41:
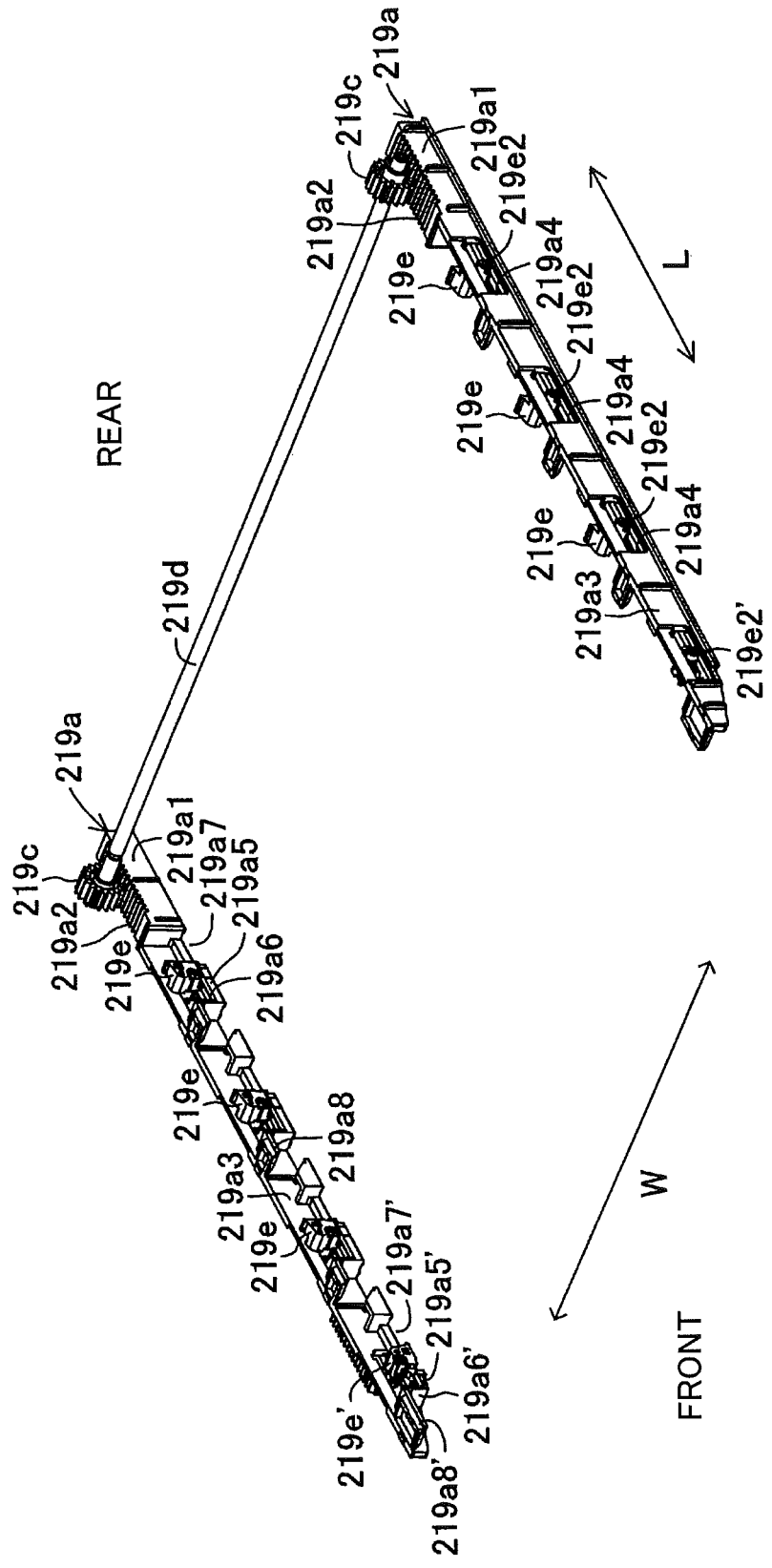
FIG. 41 is a perspective view of a pair of bar cam members shown in FIG. 40.

FIG. 41 is a perspective view of a pair of the bar cam members 219a shown in FIG. 40. Referring to FIGS. 40 and 41, each bar cam member 219a is provided with, for example, four supplementary cam members 219e.

Referring to FIG. 40, the supplementary cam members 219e are disposed opposite to the boss accommodating openings 219b5. The supplementary cam member 219e is pivotally structured about a supplementary cam pivot pin 219e1 parallel to the width direction W. An inner end of the supplementary cam pivot pin 219e1 with respect to the width direction W is supported in a through hole formed directly below the boss accommodating opening 219b5 on the cam supporting frame side plate 219b3. In other words, the supplementary cam member 219e is supported so as not move in the front-rear direction L by the through hole formed on the cam supporting frame side plate 219b3.

Referring to FIG. 41, an apostrophe ' is provided to the reference number of the foremost supplementary cam member 219e for the clarity of the description. The foremost supplementary cam members 219e' have the same structure as other supplementary cam members 219e, expect that the foremost supplementary cam members 219e' are moved in the different timing than the other supplementary cam members 219e when the bar cam members 219a move in the front-rear direction L, as will be described in detail below. Similarly, an apostrophe (') is provided to the reference numbers of the foremost components of the bar cam member 219a, in association with the foremost supplementary cam member 219e'.

A thin plate of a supplementary cam guide wall 219a3, which defines the outside wall of the bar cam member 219a with respect to the width direction W, has, for example, four elongated supplementary cam guide openings 219a4 having a length parallel to the front-rear direction L. The supplementary cam guide openings 219a4 having the same shape are disposed along the front-rear direction L. The supplementary cam member 219e is provided with a supplementary cam pivot projection 219e2 that extends outward in the width direction W. The supplementary cam pivot projection 219e2 is inserted into the supplementary cam guide opening 219a4.

More specifically, the supplementary cam member 219e is pivotally supported in the through hole formed on the cam supporting frame side plate 219b3 (FIG. 40) and the supplementary cam guide opening 219a4. The supplementary cam member 219e is supported so as to move relative to the bar cam member 219a along the longitudinal direction of the supplementary cam guide opening 219a4, when the bar cam members 219a are reciprocated in the front-rear direction L. As shown in FIGS. 40 and 41, the supplementary cam guide openings 219a4 are formed such that the position of the supplementary cam pivot projection 219e2, with respect to the front-rear direction L, in each of four supplementary cam guide openings 219a4 becomes substantially the same. In other words, the relative positional relation between the supplementary cam guide opening 219a4 and the supplementary cam member 219e is all the same in the four sets of the supplementary cam guide openings 219a4 and the supplementary cam members 219e.

Referring to FIG. 41, the supplementary cam guide wall 219a3, which defines the outside wall of the bar cam member 219a, is formed with supplementary cam supporting portions 219a5 that extend inward in the width direction W from the lower end of the supplementary cam guide wall 219a3. The supplementary cam supporting portion 219a5 is structured to support the supplementary cam member 219e from below. The supplementary cam supporting portions 219a5 are formed at positions associated the supplementary cam guide openings 219a4.

A supplementary cam contact wall 219a6 is formed to extend upward from the front end of the supplementary cam supporting portion 219a5. The supplementary cam contact wall 219a6 is structured to contact the supplementary cam member 219e when the bar cam members 219a are moved toward the rear side. The relative positional relation between the supplementary cam contact wall 219a6 and the supplementary cam member 219e (supplementary cam pivot projection 219e2) is also all the same in the four sets of the supplementary cam contact walls 219a6 and the supplementary cam members 219e (supplementary cam pivot projections 219e2).

A supplementary cam exposure opening 219a7 that opens downward is formed behind the rear end of the supplementary cam supporting portion 219a5. A pressing portion 219a8 for the pressed boss 241g1 is formed to extend forwardly from the upper end of the supplementary cam contact wall 219a6. As will be described below, the pressing portions 219a8 are structured to contact the pressed bosses 241g1 when the bar cam members 219a are moved frontward, thereby pressing the pressed bosses 241g1 (FIG. 39) downward.

The length of the supplementary cam supporting portion 219a5 parallel to the front-rear direction L is set shorter than that of the supplementary cam guide opening 219a4. In other words, the rear end of supplementary cam guide opening 219a4 is disposed above the supplementary cam exposure opening 219a7. The foremost supplementary cam supporting portion 219a5' is formed shorter than the other supplementary cam supporting portions 219a5. The foremost pressing portion 219a8' is formed longer than the other pressing portions 219a8.

Figure 42A:
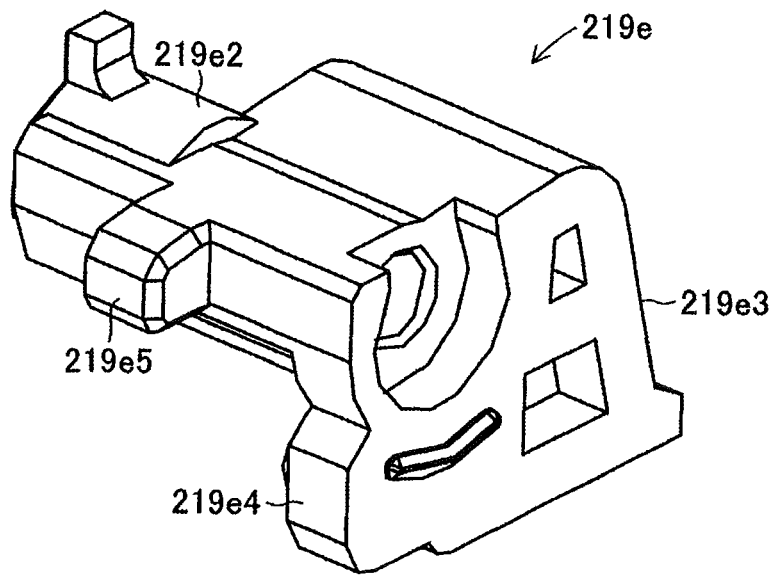
FIG. 42A is an enlarged perspective view of a supplemental cam member, shown in FIG. 41, in a turned state.
Figure 42B:
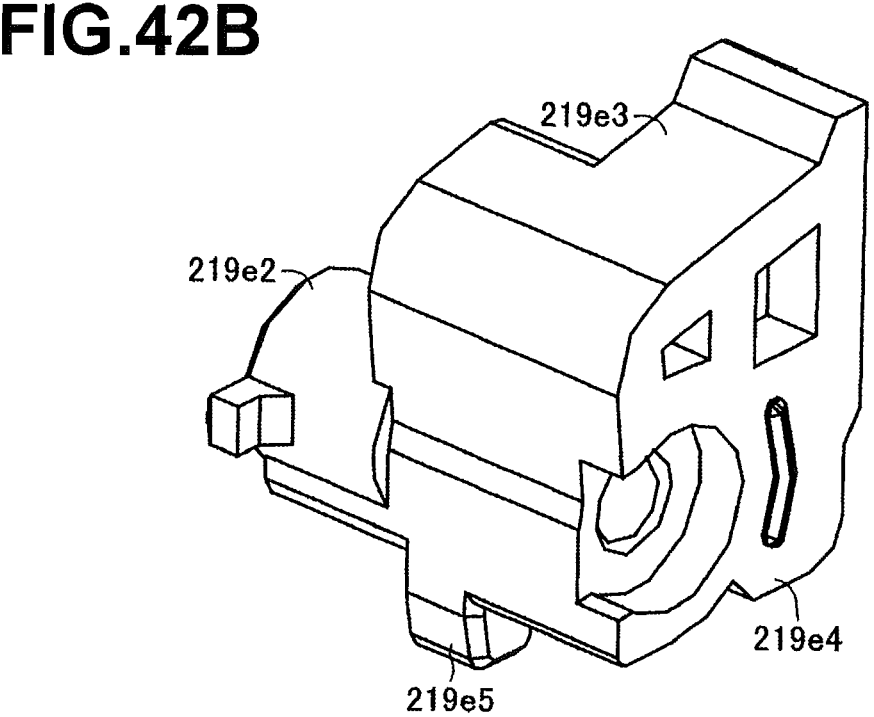
FIG. 42B is an enlarged perspective view of the supplemental cam member, shown in FIG. 41, in an upright state.

FIG. 42A is an enlarged perspective view of the supplemental cam member 219e, shown in FIG. 41, in a turned state. FIG. 42B is an enlarged perspective view of the supplemental cam member 219e, shown in FIG. 41, in an upright state. The supplementary cam member 219e can take two states by pivoting about the supplementary cam pivot projection 219e2, that is, the turned state, as shown in FIG. 42A, and the upright state, as shown in FIG. 42B.

A separation boss mounting slope 219e3 that slants slightly is formed on an upper end (top) of the supplementary cam member 219e when placed in the upright state, as shown in FIG. 42B. A protrusion is formed on the rear end (upper right end in FIG. 42B) of the separation boss mounting slope 219e3. The front end of the separation boss mounting slope 219e3 is formed to have a smoothly-curved or chambered surface to allow the separation boss 241f to readily mount on the separation boss mounting slope 219e3 when the separation boss 241f contacts the slope 219e3.

A first supplementary cam projection 219e4 and a second supplementary cam projection 219e5 are formed to extend downward from a lower end of the supplementary cam member 219e when placed in the upright state, as shown in FIG. 42B. The first supplementary cam projection 219e4 and the second supplementary cam projection 219e5 are disposed in different positions with respect to their width direction (axial direction of the supplementary cam pivot projection 219e2).

More specifically, the first supplementary cam projection 219e4 is disposed more inward than the second supplementary cam projection 219e5 with respect to the width direction W in FIG. 41 (lower right side in FIG. 42B).

FIG. 43A is an enlarged perspective view of the bar cam member 219a and the supplemental cam members shown in FIG. 41, wherein the bar cam member 219a is in the foremost position. FIG. 43B is an enlarged perspective view of the bar cam member 219a and the supplemental cam members 219e shown in FIG. 41, wherein the bar cam member 219a is in the rearmost position. As described above, the position of the supplementary cam member 219e (supplementary cam pivot projection 219e2) with respect to the front-rear direction L is fixed, even when the bar cam members 219a are moved.

Figure 45:
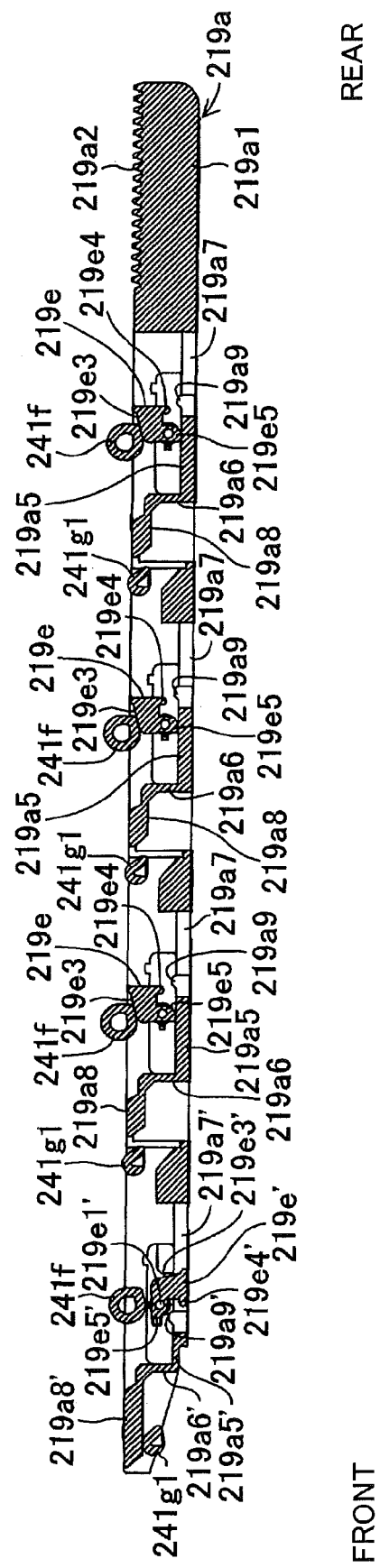
FIG. 45 is a cross-sectional side view of the bar cam member and the supplemental cam members when the bar cam member shown in FIGS. 43A and 43B is in a middle position.
Figure 46:
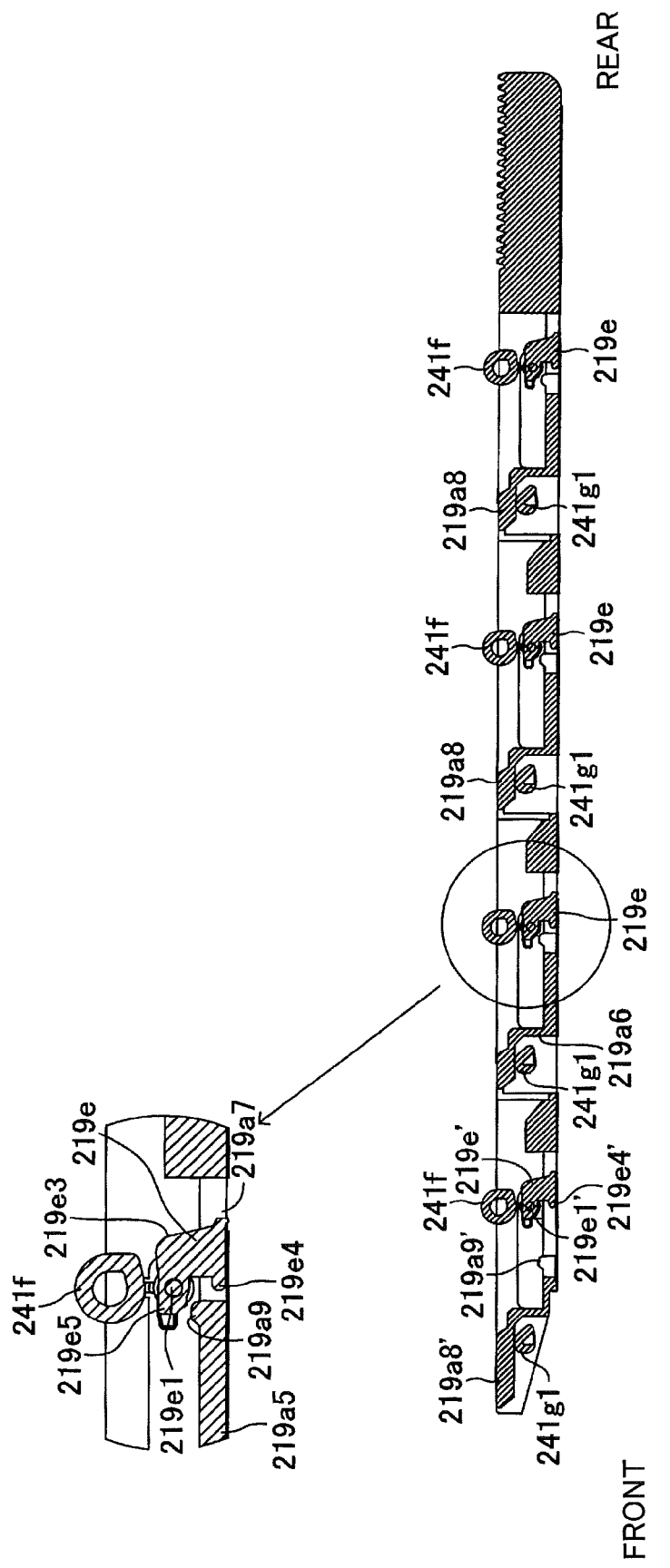
FIG. 46 is a cross-sectional side view of the bar cam member and the supplemental cam members when the bar cam member shown in FIG. 43A is in the foremost position.
Figure 47:
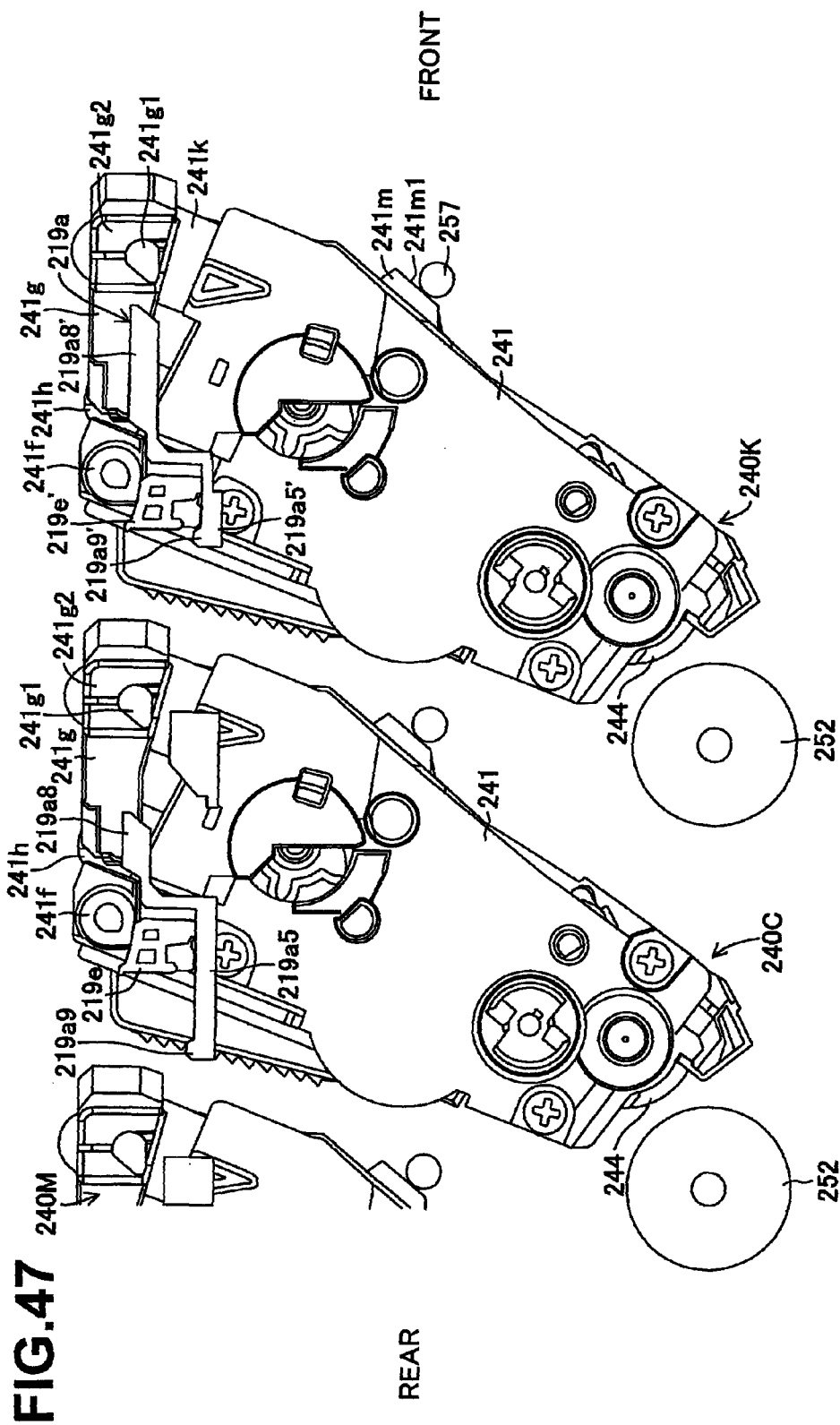
FIG. 47 is an enlarged side view of the developing cartridges and the linear cam mechanisms when the bar cam members shown in FIG. 39 are in the rearmost position.
Figure 48:
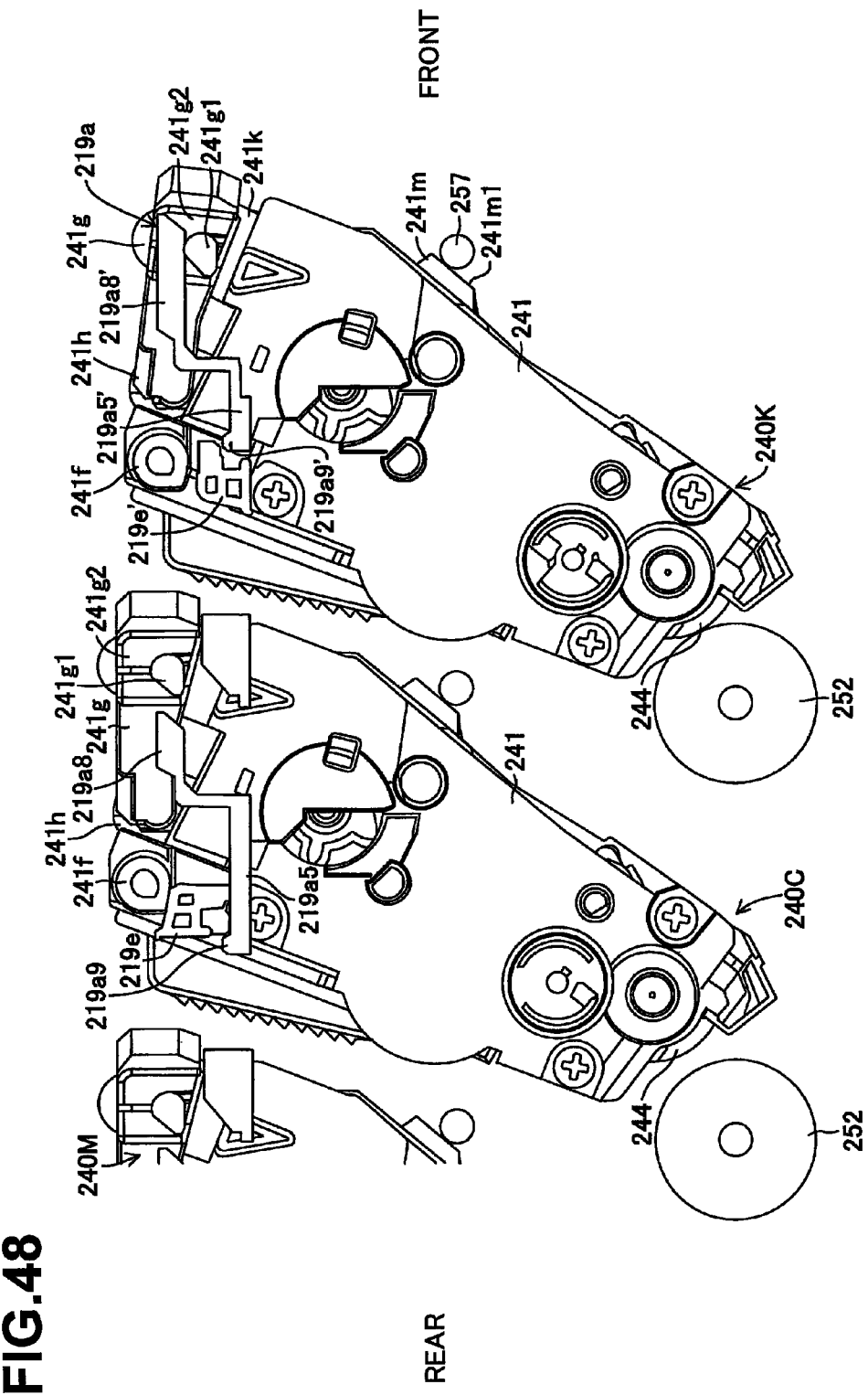
FIG. 48 is an enlarged side view of the developing cartridges and the linear cam mechanisms when the bar cam members shown in FIG. 39 are in the middle position.
Figure 49:
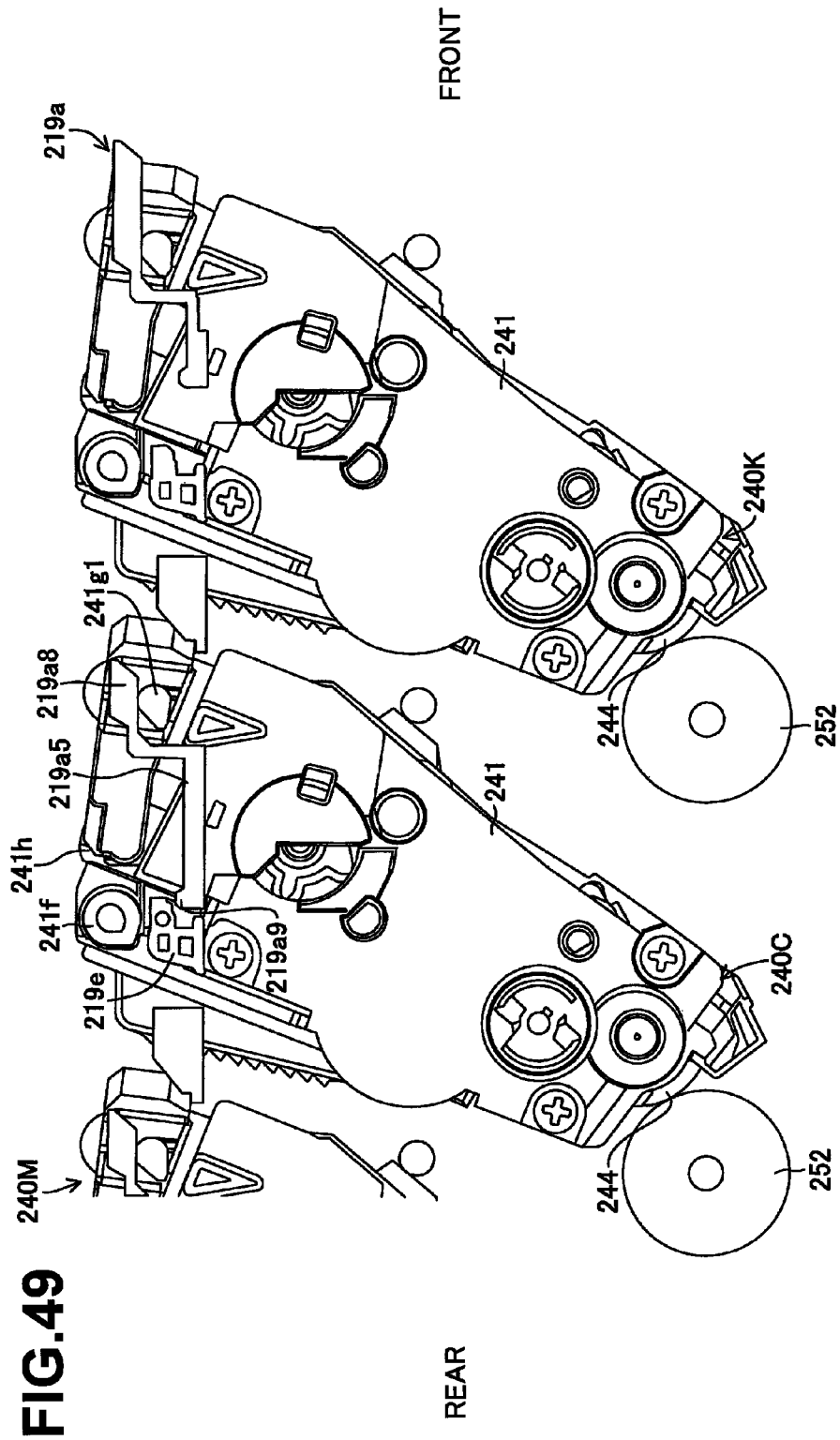
FIG. 49 is an enlarged side view of the developing cartridges and the linear cam mechanisms when the bar cam members shown in FIG. 39 are in the foremost position.

FIGS. 44-46 are cross-sectional side views of the bar cam member 219a and the supplemental cam members 219e shown in FIGS. 43A and 43B. FIG. 44 shows the bar cam member 219a and the supplemental cam members 219e when the bar cam member 219a is in the rearmost position (right side in FIG. 44). FIG. 45 shows the bar cam member 219a and the supplemental cam members 219e when the bar cam member 219a is in a middle position. FIG. 46 shows the bar cam member 219a and the supplemental cam members 219e when the bar cam member 219a is in the foremost position (left side in FIG. 46). FIGS. 47-49 are enlarged side views of the developing cartridges 240 and the linear cam mechanisms 219 shown in FIG. 39. Front and rear sides in FIGS. 44-46 are reversed in FIGS. 47-49. In other words, FIGS. 44-46 show cross-sections of the bar cam member 219a and the supplemental cam members 219e when viewed from the side opposite to the side of the developing frame 241 shown in FIGS. 47-49. FIG. 44 corresponds to FIG. 47. FIG. 45 corresponds to FIG. 48. FIG. 46 corresponds to FIG. 49.

Referring to FIGS. 43A and 43B, the rear end (right side in FIGS. 43A and 43B) of the supplementary cam supporting portion 219a5 is structured to contact the first supplementary cam projection 219e4 of the supplementary cam member 219e. A protrusion 219a9 for pivoting supplementary cam member 219e is formed on the outer side of the supplementary cam supporting portion 219a5 with respect to its width direction, behind the rear end of the supplementary cam supporting portion 219a5. The protrusion 219a9 is disposed to extend upward at a position associated with the second supplementary cam projection 219e5 of the supplementary cam member 219e with respect to its width direction (at a position where the protrusion 219a9 can contact the second supplementary cam projection 219e5).

Referring to FIGS. 43A through 46, the bar cam members 219a and the supplementary cam members 219e are structured such that the supplementary cam members 219e pivot in the clockwise direction in the drawings, placing the supplementary cam members 219e in the turned state, when the bar cam members 219a are moved to the front side (left side in the drawings), that is, when the supplementary cam members 219e are moved to the rear side relative to the bar cam members 219a. More specifically, the protrusion 219a9 is formed to pivot the supplementary cam member 219e by making contact with the second supplementary cam projection 219e5, when the bar cam members 219a are moved toward the front side. (The pivotal movement of the supplementary cam members 219e may be readily understood when FIGS. 44, 45 and 46 are referred to in this order.) When the supplementary cam member 219e is in the turned state, the supplementary cam member 219e is disposed above the supplementary cam exposure opening 219a7.

The foremost protrusion 219a9' is formed at a substantially central portion with respect to the front-rear direction of the foremost supplementary cam guide opening 219a4'. Other protrusions 219a9 are formed nearer to the rear ends of the supplementary cam guide openings 219a4. In other words, positions of the foremost protrusion 219a9' and other protrusion 219a9' are set such that the foremost supplementary cam member 219e' is first placed in the turned state prior to the other supplementary cam members 219e when the bar cam members 219a are moved to the front side.

As described above, the pressing portion 219a8 is structured to press the pressed boss 241g1 by mounting thereon when the bar cam member 219a is moved toward the front side. More specifically, the front end of the pressing portion 219a8 has a slanted portion, so that the pressing portion 219a8 can readily mount on the pressed boss 241g1 when the pressing portion 219a8 makes contact with the pressed boss 241g1. The foremost pressing portion 219a8' is formed longer than the other pressing portions 219a8 to first press the foremost pressed boss 241g1, prior to the other pressed bosses 241g1.

The bar cam members 219a and the supplementary cam members 219e are structured such that the supplementary cam members 219e pivot in the counterclockwise direction in the drawings, placing the supplementary cam members 219 in the upright state, when the bar cam members 219a are moved to the rear side (right side in the drawings), that is, when the supplementary cam members 219e are moved to the front side relative to the bar cam members 219a. More specifically, the first supplementary cam projection 219e4 is formed and disposed to pivot the supplementary cam member 219e by making contact with the rear end of the supplementary cam supporting portion 219a5 when the bar cam members 219a is moved toward the rear side. (The pivotal movement of the supplementary cam member 219e may be readily understood when FIGS. 46, 45 and 44 are referred to in this order.) The supplementary cam member 219e placed in the upright state is supported on the upper side of the supplementary cam supporting portion 219a5.

As described above, the foremost supplementary cam supporting portion 219a5' is formed shorter than the other supplementary cam supporting portions 219a5. In other words, lengths of the foremost supplementary cam supporting portion 219a5' and the other supplementary cam supporting portions 219a5 are set such that the foremost supplementary cam member 219e' is placed in the upright state later than the other supplementary cam members 219e when the bar cam members 219a are moved to the rear side.

As shown in FIGS. 47 through 49, the bar cam members 219a are structured to urge the developing cartridges 240 (black, cyan, magenta, and yellow developing cartridges 240K, 240C, 240M, 240Y), which are arranged in the front-rear direction L, toward the respective photoconductive drums 252 disposed therebelow, by pressing the pressed bosses 241g1 downward, in accordance with the movement of the bar cam members 219a in the front-rear direction L. The supplementary cam members 219e are structured to maintain the developing cartridges 240 (black, cyan, magenta, and yellow developing cartridges 240K, 240C, 240M, 240Y) in a predetermined retracted state by separating the developing rollers 244 from the photoconductive drums 252. This may be achieved by placing the supplementary cam members 219e in the upright state to raise the separation bosses 241f, in accordance with the movement of the bar cam members 219a in the front-rear direction L.

Further, the bar cam members 219a and the supplementary cam members 219e (supplementary cam members 219e') are structured to urge only the black developing cartridge 240K toward the photoconductive drum 252 and to maintain the other developing cartridges 240C, 240M, 240Y in the retracted state, in accordance with the movement of the bar cam members 219a in the front-rear direction L.

5. Structure for Transmitting Drive Force

Figure 50:
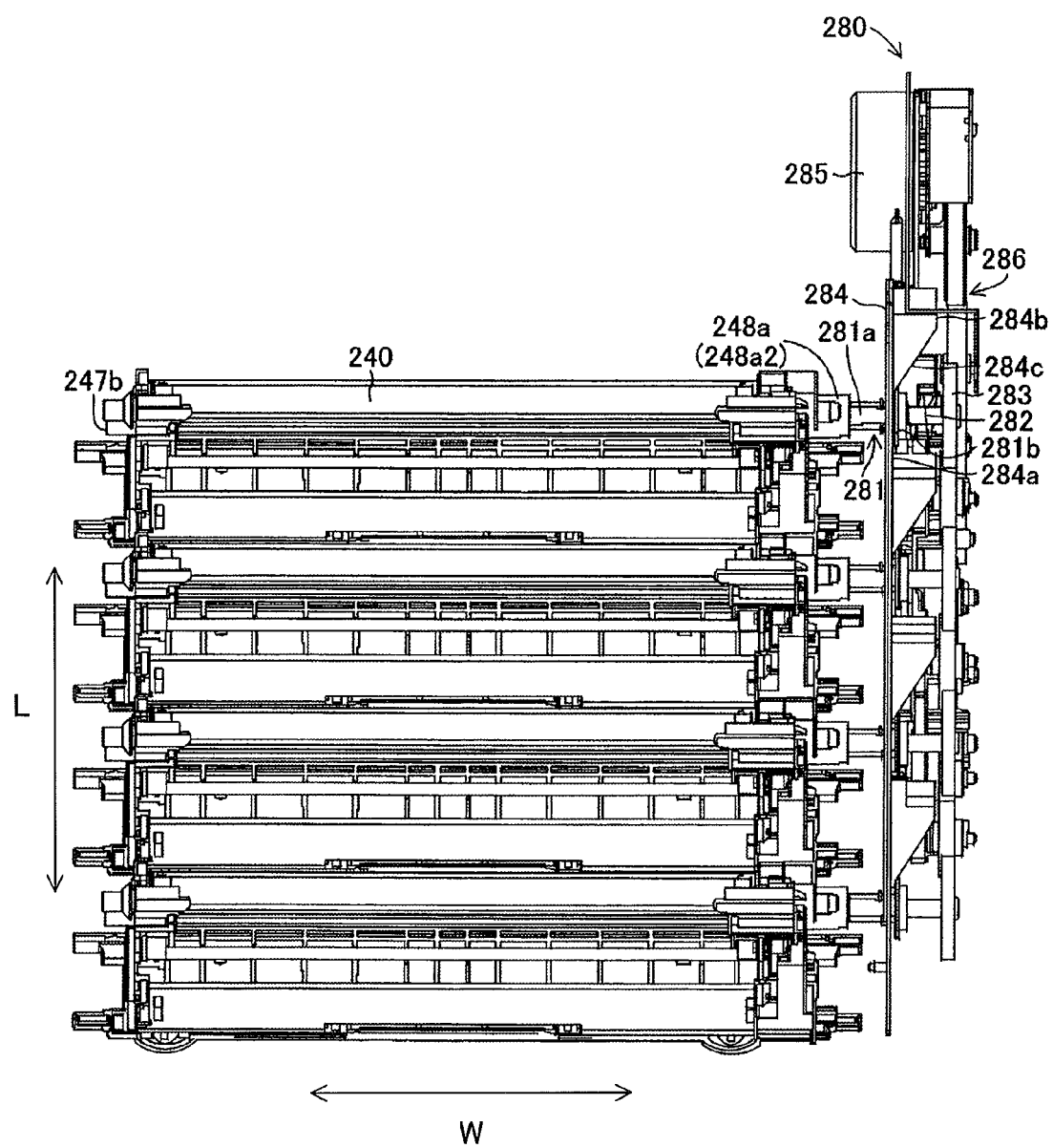
FIG. 50 is a bottom view of the developing cartridges and a drive force transmission mechanism for transmitting drive force thereto provided in a main body frame shown in FIG. 26 according to an illustrative aspect.
Figure 51:
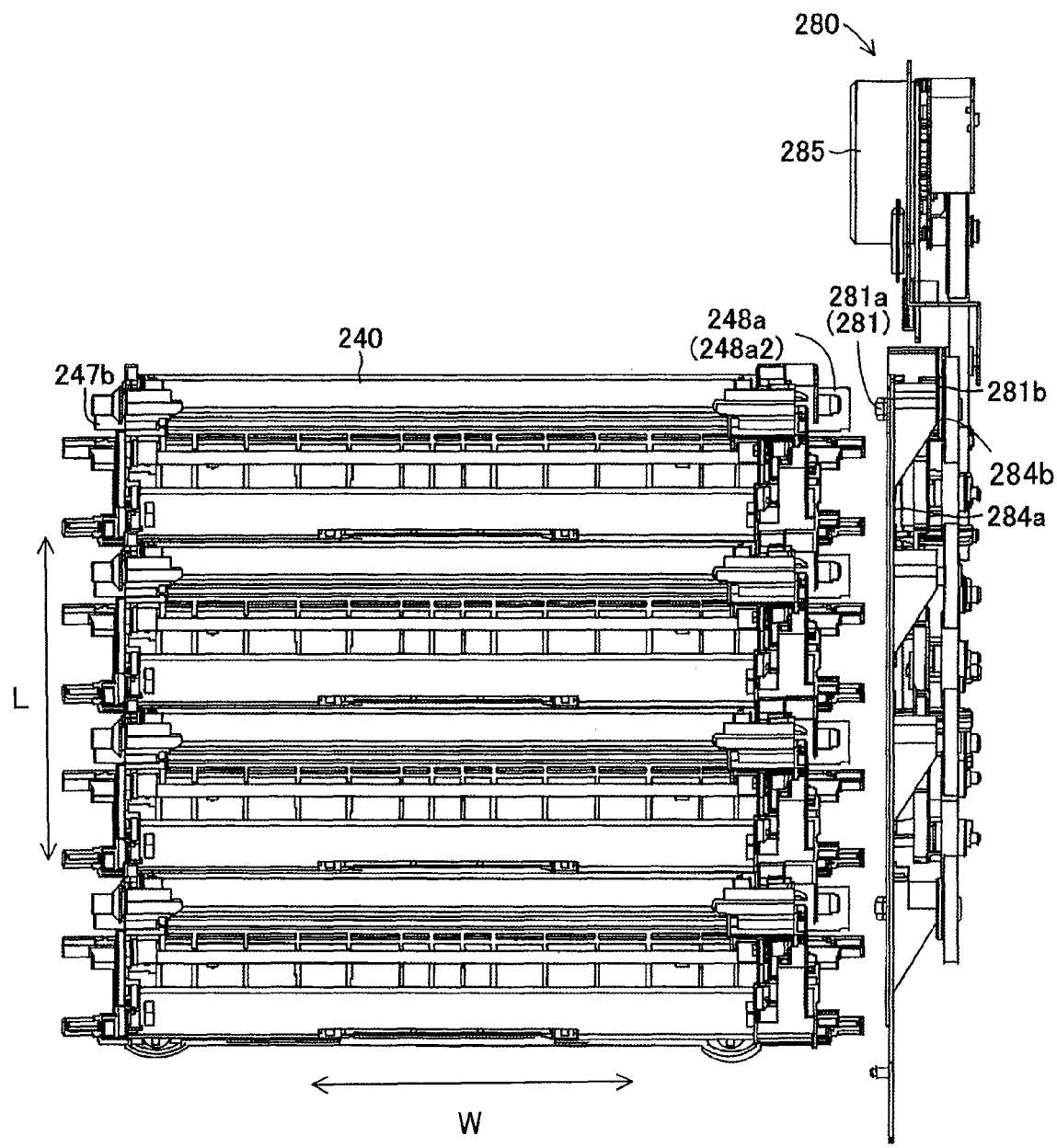
FIG. 51 is a bottom view of the developing cartridges and a drive force transmission mechanism for transmitting drive force thereto provided in a main body frame shown in FIG. 26 according to an illustrative aspect.

FIGS. 50 and 51 are bottom views of the developing cartridges 240 and a drive force transmission mechanism 280 for transmitting drive force thereto provided in the main body casing 211 shown in FIG. 26. Referring to FIGS. 50 and 51, the drive force transmission mechanism 280 includes a drive coupling part 281, a drive coupling part urging spring 282, a drive coupling gear 283, a drive coupling movement cam 284, a motor 285, and a gear train 286.

Four drive coupling parts 281 are provided along the front-rear direction L (up-down direction in FIGS. 50 and 51) in association with the coupling parts 248a of the four developing cartridges 240. The drive coupling part 281 includes a coupling engagement shaft 281a, and a flange portion 281b.

The coupling engagement shaft 281a is inserted from its tip end into the coupling part 248a, so that the coupling engagement shaft 281a may be engaged with the coupling part 248a. As the coupling engagement shaft 281a and the coupling part 248a are structured to transmit drive force to the developing cartridge 240 from the drive force transmission mechanism 280 by engaging with each other. The flange portion 281b is formed at a base end (right end in FIGS. 50 and 51) of the coupling engagement shaft 281a.

The drive coupling part urging spring 282 is disposed such that its one end contacts the flange portion 281b and the other end contacts the drive coupling gear 283. The drive coupling part urging spring 282 is structured to urge the flange portion 281b (drive coupling part 281) toward the coupling part 248a.

The drive coupling gear 283 is structured to rotate together with the drive coupling part 281. More specifically, the drive coupling part 281 and the drive coupling gear 283 are structured so as not to move relative to each other in their rotating direction, by engaging a shaft (axis) of the drive coupling gear 283 in an engagement hole formed in the coupling engagement shaft 281a (axis of the drive coupling part 281).

Further, the drive coupling part 281 and the drive coupling gear 283 are structured to move relative to each other in their axial direction. More specifically, the drive coupling part 281 and the drive coupling gear 283 are structured such that the shaft (axis) of the drive coupling gear 283 may slide in the engagement hole formed in the coupling engagement shaft 281a (axis of the drive coupling part 281) along the axial direction.

The drive coupling movement cam 284 is structured to position the four drive coupling parts 281 arranged along the front-rear direction L, with respect to their axial direction (width direction W). The drive coupling movement cam 284 includes four sets of a cam bottom face 284a, a cam top face 284b, and a cam slanted face 284c.

As shown in FIG. 50, the cam bottom face 284a is formed to contact the flange portion 281 of the drive coupling part 281, which is located at a position to engage with the coupling part 248a. As shown in FIG. 51, the cam top face 284b is formed to contact the flange portion 281 of the drive coupling part 281, which is located at a position away from the coupling part 248a. The cam slanted face 284c is formed to smoothly connect the cam bottom face 284a and the cam top face 284b.

The drive coupling movement cam 284 is structured to gradually move the flange portion 281b outwardly with respect to the width direction W (toward the right side in FIG. 50) along the cam slanted face 284c, against a pressing force of the drive coupling part urging spring 282, when the drive coupling movement cam 284 is moved downward from the position shown in FIG. 50 by a solenoid and a cam mechanism (not shown). The drive coupling movement cam 284 is structured to move the drive coupling part 281, to a retracted position, as shown in FIG. 51. Further, the drive coupling movement cam 284 is structured to move the drive coupling part 281 to an engagement position, as shown in FIG. 50, with the pressing force of the drive coupling part urging spring 282, when the drive coupling movement cam 284 is moved upward from a position shown in FIG. 51 by a solenoid (not shown), etc.

The gear train 286 is structured to transmit the drive force generated by the motor 285 to the four drive coupling gears 283.

6. Description of Operations According to Structures of Aspects

Next, operations performed when the process cartridge 230 is installed in or removed from the main body casing 211 of the color laser printer 210 shown in FIG. 26, will be described with reference to the accompanying drawings.

(1) Installation/Removal of the Developing Cartridge

Referring to FIGS. 30 and 31, when the developing cartridge 240 is removed from the process cartridge frame 230a of the process cartridge 230, a user may hold the central portion, with respect to the longitudinal direction of the developing cartridge 240, of the holding portion 241g provided at the upper potion of the developing cartridge 240. Thus, the holding portion 241g is brought into an upright position, as shown in FIG. 30. Then, as the user pulls up the holding portion 241g, which has been placed in the upright position, the developing cartridge 240 is moved upward while being guided by the collar positioning guide groove 251a1 and the coupling part guide groove 251e1 formed at each end of the drum frame 251, with respect to the width direction W. Thus, the developing cartridge 240 is removed from the drum unit 250.

When the developing cartridge 240 is installed in the process cartridge frame 230a, the holding portion 241g is placed in a turned or rest position, as shown in FIGS. 33A through 34B, and the central portion of the upper end of the developing cartridge 240, with respect to the longitudinal direction of the developing cartridge 240, may be held. As shown in FIG. 33A, the collar member 246 is inserted into the collar positioning guide groove 251a1, and as shown in FIG. 34A, the input opening portion 248a2 is inserted into the coupling part guide groove 251e1.

In this state, as the developing cartridge 240 is pressed further downward, the collar member 246 is received in the collar positioning accommodation base 251a2, as shown in FIG. 33B, and the input opening portion 248a2 is inserted into the coupling accommodation base 251e2, as shown in FIG. 34B. Further, an end of the developing roller shaft 244a on which the collar member 246 is not mounted, is received in the developing roller shaft end accommodating portion 251e3.

Referring to FIGS. 32 through 33B, the movable part 258c of the developing bias terminal 258 is exposed in the collar positioning guide groove 251a1, so that the movable part 258 may first contact the collar member 246. Thus, the movable part 258c is pressed down by the collar member 246 and moved to the left side in FIGS. 33A and 33B (counterclockwise direction in FIGS. 33A and 33B). Then, the movable part 258 contacts the terminal portion 247b.

In this aspect, when the developing cartridge 240 is installed in the process cartridge frame 230a, the movable part 258c exposed in the collar positioning guide groove 251a1 is pressed and moved down by the collar member 246 and then contacts the terminal portion 247b. Thus, electrical connection by the contact between the terminal portion 247b and the developing bias terminal 258 may be smoothly and reliably established when the developing cartridge 240 is installed in the process cartridge frame 230a.

Referring to FIGS. 32 through 33B, the lower half of the collar positioning guide groove 251a1 is formed smaller than the coupling part guide groove 251e1. Therefore, even when the developing cartridge 240 is mis-oriented and the input opening portion 248a2 is inserted, by mistake, into the collar positioning guide groove 251a1, the insertion of the input opening portion 248a2 is stopped at an upper portion of the collar positioning guide groove 251a1. Thus, inappropriate installation of the developing cartridge 240 relative to the drum unit 250 may be reliably prevented.

(2) Urging/Pressing of Developing Cartridge Toward Photoconductive Drum

Referring to FIGS. 35A and 35B, when the developing cartridge 240 placed in the non-pressing (retracted) state, as shown in FIG. 35A, is brought into the pressing state, as shown in FIG. 35B, in which an image can be formed, the pressed bosses 241g1 are pressed down. Accordingly, the holding portion 241g is slightly moved pivotally about the hinges 241h in the clockwise direction in FIGS. 35A and 35B. By the pivotal movement of the holding portion 241g, the pressing portions 241g2 on the free end side of the holding portion 241g is moved downward. Thus, force that elastically urges the developing frame 241 along the guiding direction Z is generated by the press actuation mechanisms 241k disposed below the pressing portions 241g2.

More specifically, referring to FIGS. 36A and 36B, downward movement of the pressing portions 241g2 causes the movement members 241k1 provided in the press actuation mechanisms 241k to be pushed down. Then, as shown in FIG. 36B, the developing cartridge urging springs 241k3 are more compressed than the state shown in FIG. 36A. As the developing cartridge urging springs 241k3 are compressed, elastic force (energy) is generated in the developing cartridge urging springs 241k3. With the elastic force, the upper wall 241c of the developing frame 241 is urged downward.

Referring back to FIGS. 35A and 35B, as the upper wall 241c of the developing frame 241 is urged downward, the developing cartridge 240 is brought into the pressing state, as shown in FIG. 35B from the non-pressing state, as shown in FIG. 35A. In other words, the developing cartridge 240 is moved toward the photoconductive drum 252. The movement direction of the developing cartridge 240 toward the photoconductive drum 252 is the direction (guiding direction Z) that the collar member 246 moves in the collar positioning accommodation base 251a2, as shown in FIG. 37B.

Referring to FIG. 37B, the pressing action line Y connecting the pressing position PP, which is the action point by the press actuation mechanisms 241k, and the contact position (developing position) CP is parallel to the guiding direction Z. Therefore, with the elastic force generated in the press actuation mechanisms 241k, the developing cartridge 240 can be smoothly moved.

The angle formed between the developing cartridge pressing direction X at the pressing position PP and the pressing action line Y is about 20 degrees.

With such a structure, most of the elastic force applied at the pressing position PP is transmitted to the contact position CP, without significant losses. Thus, a predetermined contact between the toner carrying peripheral surface 244b of the developing roller 244 and the image carrying peripheral surface 252b of the photoconductive drum 252 may be reproduced stably. Further, the guide surfaces 241m1 of the guide projections 241m are parallel to the guiding direction Z.

Therefore, as shown in FIGS. 35A and 35B, the guide surfaces 241m1 of the guide projections 241m may be properly pressed against the developing cartridge insertion rollers 257. Thus, the movement of the developing cartridge 240 along the guiding direction Z may be guided smoothly by the developing cartridge insertion rollers 257.

While the developing cartridge 240 is moved along the guiding direction Z from the non-pressing (retracted) position, as shown in FIG. 35A, to the pressing position, as shown in FIG. 35B, the terminal portion 247b and the feeding member opposing portion 258c1, which is formed parallel to the pressing action line Y and the guiding direction Z, slide with each other. Therefore, developing bias voltage may be applied between the developing roller 244 and the photoconductive drum 252, via the developing bias terminal 258 and the terminal portion 257b, for example, from a time when the developing cartridge 240 is in the non-pressing position.

As shown in FIG. 37B, the feeding member pressing direction S in which the terminal portion 247b is pressed by the feeding member opposing portion 258c1 at their contact position is substantially perpendicular to the pressing action line Y and the guiding direction Z. With such a structure, a component of a feeding member pressing force by the developing bias terminal 258 (feeding member opposing portion 258c1) parallel to the guiding direction Z is hardly generated. Therefore, contact between the toner carrying peripheral surface 244b of the developing roller 244 and the image carrying peripheral surface 252b of the photoconductive drum 252 may be stabilized.

The feeding member opposing portion 258c1 is substantially perpendicular to the feeding member pressing direction S. With such a structure, a state where the feeding member pressing direction S is substantially perpendicular to the pressing action line Y and the guiding direction Z may be stably realized.

(3) Installation of Process Cartridge

Referring to FIG. 39, the installation of the process cartridge 230 in the main body casing 211 will be described below.

The side frame guide rollers 232c and the rear beam guide rollers 234b are inserted into a space behind the slide guide rollers 211c2 disposed at the front ends of the slide guide frames 211c, to place the side frame guide rollers 232c and the rear beam guide rollers 234b on the slide rails 211c1. In this state, the slide guide rollers 211c2, the side frame guide rollers 232c, and the rear beam guide rollers 234b are disposed between the slide rails 211c1 and the guide ribs 232b of the side frames 232.

Then, as the process cartridge 230 is further pushed rearward, the slide guide rollers 211c2, the side frame guide rollers 232c, and the rear beam guide rollers 234b rotate between the slide rails 211c1 and the guide ribs 232b. Thus, the process cartridge 230 can be smoothly guided inside the main body casing 211. At this time, the separation bosses 241f and the pressing bosses 241g1 disposed at the upper ends of the developing cartridges 240 pass over the supporting frame upper plates 219b2.

As the process cartridge 230 is further pushed rearward, the side frame guide rollers 232c and the rear beam guide rollers 234b pass through the slide rails 211c1 and the front ends of the guide ribs 232b of the side frames 232 pass through the slide guide rollers 211c2, the process cartridge 230 slightly moves down. At this time, the slide rails 211c1 and the guide ribs 232b contact each other, and the separation bosses 241f and the pressing bosses 241g1 move down into the boss accommodating openings 219b5.

(4) Setting Positions of Developing Cartridge

Referring to FIG. 39, when the process cartridge 230 is installed in the main body casing 211, one of the bar cam members 219a is moved in the front-rear direction L by the drive source (not shown) provided in the main body casing 211. The pinion gear 219c, which is engaged with the rack gear 219a2 in the cam base end 219a1 of the one of the bar cam members 219a, rotates. In accordance with the rotation of the pinion gear 219c, the other pinion gear 219c, which is connected to the pinion gear 219c via the gear shaft 219d, also rotates. The other bar cam member 219a engaged with the other pinion gear 219c is moved. Thus, a pair of the bar cam members 219a is moved in synchronization with each other, via a pair of the pinion gears 219c and the gear shaft 219d. Accordingly, the developing cartridges 240 are set in either the pressing or non-pressing position. Referring to FIGS. 40 and 41, the pressing or non-pressing position of the developing cartridges 240 may be determined by the positions of the bar cam members 219a with respect to the front-rear direction L.

Referring to FIGS. 39 and 40, by setting the positions of the bar cam members 219a in the front-rear direction L, the supplementary cam members 219e disposed to face the boss accommodating openings 219b5 are set to either the upright or turned state. The supplementary cam members 219e placed in the upright state protrude toward the boss accommodating openings 219b5. Thus, the separation bosses 241f are raised. As the supplementary cam members 219e are maintained in the upright state, the separation bosses 241 are maintained raised. Thus, the developing cartridges 240 are held in the non-pressing (retracted) position.

Referring to FIGS. 39 and 41, pressing or non-pressing of the pressed bosses 241g1 with the pressing portions 219a8 may be determined by setting the positions of the bar cam members 219a in the front-rear direction L. As the pressed bosses 241g1 are pressed by the pressing portions 219a8, the developing cartridges 240 are urged downward and moved to the pressing position.

(5) Selectively Urging Developing Cartridges

Referring to FIG. 39, the developing cartridges 240 (e.g., four cartridges) are selectively urged downward in accordance with the positions of the bar cam members 219a in the front-rear direction L. The selective urging of the developing cartridges 240 will be described in detail below.

(a) Linear Cam Mechanisms

First, the linear cam mechanisms 219 shown in FIG. 39 will be described in detail below with reference to FIGS. 43A through 46.

Referring to FIGS. 43B and 44, when the bar cam members 219a are placed in the rearmost position, the foremost supplementary cam members 219e' and other supplementary cam members 219e are all in the upright state, and contact the supplementary cam contact walls 219a6. The separation bosses 241f are placed on the separation boss mounting slopes 219e3 (219e3') of the supplementary cam members 219e (219e') placed in the upright state. The foremost and other pressing portions 219a8', 219a8 are all positioned behind the pressed bosses 241g1.

As the bar cam members 219a are moved toward the front side from the state shown in FIG. 44, the supplementary cam supporting portions 219a5 (219a5') move toward the front side while sliding with the supplementary cam members 219e (219e'). At this time, the supplementary cam members 219e (219e') move rearward relative to the supplementary cam supporting portions 219a5 (219a5'). The supplementary cam members 219e (219e') do not move along the front-rear direction L. Therefore, relative positions between the supplementary cam members 219e (219e') and the separation bosses 241f with respect to the front-rear direction L do not change. Further, as the bar cam members 219a move toward the front side, the tips of the pressing portions 219a8 (219a8') approach the pressed bosses 241g1.

The foremost protrusion 219a9' first contacts the second supplementary cam projection 219e5' of the supplementary cam member 219e'. At this time, the other protrusions 219a9 have not yet made contact with the other second supplementary cam projections 219e5 of the supplementary cam members 219e. As the foremost protrusion 219a9' contacts the second supplementary cam projection 219e5', the foremost supplementary cam member 219e' pivotally moves in the clockwise direction in FIG. 44, resulting in the turned state, as shown in FIG. 45. In the turned state, the foremost supplementary cam member 219e' falls from the supplementary cam supporting portion 219a5' into the supplementary cam exposure opening 219a7'. Thus, the rise of the separation bosses 241g located foremost is discontinued and the foremost separation bosses 241g are lowered.

Referring to FIG. 45, the tips of the only foremost pressing portions 219a8' are placed on the pressed bosses 241g1, which are located foremost. Thus, only the foremost pressed bosses 241g1 are selectively pressed down.

As the bar cam members 219a are further moved to the front side from the state shown in FIG. 45, the other protrusions 219a9 contact the second supplementary cam projections 219e5, so that the other supplementary cam members 219e are placed in the turned state and the other pressing portions 219a8 are placed on the pressed bosses 241g1. Thus, all the separation bosses 241f are lowered and all the pressed bosses 241g1 are pressed downward, as shown in FIG. 46.

As the bar cam members 219a located at the foremost position, as shown in FIG. 46, start to move rearward, the first supplementary cam projections 219e4 of the three supplementary cam members 219e other than the foremost supplementary cam member 219e' contact the ends of the supplementary cam supporting portions 219a5. The three supplementary cam members 219e are pivotally moved in the counterclockwise direction in FIG. 46, so that the three supplementary cam members 219e are placed in the upright state, as shown in FIG. 45. In the upright state, the separation boss mounting slopes 219e3 provided on the top of the supplementary cam members 219e oppose the separation bosses 241f. The supplementary cam members 219e are placed on the supplementary cam supporting portions 219a5 in the upright state. Thus, the separation bosses 241f are raised. At this time, the foremost supplementary cam members 219e' are still in the turned state. In other words, the foremost separation bosses 241f have not yet been raised by the foremost supplementary cam members 219e'.

At the same time, the pressing portions 219a8 other than the foremost pressing portions 219a8' are move away from the pressed bosses 241g1. Thus, the pressing of the pressed bosses 241g1 with the pressing portions 219a8 is discontinued. At this time, the foremost pressing portions 219a8' is still on the foremost pressed bosses 241g1. That is, the foremost pressed bosses 241g1 are being pressed down by the foremost pressing portions 219a8'.

As the bar cam members 219a are further moved to the rear side from the state shown in FIG. 45, the foremost supplementary cam members 219e' are also placed in the upright state. The foremost pressing portions 219a8' are also moved away from the upper portions of the foremost pressed bosses 241g1. Thus, as shown in FIG. 44, all the separation bosses 241f are supported at higher positions and the pressing of the pressed bosses 241g1 are discontinued.

(b) Selective Urging of Developing Cartridges

The black developing cartridge 240K positioned foremost (right side in FIGS. 47-49) and other developing cartridges 240C, 240M, 240Y are urged downward differentially by the movement of the bar cam members 219a and the supplementary cam members 219e, as shown in FIGS. 47 to 49

More specifically, as shown in FIG. 47, when the image forming operation is not performed, all the pressing portions 219a8 (including 219a8') are away from the upper portions of the pressed bosses 241g1, so that pressing of all the pressed bosses 241g1 are not conducted. Further, when the image forming operation is not performed, all the supplementary cam members 219e (including 219e') are placed upright on the supplementary cam supporting portions 219a5 (219a5'). Accordingly, all the separation bosses 241f are held raised. Thus, the black developing cartridge 240K and other developing cartridges 240C, 240M, 240Y are all placed in the non-pressing (retracted) position. Thus, all the developing rollers 244 and the photoconductive drums 252 are spaced apart from each other when the image forming operation is not performed.

As shown in FIG. 48, when a monochrome image forming operation is performed, the foremost pressing portion 219a8' is placed on the pressed bosses 241g1 and the foremost supplementary cam members 219e' are turned. Thus, in the foremost black developing cartridge 240K, the pressed bosses 241g1 are pressed down and raising of the separation bosses 241f discontinues.

As the raising of the separation bosses 241f is discontinued and the pressed bosses 241g1 are pressed down in the black developing cartridge 240K, the holding portion 241g is slightly moved pivotally about the hinges 241h in the clockwise direction in FIG. 48, as described above. By the pivotal movement of the holding portion 241g, the pressing portions 241g2 on the free end side of the holding portion 241g are moved downward. In accordance with the downward movement of the pressing portions 241g2, the press actuation mechanisms 241k are pressed down to urge the developing frame 241 downward. Thus, only the developing roller 244 of the black developing cartridge 240K makes contact with the relevant photoconductive drum 252.

As described above, when the monochrome image forming operation is performed, the developing cartridges 240C, 240M, 240Y, other than the black developing cartridge 240K are held in the non-pressing (retracted) position. Only the black developing cartridge 240K, which is used for monochrome image forming operation, is moved to the pressing position.

As shown in FIG. 49, when a full-color image forming operation is performed, all the developing frames 241 are urged downward. Thus, the black developing cartridge 240K and other developing cartridges 240C, 240M, 240Y are all moved to the pressing position.

3. Effects According Structures of these Aspects

The color laser printer 210 according to this aspect may have the following effects, other than those described above in conjunction with the above aspects.

In this aspect, the electrode member 247 is pressed by the developing bias terminal 258 in the feeding member pressing direction S perpendicular to the pressing action line Y connecting the pressing position PP and the contact position CP. Accordingly, the contact between the developing roller 244 (toner carrying peripheral surface 244b) and the photoconductive drum 252 (image carrying peripheral surface 252b) at the contact position CP may be stabilized. Further, power feeding to the developing roller 244 may be performed stably by the developing bias terminal 258, via the electrode member 247. Thus, according to this aspect, an image may be formed favorably.

In this aspect, as the feeding member opposing portion 258c1 formed substantially parallel to the pressing action line Y and the terminal portion 247b contact each other, electrical connection between the terminal portion 247b and the developing bias terminal 258 is made. Thus, a line normal to the feeding member opposing portion 258c1 at the feeding member pressing position SP where the terminal portion 247b contacts the feeding member opposing portion 258c1 may be set stably to the direction substantially perpendicular to the pressing action line Y. Therefore, the developing bias terminal 258 and the electrode member 247 that make the feeding member pressing direction S substantially perpendicular to the pressing action line Y, may be achieved with simple structures.

In this aspect, the feeding member opposing portion 258c1 is substantially parallel to the collar positioning accommodation base 251a2 (guiding direction Z). Therefore, when the collar member 246 moves in the collar positioning accommodation base 251a2 along the pressing action line Y, the feeding member opposing portion 258c1 and the terminal portion 247b are relatively moved along the pressing action line Y and the guiding direction Z while contacting with other. Accordingly, the toner carrying peripheral surface 244b of the developing roller 244 and the image carrying peripheral surface 252b of the photoconductive drum 252 may be brought into a predetermined contact with each other, and a power feedable condition from the developing bias terminal 258 to the developing roller 244 may be ensured.

In this aspect, the terminal portion 247b intersects the pressing action line Y when viewed from the direction perpendicular to the feeding member pressing direction S and the pressing action line Y.

In this aspect, the position (feeding member pressing position SP) where the electrode member 247 and the developing bias terminal 258 contact each other, overlaps with or disposed within an area of the coupling part guide groove 251e (coupling accommodation base 251e2) that receives therein the coupling part 248a (input opening portion 248a2), when viewed from the side along the width direction W. Further, in this aspect, the feeding member pressing position SP is within an area defined by the outside diameter of the input opening portion 248a2. In this aspect, the feeding member pressing position SP substantially corresponds to the axis of the driven coupling part 248a1 and the coupling drive gear 283.

Thus, the drive force may be transmitted reliably and stably to the developing cartridge 240 from the drive force transmission mechanism 280, via the coupling drive gear 283 and the coupling part 248a. At the same time, contact between the developing roller 244 and the photoconductive drum 252 at the contact position CP and power feeding from the developing bias terminal 258 to the developing roller 244 via the electrode member 247 may be stabilized.

When the color member 248 is moved in the collar positioning accommodation base 251a2 along the pressing action line Y, the guide surfaces 241m1 of the guide projections 241m formed substantially parallel to the pressing action line Y contact the developing cartridge insertion rollers 257 rotatably supported at the bottom wall 251b.

Therefore, the movement of the collar member 246 and the terminal portion 247b may be smoothly guided along the pressing action line Y when the developing cartridge 240 is installed in the process cartridge frame 230a (drum frame 251), according to the structures of this aspect. Thus, while the developing cartridges 240 are smoothly installed in the process cartridge frame 230a, the favorable electrical connection may be established between the developing bias terminal 258 and the electrode member 247 and the stable contact may be made between the toner carrying peripheral surface 244b of the developing roller 244 and the photoconductive drum 252 at the contact position CP In this aspect, the angle formed between the developing cartridge pressing direction X and the pressing action line Y is set to about 20 degrees. Thus, the guide surfaces 241m1 of the guide projections 241m are pressed against the developing cartridge insertion rollers 257 at a predetermined pressure, without applying extremely strong or weak pressures thereto. The elastic force of the developing cartridge urging springs 241k3 may be transmitted to the contact position CP without significant losses.

Accordingly, while favorable contact between the developing cartridge insertion rollers 257 and the guide surfaces 241m1 is maintained, the developing cartridge insertion rollers 257 may smoothly rotate. Thus, the developing cartridge 240 can be smoothly guided along the guiding direction Z by the developing cartridge insertion rollers 257. Therefore, the predetermined contact between the toner carrying peripheral surface 244b of the developing roller 244 and the image carrying peripheral surface 252b of the photoconductive drum 252 may be reliably and stably achieved at the contact position CP.

In this aspect, the developing cartridge 240 may be positioned using the collar member 246 covering the developing roller shaft 244a from its outside. Thus, the positioning between the developing cartridge 240 and the process cartridge frame 230a (drum frame 251) may be performed near the developing roller shaft 244a. Therefore, the predetermined contact between the developing roller 244 and the photoconductive drum 252 may be reliably made at the contact position CP with a simple structure.

In this aspect, when the developing cartridge 240 is installed in the process cartridge frame 230a, the collar member 246 of the developing cartridge 240 may be received in the collar positioning guide groove 251a1 of the drum frame 251. Then, the collar member 246 may reach the collar positioning accommodation base 251a2 formed at a lower end of the collar positioning guide groove 251a1. At this time, the collar member 246 may move along the pressing action line Y in the collar positioning accommodation base 251a2. When the collar member 246 reaches a predetermined position in the collar positioning accommodation base 251a2, the positioning between the developing cartridge 240 and the process cartridge frame 230a (drum frame 251) may be performed.

With such a structure, the positioning between the developing cartridge 240 and the process cartridge frame 230a when the developing cartridge 240 is installed in the process cartridge frame 230a may be performed smoothly and reliably. Therefore, the favorable electrical connection between the developing bias terminal 258 and the electrode member 247 and the reliable positioning between the developing roller 244 and the photoconductive drum 252 may be stably achieved.

Further, in this aspect, while rotatably supporting the developing roller shaft 244a and the supply roller shaft 243a, the electrode member 247 may electrically connect the developing roller shaft 244a and the supply roller shaft 243a. Thus, power may be supplied to the supply roller 243 and the developing roller 244, via the developing bias terminal 258 and the electrode member 247, such that the supply roller 243 and the developing roller 244 become at substantially the same potential. Therefore, while the predetermined contact between the toner carrying peripheral surface 244b of the developing roller 244 and the photoconductive drum 252 is formed at the contact position CP, the power supply to the supply roller 243 and the developing roller 244 may be stably achieved, such that the supply roller 243 and the developing roller 244 become at substantially the same potential.

In this aspect, the collar member 246 having the cylindrical outer shape when viewed from a side along the width direction W extends from one end of the developing frame 241 with respect to the width direction W. The coupling part 248a (input opening portion 248a2) having a greater outside diameter than the collar member 246 extends from the other end of the developing frame 241 with respect to the width direction W. The coupling part guide groove 251e1 is formed wider enough to receive the coupling part 248a, than the collar positioning guide groove 251a1.

With such a structure, even when the collar member 246 is inserted into the coupling part guide groove 251e1 and the coupling part 248a (input opening portion 248a2) is tried to be inserted into the collar positioning guide groove 251a1, the coupling part 248a may not be properly inserted into the collar positioning guide groove 251a1, due to the differences between their outside shapes. More specifically, the coupling part 248a (input opening portion 248a2) having the greater outside diameter cannot be inserted into the collar positioning guide groove 251a1 formed into a width suitable for the collar member 246 having the smaller outside diameter.

Accordingly, the improper installation of the developing cartridge 240 in the process cartridge frame 230a (drum frame 251) may be favorably prevented with such a structure.

Further, with the structure, the drive coupling part 281 can be shortened by the length that the coupling part 248a (input opening portion 248a2) extended from the process cartridge frame 230a. Therefore, the size of the drive force transmission mechanism 280 provided in the main body casing 211 can be reduced with respect to the width direction W. Consequently, the color laser printer 210 may be downsized.

Further, in this aspect, the developing cartridge 240 may be urged toward the photoconductive drum 252 by the holding portion 241g and the press actuation mechanisms 241k provided on the upper wall 241c of the developing frame 241. Thus, the urging of the developing roller 244 toward the contact position CP may be achieved with such a simple structure.

The bar cam members 219a provided in the linear cam mechanisms 219 are moved in the front-rear direction L along which the developing cartridges 240 are arranged, so that the pressed bosses 241g1 and the pressing portions 241g2 may be selectively moved toward the developing cartridge urging springs 241k3. With such a structure, only the developing cartridge(s) 240 used for the image forming operation may be urged toward the contact position CP. Thus, deterioration or wear of the developing roller 244, for example, due to a continuous slide between the developing roller 244 and the photoconductive drum 252 for a long period of time, may be effectively reduced with such a simple structure.

D. Implication of Variations and Modifications

While the invention has been described in connection with specific aspects, it will be understood by those skilled in the art that other variations and modifications of the aspects described above may be made without departing from the scope of the invention. Other aspects will be apparent to those skilled in the art from a consideration of the specification or practice of the invention disclosed herein. It is intended that the specification and the described examples only are considered as exemplary of the invention, with the true scope of the invention being defined by the following claims.

Image forming apparatuses of the invention are not limited to electrophotographic image forming apparatuses. Further, when the invention is applied to an electrophotographic image forming apparatus, the image forming apparatus is not limited to a laser printer.

The structures of the above aspects may be replaced by other implementations not described or combined.

The color laser printer 210 may be structured such that the photoconductive drum 252 may be directly supported by the process cartridge frame 230a and the developing cartridges 240 may be directly removed from or installed in the process cartridge frame 230a, without having the drum frame 251 in certain aspects.

In at least one aspect, the drum unit 50 may be removably disposed in the process cartridge frame 230a.

Figure 52:
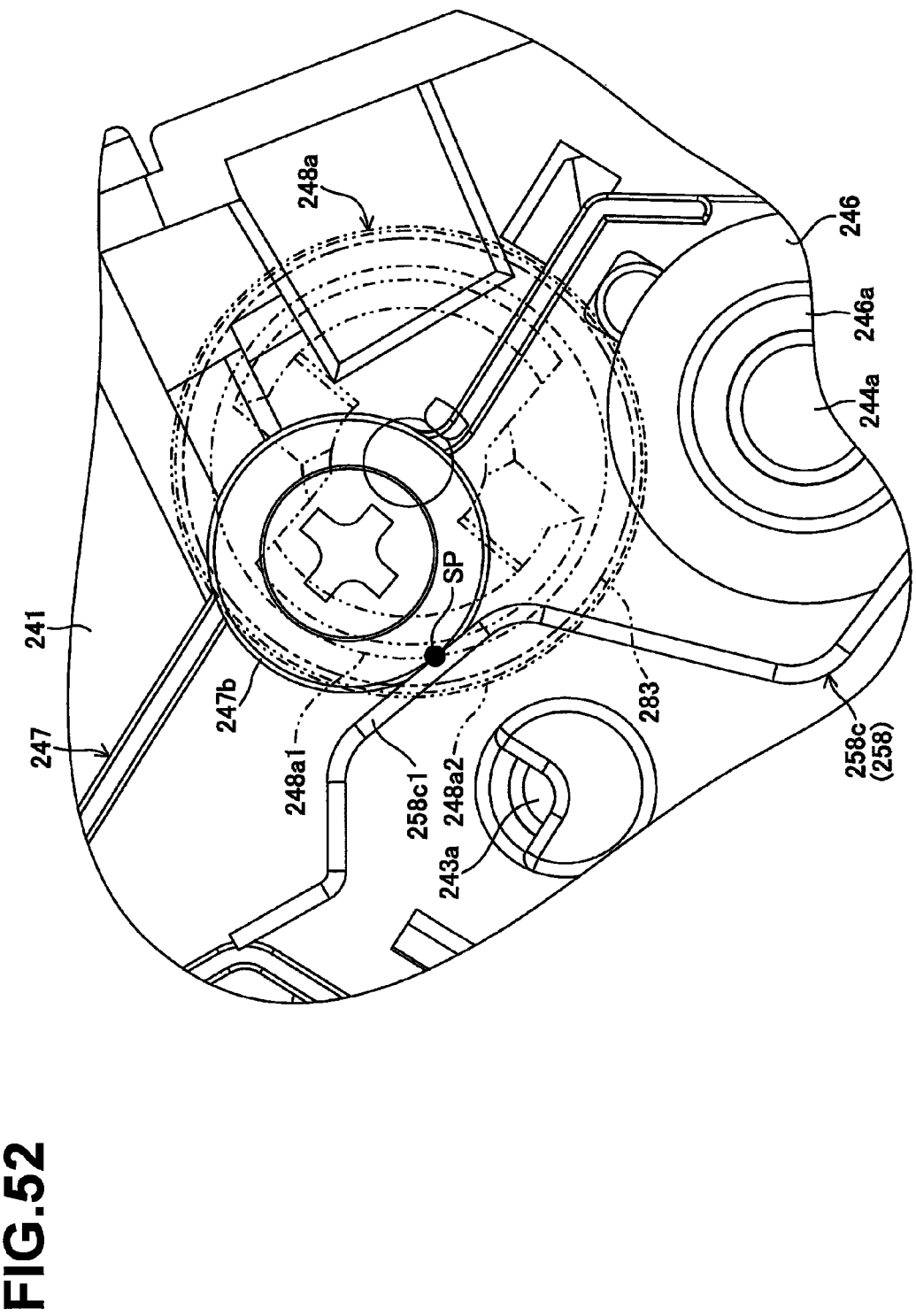
FIG. 52 is an enlarged side view showing a modification of a periphery of the terminal portion shown in FIG. 38.

In at least some aspects, even when the feeding member pressing position SP does not substantially match with the axes of the driven coupling part 248a1 and the coupling drive gear 283, the driven coupling part 248a1 of the coupling part 248a or the drive coupling drive gear 283 may be formed such that areas defined by their outer shapes overlap or include the feeding member pressing position SP when viewed from along the longitudinal direction of the developing cartridge 240, as shown in FIG. 52. With such an illustrative structure, effects of the invention may be achieved successfully.

While this disclosure has been described in conjunction with the exemplary aspects outlined above, various alternatives, modifications, variations, improvements and/or substantial equivalents, whether known or may be presently unforeseeable, may become apparent to those having at least ordinary skill in the art. Accordingly, the exemplary aspects of the disclosure, as set forth above, are intended to be illustrative, not limiting. Various changes may be made without departing from the spirit and scope of the disclosure. Therefore, the disclosure is intended to embrace all known or later developed alternatives, modifications, variations, improvements and/or substantial equivalents.

What is claimed is:

1. A developing cartridge for use with an image forming apparatus having a feeding member for supplying developing bias and a drive coupling, the developing cartridge comprising:
    a case including a first sidewall and a second sidewall opposite to the first sidewall;
    a developing roller disposed between the first sidewall and the second sidewall, the developing roller including a developing roller shaft configured to rotate about a first axis line and a developing roller member configured to carry a developing agent thereon, the developing roller member disposed around the developing roller shaft;
    an electrode disposed on the first sidewall adjacent to the developing roller shaft, the electrode electrically connected to the developing roller member; and
    a driven coupling disposed on the second sidewall, the driven coupling configured to rotate about a second axis line,
    wherein the electrode includes a contact point configured to be contacted by the feeding member, the contact point being disposed within a plane of projection when the driven coupling is projected in a direction parallel to the second axis line towards the first sidewall.

2. The developing cartridge according to claim 1, wherein the second axis line is parallel to the first axis line and positioned a prescribed distance from the first axis line.

3. The developing cartridge according to claim 1, wherein the electrode includes portions disposed outside the plane of projection when the driven coupling is projected in the direction parallel to the second axis line towards the first sidewall.

4. The developing cartridge according to claim 1,
wherein the driven coupling includes a first cylindrical portion and a second cylindrical portion concentrically disposed with the first cylindrical portion,
wherein the first cylindrical portion is substantially hollow and provided with an inner peripheral surface,
wherein the first cylindrical portion includes a driven part which extends radially inward from the inner peripheral surface and which is configured to be engaged with the drive coupling,
wherein the second cylindrical portion includes a gear, and
wherein the plane of projection is defined by projecting the first cylindrical portion in the direction parallel to the second axis line towards the first sidewall.

5. The developing cartridge according to claim 4, wherein the developing roller includes a developing roller gear that is configured to rotate together with the developing roller shaft, and the second cylindrical portion engages with the developing roller gear.

6. The developing cartridge according to claim 4, wherein the first cylindrical portion includes a second driven part which extends radially inward from the inner peripheral surface.

7. The developing cartridge according to claim 4, wherein a radius of the first cylindrical portion is smaller than a radius of the second cylindrical portion.

8. The developing cartridge according to claim 1, wherein the contact point is configured to be contacted by the feeding member on the second axis line.

9. The developing cartridge according to claim 1, further comprising a supporting shaft that supports the driven coupling.

10. The developing cartridge according to claim 9, wherein the second sidewall includes the supporting shaft.

11. The developing cartridge according to claim 1, further comprising a bearing member that receives the electrode, the bearing member being disposed between the electrode and the first sidewall.

12. A developing cartridge for use with an image forming apparatus having a feeding member for supplying developing bias and a drive coupling, the developing cartridge comprising:
a case including a first sidewall and a second sidewall opposite to the first sidewall;
a developing roller disposed between the first sidewall and the second sidewall, the developing roller including a developing roller shaft configured to rotate about a first axis line and a developing roller member configured to carry a developing agent thereon, the developing roller member disposed around the developing roller shaft;
an electrode disposed on the first sidewall adjacent to the developing roller shaft, the electrode electrically connected to the developing roller member; and
a driven coupling disposed on the second sidewall, the driven coupling configured to rotate about a second axis line,
wherein the electrode includes a contact portion having a contact point configured to be contacted by the feeding member, the contact point being disposed within a plane of projection when the driven coupling is projected in a direction parallel to the second axis line towards the first sidewall.

13. The developing cartridge according to claim 12, wherein the second axis line is parallel to the first axis line and positioned a prescribed distance from the first axis line.

14. The developing cartridge according to claim 12, wherein the contact portion is a contact plate.

15. The developing cartridge according to claim 12, wherein the electrode includes portions disposed outside the plane of projection when the driven coupling is projected in the direction parallel to the second axis line towards the first sidewall.

16. The developing cartridge according to claim 12,
wherein the driven coupling includes a first cylindrical portion and a second cylindrical portion concentrically disposed with the first cylindrical portion,
wherein the first cylindrical portion is substantially hollow and provided with an inner peripheral surface,
wherein the first cylindrical portion includes a driven part which extends radially inward from the inner peripheral surface and which is configured to be engaged with the drive coupling,
wherein the second cylindrical portion includes a gear, and
wherein the plane of projection is defined by projecting the first cylindrical portion in the direction parallel to the second axis line towards the first sidewall.

17. The developing cartridge according to claim 16, wherein the developing roller includes a developing roller gear that is configured to rotate together with the developing roller shaft, and the second cylindrical portion engages with the developing roller gear.

18. The developing cartridge according to claim 16, wherein a radius of the first cylindrical portion is smaller than a radius of the second cylindrical portion.

19. The developing cartridge according to claim 16, wherein the first cylindrical portion includes a second driven part which extends radially inward from the inner peripheral surface.

20. The developing cartridge according to claim 12, wherein the contact point is configured to be contacted by the feeding member on the second axis line.

21. The developing cartridge according claim 12, wherein the contact portion has a substantially U-shape when viewed from the direction parallel to the second axis line.

22. The developing cartridge according claim 21, wherein the contact portion extends away from the first sidewall in the direction parallel to the second axis line.

23. The developing cartridge according to claim 12, further comprising a supporting shaft that supports the driven coupling.

24. The developing cartridge according to claim 23, wherein the second sidewall includes the supporting shaft.

25. The developing cartridge according to claim 12, further comprising a bearing member that receives the electrode, the bearing member being disposed between the electrode and the first sidewall.

26. A developing cartridge for use with an image forming apparatus having a feeding member and a drive coupling, the developing cartridge comprising:
a case including a first sidewall and a second sidewall opposite to the first sidewall;
a developing roller disposed between the first sidewall and the second sidewall, the developing roller configured to carry a developing agent thereon, and to rotate about a first axis line;
an electrode disposed on the first sidewall and electrically connected to the developing roller; and
a driven coupling disposed on the second sidewall and configured to rotate about a second axis line upon receipt of a driving force, the second axis line being parallel to the first axis line and being positioned a prescribed distance from the first axis line, wherein a portion of the electrode is configured to be contacted by the feeding member to receive electrical power from the feeding member, and the portion is disposed within a plane of projection when the driven coupling is projected in a direction parallel to the second axis line towards the first sidewall.

27. The developing cartridge according to claim 26, wherein the portion of the electrode is a contact point.

28. The developing cartridge according to claim 26, wherein the electrode includes portions disposed outside the plane of projection when the driven coupling is projected in the direction parallel to the second axis line towards the first sidewall.

29. The developing cartridge according to claim 26, wherein the portion of the electrode is a contact plate.

30. The developing cartridge according claim 29, wherein the contact plate has a substantially U-shape when viewed from the direction parallel to the second axis line.

31. The developing cartridge according claim 30, wherein the contact plate extends away from the first sidewall in the direction parallel to the second axis line.

32. The developing cartridge according to claim 26, wherein the electrode includes a contact plate and the portion of the electrode is a point on the contact plate.

33. The developing cartridge according to claim 26,
wherein the driven coupling includes a first cylindrical portion and a second cylindrical portion concentrically disposed with the first cylindrical portion,
wherein the first cylindrical portion is substantially hollow and provided with an inner peripheral surface,
wherein the first cylindrical portion includes a driven part which extends radially inward from the inner peripheral surface and which is configured to be engaged with the drive coupling,
wherein the second cylindrical portion includes a gear, and
wherein the plane of projection is defined by projecting the first cylindrical portion in the direction parallel to the second axis line towards the first sidewall.

34. The developing cartridge according to claim 33, wherein the developing roller includes a developing roller shaft configured to rotate about the first axis line and a developing roller gear that is configured to rotate together with the developing roller shaft, and the second cylindrical portion engages with the developing roller gear.

35. The developing cartridge according to claim 33, wherein a radius of the first cylindrical portion is smaller than a radius of the second cylindrical portion.

36. The developing cartridge according to claim 33, wherein the first cylindrical portion includes a second driven part which extends radially inward from the inner peripheral surface.

37. The developing cartridge according to claim 26, wherein the electrode is configured to be contacted by the feeding member on the second axis line.

38. The developing cartridge according to claim 26, further comprising a supporting shaft that supports the driven coupling.

39. The developing cartridge according to claim 38, wherein the second sidewall includes the supporting shaft.

40. The developing cartridge according to claim 26, further comprising a bearing member that receives the electrode, the bearing member being disposed between the electrode and the first sidewall.

41. A developing cartridge for use with an image forming apparatus having a feeding member for supplying developing bias and a drive coupling, the developing cartridge comprising:

a case including a first sidewall and a second sidewall opposite to the first sidewall;
a developing roller disposed between the first sidewall and the second sidewall, the developing roller configured to carry a developing agent thereon, and to rotate about a first axis line;
an electrode disposed on the first sidewall and electrically connected to the developing roller, the electrode includes a terminal portion having a contact point; and
a driven coupling disposed on the second sidewall and configured to rotate about a second axis line upon receipt of a driving force, the second axis line being parallel to the first axis line and being positioned a prescribed distance from the first axis line,
wherein the contact point is configured to be contacted by the feeding member and is disposed within a plane of projection when the driven coupling is projected in a direction parallel to the second axis line towards the first sidewall.

42. The developing cartridge according to claim 41, wherein portions of the terminal portion are disposed outside the plane of projection when the driven coupling is projected in the direction parallel to the second axis line towards the first sidewall.

43. The developing cartridge according to claim 41,
wherein the driven coupling includes a first cylindrical portion and a second cylindrical portion concentrically disposed with the first cylindrical portion,
wherein the first cylindrical portion is substantially hollow and provided with an inner peripheral surface,
wherein the first cylindrical portion includes a driven part which extends radially inward from the inner peripheral surface and which is configured to be engaged with the drive coupling,
wherein the second cylindrical portion includes a gear, and
wherein the plane of projection is defined by projecting the first cylindrical portion in the direction parallel to the second axis line towards the first sidewall.

44. The developing cartridge according to claim 43, wherein a radius of the first cylindrical portion is smaller than a radius of the second cylindrical portion.

45. The developing cartridge according to claim 43, wherein the first cylindrical portion includes a second driven part which extends radially inward from the inner peripheral surface.

46. The developing cartridge according to claim 43, wherein the developing roller includes a developing roller shaft configured to rotate about the first axis line and a developing roller gear that is configured to rotate together with the developing roller shaft, and the second cylindrical portion engages with the developing roller gear.

47. The developing cartridge according to claim 41, wherein the contact point is configured to be contacted by the feeding member on the second axis line.

48. The developing cartridge according to claim 41, further comprising a supporting shaft that supports the driven coupling.

49. The developing cartridge according to claim 48, wherein the second sidewall includes the supporting shaft.

50. The developing cartridge according to claim 41, further comprising a bearing member that receives the electrode, the bearing member being disposed between the electrode and the first sidewall.

* * * * *